United States Patent [19]
Drexl et al.

[11] Patent Number: 6,116,399
[45] Date of Patent: *Sep. 12, 2000

[54] FRICTION CLUTCH FOR A MOTOR VEHICLE AND AN OPERATION DEVICE FOR THE OPERATION, ESPECIALLY PNEUMATIC OPERATION, OF A FRICTION CLUTCH

[75] Inventors: Hans-Jürgen Drexl, Schonungen; Wolfgang Grosspietsch, Schweinfurt; Manfred Wehner, Schweinfurt; Herbert Voit, Schweinfurt; Joachim Lindner, Hambach; Thomas Otto, Gochsheim; Jörg Willert, Schweinfurt, all of Germany

[73] Assignee: Fichtel & Sachs AG, Schweinfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,041

[22] Filed: Jun. 11, 1997

[30] Foreign Application Priority Data

Jun. 12, 1996 [DE] Germany .............................. 196 23 373

[51] Int. Cl.[7] .................................................. F16D 48/04
[52] U.S. Cl. .................................. 192/91 A; 192/85 CA; 192/109 F; 192/DIG. 1; 91/388; 91/460
[58] Field of Search ............................. 192/85 CA, 91 A, 192/109 F, DIG. 1; 91/388, 403, 460

[56] References Cited

U.S. PATENT DOCUMENTS

| | | | |
|---|---|---|---|
| 4,419,923 | 12/1983 | Kasahara | 91/460 |
| 4,585,106 | 4/1986 | Shirley | 192/85 CA |
| 4,860,868 | 8/1989 | Murakami | 91/460 |
| 5,009,125 | 4/1991 | Machida et al. | 74/606 R |
| 5,577,585 | 11/1996 | Corral | 192/85 CA |

FOREIGN PATENT DOCUMENTS

| | | | |
|---|---|---|---|
| 451611 | 10/1948 | Canada | 192/85 CA |
| 497164-A1 | 8/1992 | European Pat. Off. | 192/91 A |
| 904380 | 7/1949 | Germany . | |
| 2923487 | 12/1980 | Germany . | |
| 3219768 | 12/1982 | Germany . | |
| 3319-899 | 12/1984 | Germany | 91/388 |
| 3321578 | 12/1984 | Germany . | |
| 3938402 | 8/1990 | Germany . | |
| 3326119 | 9/1995 | Germany . | |
| 4407648 | 9/1995 | Germany . | |
| 61-17536 | 2/1986 | Japan . | |
| 62-246631 | 10/1987 | Japan | 192/85 CA |
| 63-39036 | 3/1988 | Japan . | |
| 63-72232 | 5/1988 | Japan . | |
| 63-243530 | 10/1988 | Japan | 192/85 CA |
| 2141513 | 12/1984 | United Kingdom . | |
| 9600937 | 7/1996 | WIPO . | |

*Primary Examiner*—Thomas R. Hannon
*Assistant Examiner*—William C Joyce
*Attorney, Agent, or Firm*—Nils H. Ljungman & Associates

[57] ABSTRACT

An operation device for a friction clutch arranged in the drive train of a motor vehicle. The operation device includes a positioning servo arrangement with a pneumatic power cylinder arrangement. The pneumatic power cylinder arrangement acts on a clutch release sleeve arrangement. The positioning servo arrangement can be operated with a control valve that is connected to a pneumatic source depending on a command variable representing a desired position and an actual variable representing the axial position of the clutch release sleeve arrangement. The pneumatic power cylinder arrangement is arranged inside of the bell-shaped housing and the control valve is arranged outside of the bell-shaped housing or the bell-shaped housing is arranged at least partially inside of the bell-shaped housing, but is accessible from the outside and/or can be removed when the bell-shaped housing is attached to the combustion engine.

7 Claims, 21 Drawing Sheets

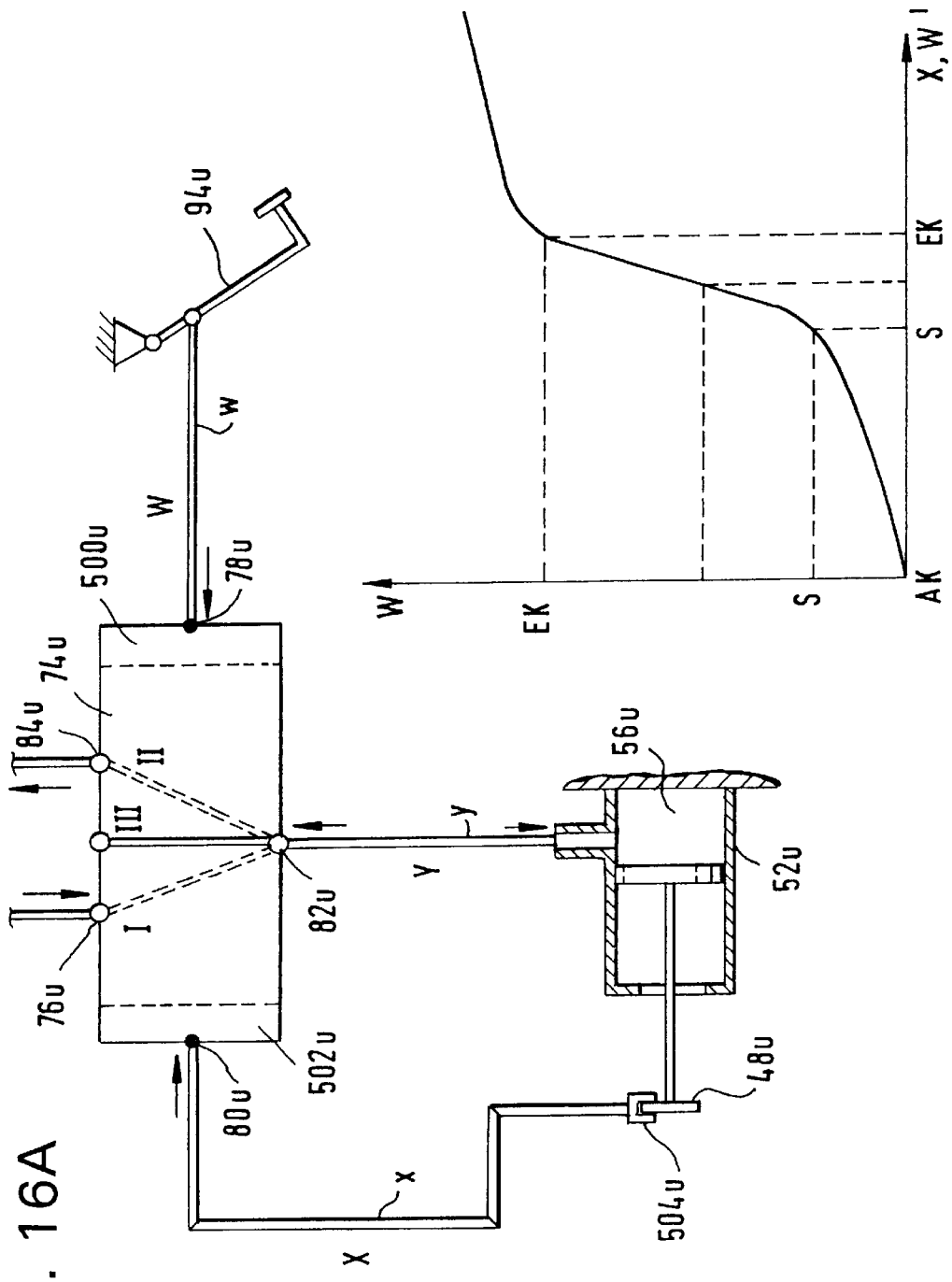

FRICTION CLUTCH FOR A MOTOR VEHICLE AND AN OPERATION DEVICE FOR THE OPERATION, ESPECIALLY PNEUMATIC OPERATION, OF A FRICTION CLUTCH

BACKGROUND OF THE INVENTION

1. Field of the Invention

The present invention relates generally to an operation device for a friction clutch. The friction clutch is arranged in the drive train of a motor vehicle, especially a utility motor vehicle, under a bell-shaped housing and between a combustion engine and a transmission, gear, shift gear or change gear. The operation device includes a clutch release sleeve arrangement, which clutch release sleeve arrangement can be moved essentially equiaxially or coaxially to the friction clutch to operate the friction clutch. The operation device also includes a positioning servo arrangement with a pneumatic power cylinder arrangement. The pneumatic power cylinder arrangement acts on the clutch release sleeve arrangement and can be operated by a control valve. The control valve is connected to a pneumatic source. The control valve operates the pneumatic power cylinder arrangement depending on a command variable, signal, reference variable input or control input, which command variable represents a desired position, and an actual value, which actual value represents the axial position of the clutch release sleeve arrangement with respect to the friction clutch.

2. Background Information

A known operation device is disclosed in German Patent No. 33 21 578 C2. The known operation device has a vacuum servo power assist as a positioning servo arrangement. The servo power assist, which is constructed similarly to a vacuum break power assist, is integrally formed with a pneumatic power cylinder and a control valve. The servo power assist is arranged outside of the bell-shaped housing. Two working chambers of the pneumatic power cylinder are separated by an axially movable piston and an elastic membrane. The working chamber which is designed as a vacuum chamber is connected to a suction pipe system of the combustion engine. The other working chamber, which serves as a control chamber, can either be connected to the vacuum chamber by means of the control valve, or to the atmosphere by means of a pressure compensation opening. The vacuum servo power assist is operated by a control rod, which control rod can be axially displaced by an electric motor driven cam, whereby said control rod strikes, hits or knocks against a valve gate of the control valve. The axial displacement of the control rod will effect a switching of the control valve in such a manner that the piston follows the movement of the control rod with power assist. Through an hydraulic master cylinder, the movement of the piston acts on a slave cylinder, which slave cylinder is arranged on the outside of the bell-shaped housing and is connected to the master cylinder. The slave cylinder then acts on a clutch release fork which is assigned to a clutch release sleeve arrangement. It is possible to perform an emergency operation of the clutch when the combustion engine is turned off, i.e., when there is no vacuum, because the control rod can act directly on the piston through the valve gate of the control valve.

Although the maintenance and, if required, the repair of the positioning servo arrangement of the known operation device is relatively simple because it is arranged outside of the bell-shaped housing, the entire operation device requires a relatively high mechanical effort because of the load transmission, power transmission or transmission of energy that is required in order to operate the clutch release sleeve arrangement towards the bell-shaped housing. The relatively high mechanical effort corresponds to equally high production costs and possibly also to an operational safety level that is insufficient for certain requirements. Furthermore, the positioning precision of the positioning Servo arrangement is limited by the components required for the transmission of the operating power into the bell-shaped housing, because of bearing play and similar situations.

A known device for the operation of the clutch release sleeve of a motor vehicle friction clutch through an hydraulic or pneumatic means of compression or compression medium is disclosed in German Patent No. 29 23 487 C2. German Patent No. 29 23 487 discloses a known device having a means of pressure-ring cylinder that is arranged concentrically to the cam shaft between a clutch release sleeve and a fixed or rigid support inside of the bell-shaped housing. The means of pressure-ring cylinder is delimited in the direction of the clutch release sleeve by a flexible annular membrane piston.

From German Patent No. 32 19 768 A1, a known pneumatic power-ring cylinder is disclosed. The pneumatic power-ring cylinder is also arranged inside the bell-shaped housing but acts directly on the pressure plate of the friction clutch. The pneumatic power-ring cylinder is compress ed for the coupling, i.e., as long as the clutch pedal is not compressed, and presses with its annular piston on the pressure plate, which pressure plate is biased toward the ring cylinder and against the clutch disk, and the clutch disk against the flywheel. To do so, compressed air supplied by a compressed air source is led into the pneumatic power-ring cylinder through a metering valve that can be operated by the clutch pedal as long as the clutch pedal is not pressed. When the clutch pedal is pressed, the excess pressure or overpressure in the pneumatic power-ring cylinder can escape to the outside through a pneumatic connection between the pneumatic power-ring cylinder and the metering valve from an exhaust opening of the metering valve that is arranged outside of the housing. A back-coupling of the position of the annular piston of the pneumatic power-ring cylinder or the pressure plate to the metering valve is not provided.

Furthermore, another known operation device of the type initially mentioned is attached to the out side of the bell-shaped housing as an integral unit. The known operation device comprises the pneumatic power cylinder, an hydraulic slave cylinder and the control valve. The piston of the pneumatic power cylinder is attached to a rod element which forms the piston of the hydraulic slave cylinder. The rod element is connected to a tappet, which tappet reaches into the inside of the bell-shaped housing and engages a clutch release fork. The clutch release fork is assigned to the clutch release sleeve arrangement. A master cylinder, which master cylinder can be operated by the clutch pedal, and a control opening or entry of the control valve are connected to the hydraulic slave cylinder. Depending on the hydraulic pressure at the control opening, the control valve controls the supply or feed or the discharge or deflation of compressed air into the pneumatic power cylinder from the pneumatic power cylinder in such a manner that a preset hydraulic pressure determined by a pressure spring arrangement occurs or ensues at the control opening. In this way, the hydraulic slave cylinder serves as a measuring cylinder which records or reads the position of the rod element and thus indirectly the position of the clutch release sleeve arrangement, with the exception of some inaccuracies attributable to the steering joint play. Although the maintenance and repair of this known operation device is relatively simple because said device is arranged on the outside of the bell-shaped housing, it also requires a high mechanical effort because of the load transmission into the bell, which results in the same disadvantages as in the case of German Patent No. 33 21 578 C2.

OBJECT OF THE INVENTION

One object of the present invention is to provide an operation device of the stated type which can be exactly positioned.

A further object of the present invention is to provide an operation device of the stated type which is simple in construction, can be economically produced, and is reliable.

Yet a further object of the present invention is to provide an operation device of the stated type which is simple and thus inexpensive to maintain and repair.

SUMMARY OF THE INVENTION

The present invention teaches that these objects can be accomplished in accordance with at least one possible embodiment, by an arrangement in which the pneumatic power cylinder arrangement can be inside of the bell-shaped housing and the control valve can be outside of the bell-shaped housing. The control valve could also be arranged at least partially inside of the bell-shaped housing, but still be arranged so that the control valve is accessible from the outside, especially to remove the control valve when the bell-shaped housing is connected to the combustion engine.

Because the pneumatic power cylinder arrangement according to the present invention is arranged inside of the bell-shaped housing, a transmission of the clutch operating power from the outside of the bell or bell-shaped housing into the inside of the bell is not required. Corresponding mechanical or hydraulic transmission elements are thus not necessary and will result in corresponding cost savings. At the same time, a high positioning precision is obtained because there is basically no risk of bearing play, because a power transmission from the outside to the inside of the bell is not required for mechanical power transmission components. Because of the resulting simple construction, it is also possible to achieve a high operational dependability or reliability.

Because of the arrangement of the control valve according to the present invention, the operation device is also easy to maintain and repair. The control valve is often a part of the operation device that is subject to malfunction because dirt particles in the pneumatic pressure medium, for example, in the compressed air, can attach to the control valve and render it non-operational. The control valve is accessible and/or removable for maintenance and repair without having to detach the bell-shaped housing. The bell-shaped housing is generally formed by a segment of a transmission housing and a segment from the combustion engine. The detaching of the bell-shaped housing would be quite time-consuming and equally expensive. Any mention of compressed air in the following is not intended to be limiting, in that any other pneumatic pressure medium, especially a pneumatic medium with a pressure that is lower than the ambient pressure of a vacuum source, can also be used.

The pneumatic power cylinder arrangement arranged in the bell-shaped housing is extremely dependable in comparison to known hydraulic slave cylinder arrangements arranged in a bell-shaped housing. The pneumatic power cylinder arrangements can tolerate certain leaks, which leak tolerance is not possible in the case of slave cylinder arrangements arranged in a bell-shaped housing. In the case of hydraulic slave cylinder arrangements, the repair and maintenance work would, depending on the design of the hydraulic slave cylinder arrangement, require detaching the bell-shaped housing from the combustion engine. Pneumatic power cylinder arrangements require such maintenance and repair work only in exceptional cases, and the assumed working life would in any case exceed the working life of the clutch disk(s).

In other words, since pneumatic power cylinder arrangements can tolerate some leakage, the pneumatic power cylinder arrangements generally do not require as much maintenance and repair work as a hydraulic slave cylinder arrangement. Further, the pneumatic power cylinder arrangements can be assumed to have an operating life longer than the operating life of the clutch disks. Any repairs or replacement of the pneumatic power cylinder arrangement could occur when the housing is disassembled to replace the clutch disks.

In one embodiment of the present invention, the control valve can include an valve arrangement adjustable between a first control condition, which first control condition connects the pneumatic power cylinder arrangement to the pneumatic source, and a second control condition, which second control condition connects the pneumatic power cylinder arrangement to a pressure compensation opening. The valve arrangement is reversible or can be switched over between the two control conditions depending on a difference value assigned to an actual variable and a command variable. A position of the valve arrangement is assigned to each control condition. A third valve control condition, where the pneumatic power cylinder arrangement is not connected to either the pneumatic source or the pressure compensation opening or alternates between valve arrangement positions, is not absolutely required. However, the positioning servo arrangement as a whole will be able to assume a corresponding condition.

The valve arrangement can also be reversible depending on the difference value of a third control condition, where the pneumatic cylinder arrangement is preferably essentially sealed pneumatically-tight, i.e., the pneumatic cylinder arrangement is at the same time not connected to either the pneumatic source or the pressure compensation opening. A certain position of the valve arrangement will then be assigned to the third control condition. The third control condition can also be defined by the fact that the valve arrangement alternately assumes the position assigned to the first control condition and to the second control condition.

In other words and in accordance with another possible embodiment of the present invention, the third control condition can represent a position where the pneumatic power cylinder arrangement preferably is not connected to either the pneumatic source or the pressure compensation opening. The difference value can possibly be defined to be the difference between the command variable and the actual variable. The difference value can then preferably have a value that corresponds to the position of the valve arrangement while in the third control condition. The valve arrangement can then be switched between the first control position and the second control position based upon the difference value being different from the defined difference value corresponding to the third control condition. The third control condition could also be represented by frequently switching between the first control condition and the second control condition.

At least one of the command variable, actual variable and possibly also the difference variable, can be an hydraulic, pneumatic, mechanical or electrical variable, especially a pressure, a volume, a power, a path, an angle, a current, a tension, voltage or stress.

In another embodiment of the present invention, the control valve has a first signal connection to receive a command signal. The command signal can transmit the command variable from a clutch pedal arrangement. The control valve has a second signal connection to receive an instantaneous value signal. The instantaneous value signal transmits the actual variable of a transmitter element arrangement. The transmitter element arrangement is assigned to the clutch release sleeve arrangement. The command signal can be an hydraulic, pneumatic, mechanical, electrical or optical signal. The command signal can be represented by a pressure, a volume, a power, a path, an angle, a current, a tension or a luminous intensity. To convert an optical signal into an electrical or mechanical variable, means of conversion may be assigned to the first signal connection to convert the command signal into the command variable. The same also applies to the instantaneous value signal. The signal for the instantaneous value can also be an hydraulic, pneumatic, mechanical, electrical or optical signal. The instantaneous value signal can be represented by a pressure, a volume, a power, a path, an angle, a current, a tension or a luminous intensity. Means of conversion can be assigned to the second signal connection to convert the signal for the instantaneous value into the actual variable. The means of conversion could convert an hydraulic signal into a mechanical or electrical variable, or convert a mechanical signal to an electrical or hydraulic variable.

It is considered especially advantageous that the positioning servo arrangement includes a positioning system arrangement. The positioning servo arrangement regulates the position of the clutch release sleeve arrangement depending on the command signal, the instantaneous value signal and a preset positional characteristic line. The positional characteristic line can designate a certain desired position of the clutch release sleeve arrangement to each command signal. In this allocation, the command signals are illustrated, pictured or imaged to the allocated desired positions. The illustration may be a linear or a non-linear illustration. For example, there may be an increasing, decreasing or tapering correlation between the command signal and the desired position and thus the actual position effected by the influence of the position system device.

In this context, it is especially preferred that the positional characteristic line assigns a desired position of the clutch release sleeve arrangement to each command signal in such a manner that a relatively larger command signal range is assigned to a desired position range than is assigned to the remaining desired position ranges. The desired position range is delimited by a torque transmission that essentially begins at a position and ends at a coupled position for an essentially maximum torque transmission. In this way, the clutch, proceeding from the disengaged position on the one hand, can be closed relatively quickly up to the position of commencing torque transmission (point of slipping). On the other hand, the range between this point of commencing torque transmission and the coupled position for an essentially maximum torque transmission, which range is also known as a modulation zone, is spread, expanded or widened at the command signal level, so that a careful closing of the clutch depending on attached or applied motor torque is possible. This design is of special interest for clutch pedal-operated operation devices.

The positioning servo arrangement can include an electrical positioning system circuit with an electrical transmitter, measurement transducer, sensor, pick-off, pick-up or primary element. The electrical transmitter directly or indirectly reads, measures or records the position of the clutch release sleeve arrangement. Such a design is especially suitable when an electrically switched transmission, especially an automatic transmission or a switch gear transmission automated by an actuating drive or actuator is provided.

The positioning servo arrangement can also include a mechanical positioning system arrangement with a mechanically coupled master element that directly or indirectly reads the position of the clutch release sleeve arrangement. A Bowden-control or similar control, which Bowden-control is connected to the clutch release sleeve arrangement and engages at a valve seat for a valve gate of a control valve, may be a suitable master element.

The positioning servo arrangement can also include an hydraulic positioning system arrangement with an hydraulic measuring cylinder arrangement. The measuring cylinder arrangement, especially with one single measuring cylinder, directly or indirectly reads the position of the clutch release sleeve arrangement. Such a position system arrangement offers the advantage that an automatic clutch disk wear compensation is possible in a simple manner. The filling amount of the hydraulic medium, especially the hydraulic oil, is compensated through a so-called shifting or blow boring from the master cylinder to the storage container. The terms pressure oil or hydraulic oil are not used as limiting terms in the following. Any other suitable hydraulic pressure medium can also be used.

In a positioning servo arrangement with an hydraulic positioning system arrangement, the control valve can include a valve arrangement adjustable between a first control condition, which first control condition connects the pneumatic power cylinder arrangement and the pneumatic source, and a second control condition, which second control condition connects the pneumatic power cylinder arrangement and pressure compensation opening. The valve arrangement is reversible between the two control conditions depending on the power difference or differential between an actual power, which actual power corresponds to the hydraulic pressure in the measuring cylinder arrangement, and a threshold pre-load or initial load.

In one embodiment of the present invention, the control valve and the measuring cylinder arrangement can be designed as a constructional unit. The constructional unit is attached to the pneumatic power cylinder arrangement and can be detached from the pneumatic power cylinder arrangement. In doing so, the measuring cylinder arrangement is also easily accessible and can preferably be detached together with the control valve to replace packing rings, washers or gaskets in case of leakage.

It is especially practical if the measuring cylinder arrangement can be coupled, or is essentially rigidly coupled, to the clutch release sleeve arrangement or the clutch release sleeve arrangement-side of the pneumatic power cylinder arrangement, through a coupling element. The coupling element can be firmly attached to the clutch release sleeve arrangement, and only loosely or removably attached to the measuring cylinder arrangement. It is then especially easy to remove the constructional unit formed by the control valve and the measuring cylinder arrangement from the pneumatic power cylinder arrangement. The pneumatic system is damped by an essentially rigid coupling between the measuring cylinder arrangement and the pneumatic power cylinder arrangement. This counteracts the risk of vibration, overshoot or overswing appearances due to the compressibility of the pneumatic medium (especially air) when the pneumatic power cylinder arrangement is operated.

In other words, the rigid coupling between the measuring cylinder arrangement and the pneumatic power cylinder arrangement can be used to reduce the risk of vibration due to the compressibility of the pneumatic medium.

In one embodiment of the present invention, a piston of the measuring cylinder arrangement, which piston can be essentially moved along an axis parallel to the clutch axis, is biased, pre-stressed, pre-tensed or pre-loaded in the direction of the friction clutch, preferably against a coupler element that is solidly connected to the clutch release sleeve arrangement. With respect to a rigid coupling between the pneumatic power cylinder arrangement and the measuring cylinder arrangement, a piston of the measuring cylinder arrangement, which piston can be moved essentially along an axis parallel to the clutch axis, can be movement-coupled or designed to be movement-coupled with the clutch release sleeve arrangement, preferably through the coupling element that is firmly connected to the clutch release sleeve arrangement.

Alternately, the measuring cylinder arrangement and the pneumatic power cylinder arrangement can form a constructional unit. In this case, the control valve is removably or detachably held at the bell-shaped housing and is connected to the measuring cylinder arrangement and the pneumatic power cylinder arrangement by means of channels and/or lines.

If the measuring cylinder arrangement and the pneumatic power cylinder arrangement form a constructional unit, the control valve can also be removably attached to the constructional unit.

All of the embodiments mentioned above result in the previously stated advantages of simple maintenance and repair of the control valve.

The measuring cylinder arrangement can be designed as a slave cylinder arrangement which acts on the clutch release sleeve arrangement. The slave cylinder arrangement is hydraulically connected or can be hydraulically connected to a master cylinder, especially a master cylinder that can be operated by a clutch pedal, for emergency operation of the clutch. It is then possible to open the clutch in a simple manner, especially to start the combustion engine, even if the motor vehicle was parked with an engaged gear and the pneumatic source is currently not operational, i.e., the pneumatic source does not supply compressed air, because the combustion engine is not running or is turned off. However, it is also possible to simply forego an emergency operation, for example, in the case of an automatic transmission where the gear is disengaged on an obligatory basis when the motor vehicle is being turned off, i.e., when the combustion engine is not running. Basically, it is also possible to disengage the engaged gear when the combustion engine is not running without operating the clutch, by taking advantage of the momentary cross-over or zero-crossing which occurs in case of a repeated, short activation of the ignition of the combustion engine.

In one embodiment of the present invention, means of hydraulic pressure delimitation can be provided to counteract a rise of the hydraulic pressure in the hydraulic system above a prescribed maximum value. This is of special interest in cases where the measuring cylinder arrangement is not designed for the emergency operation of the clutch, i.e., it is not designed as a slave cylinder arrangement. This will prevent any damage to the operation device, especially the measuring cylinder arrangement and possibly to a coupling element or similar element, in the case that the pneumatic source does not supply any pneumatic medium or the control valve is defective.

The means for hydraulic pressure delimitation can include a biasing, pre-stressing or pre-loading device. The biasing device biases a piston of a piston-cylinder arrangement in the direction of a volume decrease of the hydraulic system-side cylinder space. The means for hydraulic pressure delimitation can also include a valve which connects the pressure side and the reserve side of the master cylinder and opens against a bias, pre-tension, pre-load or pre-stress. In another embodiment, the biasing device acts between the piston and an assigned piston rod element of the measuring cylinder arrangement so that the measuring cylinder performs a double function. This results in the advantage that less space is required and no additional production costs for high-cost components will be incurred.

To operate the clutch release sleeve arrangement, an additional hydraulic slave cylinder arrangement can be provided. The additional hydraulic slave cylinder arrangement is preferably operated by means of a pedal-operated master cylinder. In this context, it is especially preferred that the pneumatic power cylinder arrangement is coupled to the hydraulic slave cylinder arrangement and/or the clutch release sleeve arrangement in such a manner that it can be expanded for the operation of the clutch release sleeve arrangement independently of the slave cylinder arrangement. For example, the assembly may be such that the slave cylinder arrangement axially displaces the pneumatic power cylinder arrangement (as a whole) for the operation of the clutch release sleeve arrangement. However, the slave cylinder arrangement can also operate the clutch release sleeve arrangement by expanding the pneumatic power cylinder arrangement.

In one embodiment of the present invention, power threshold means can be provided to permit the hydraulic operation of the slave cylinder arrangement essentially only after an operation power threshold which acts on the master cylinder has been exceeded. This assembly is especially advantageous when the control valve is hydraulically triggered by the pedal-operated master cylinder for the operation of the pneumatic power cylinder arrangement. In this way, there are only insignificant pressures in the hydraulic system because of the positioning servo arrangement, and the operation power threshold can be chosen in such a manner that the operation power threshold is above the hydraulic pressures which occur when the positioning servo arrangement is operating. During normal operation, the slave cylinder arrangement thus does not play an essential part in the generation of clutch disengagement power and can therefore be mounted in the bell-shaped housing, for example, in the form of a slave cylinder which is arranged concentrically to the clutch axis, without negatively impacting the operational reliability and the working life of the operation device. Because the slave cylinder arrangement is normally not or only insignificantly loaded with pressure, there is essentially no wear on the components of the slave cylinder arrangement, especially the packing rings and similar items, which minimal wear minimizes the probability of leakage.

In the case that the pneumatic source is not operational or the positioning servo arrangement fails, for example, because of a dirty control valve, the slave cylinder arrangement enables an emergency activation of the clutch. To operate the slave cylinder arrangement hydraulically, the master cylinder must be operated with an operational power which exceeds the operation threshold.

The power threshold means can include a biasing device, which biasing device biases a piston of the slave cylinder arrangement, and/or a cylinder separating piston arrangement with a biased separation piston, which cylinder separating piston arrangement is interpositioned between the slave cylinder arrangement and the master cylinder. The power threshold means can also include a valve which opens against bias and is interpositioned between the slave cylinder arrangement and the master cylinder. As an alternate or additional measure, a controllable control valve is arranged between the master cylinder and the slave cylinder in an hydraulic connection. The controllable control valve can preferably be controlled subject to the operation pressure of the pneumatic source.

Rather than using the slave cylinder arrangement only as an emergency operation, the hydraulic slave cylinder operation can also serve as a measuring cylinder arrangement.

The pneumatic power cylinder arrangement can also include a pneumatic power ring cylinder which is essentially concentric to the clutch axis. Additionally or alternately, the pneumatic power cylinder arrangement can also include several pneumatic power cylinders. The pneumatic power cylinders are arranged around the clutch axis preferably to exert a force on the clutch release sleeve arrangement. The clutch release sleeve arrangement is coaxial to the clutch axis. The pneumatic power cylinders can be arranged with equal circumference angle distances from each other and with equal distances from the clutch axis. In any case, the assemblies achieve or ensure that the power of the pneumatic power cylinder arrangement, which pneumatic power cylinder arrangement acts on the clutch release sleeve arrangement, is essentially directed axis-parallel and does not cause any moments of tilt in the clutch release sleeve arrangement. The clutch release sleeve arrangement therefore requires only axial guidance without substantial support against moments of tilt. A ball holder arranged between a solidly positioned part of the clutch release sleeve and a part of the clutch release sleeve which turns with the clutch or the roller bearing formed by all of these components is equally loaded across the entire periphery and is thus also not subject to moments of tilt. There are possible cost savings because of the relatively lower requirements with respect to the positioning of the clutch release sleeve or the design of the roller bearing.

The hydraulic slave cylinder arrangement can include a slave ring cylinder which is essentially concentric to the clutch axis. Alternately or additionally, the hydraulic slave cylinder arrangement can also include several slave cylinders which are arranged around the clutch axis, preferably to exert a force on the clutch release sleeve arrangement. The clutch release sleeve arrangement is coaxial to the clutch axis. The slave cylinders are arranged with equal circumference angle distances from each other and with equal distances from the clutch axis. This results in the same advantages as in the pneumatic power cylinder arrangement described above.

In another possible embodiment, the pneumatic power cylinders can be spaced at equal angles from each other around the clutch axis. The spacing of the pneumatic power cylinders in this manner can provide for a balanced distribution of the pneumatic power cylinders about the clutch axis. The same can also hold true for the slave cylinders. The slave cylinders can be spaced at equal angles from one another to provide a balanced distribution of slave cylinders about the clutch axis.

Advantageously, the pneumatic power cylinder arrangement and the hydraulic slave cylinder arrangement can form a constructional unit.

If a slave ring cylinder as well as a pneumatic power ring cylinder are provided, it is preferred that the slave ring cylinder and the pneumatic power ring cylinder are arranged coaxially one within the other. When the slave ring cylinder and the pneumatic power ring cylinder form a constructional unit, it is preferred that the slave ring cylinder radially encloses the pneumatic power ring cylinder on the outside. This makes it constructionally easier to feed the hydraulic means or hydraulic medium to the slave ring cylinder radially from the outside through a corresponding hydraulic connection of the ring cylinder.

In the case of slave ring cylinders and pneumatic power cylinders which are arranged coaxially one inside the other, it is furthermore preferred that the slave ring cylinder projects past the pneumatic power ring cylinder in the direction of the clutch axis, toward the friction clutch. It is also preferred that the pneumatic power ring cylinder projects past the slave ring cylinder in the direction of the clutch axis, toward the transmission. If the pneumatic power ring cylinder projects past the slave ring cylinder in the direction of the clutch axis, toward the transmission, the pneumatic connection of the pneumatic power ring cylinder can be achieved radially from the outside, similarly for the slave ring cylinder, without requiring complicated borings, channels, or especially long channels. The pneumatic connection of the pneumatic power ring cylinder can lower the risk of vibration caused by the elasticity of the air column in pneumatic lines.

In another embodiment of the present invention, a pneumatic ring piston element is sealed and arranged to be displaced, while sealed, in a pneumatic power ring cylinder. The pneumatic power ring cylinder is radially delimited by two ring-cylindrical walls which extend equiaxially or coaxially in radial distance. The pneumatic ring piston element together with one of the ring-cylindrical walls additionally forms a sealed ring-cylindrical hydraulic step cylinder. The pneumatic power ring cylinder and the hydraulic slave ring cylinder then form a unit which can be produced cost-efficiently. The above-mentioned relative arrangement of the pneumatic power ring cylinder and the slave ring cylinder can then be obtained in a simple manner.

According to an advantageous embodiment of the present invention, one ring piston of the slave ring cylinder forms a cylinder wall of the pneumatic power ring cylinder. A ring piston of the pneumatic power ring cylinder forms a cylinder wall of the slave ring cylinder. An especially compact unit which encloses the two ring cylinders is obtained if the ring piston of the slave ring cylinder is sealed and can be axially displaced while sealed. A compact unit is also obtained if the ring piston of the slave ring cylinder is arranged on the ring piston of the pneumatic power ring cylinder, which ring piston of the pneumatic power ring cylinder forms a cylinder wall of the slave ring cylinder, and on an opposite cylinder wall of the slave ring cylinder.

According to another advantageous embodiment of the present invention, the pneumatic power ring cylinder can include two ring cylinder walls which extend equiaxially or coaxially in radial distance and can be axially displaced with respect to each other. Each of said ring cylinder walls carries an annular face wall which extends to the other ring cylinder wall and delimits a pneumatic chamber, space or cavity. The clutch release sleeve arrangement is held on the first of the two ring cylinder walls and means for fastening, affixing or attaching the pneumatic power ring cylinder in the bell-shaped housing is held on the second of the two ring cylinder walls. This assembly is especially advantageous for so-called compressed clutches where the clutch release sleeve arrangement is displaced in the direction of the clutch for the purpose of disengagement, and permits very compact constructional units.

The means for fastening preferably includes a ring-cylindrical pipe socket on the side of the face wall of the second ring cylinder wall which faces away from the clutch release sleeve arrangement. The first ring cylinder wall is axially movably and radially guided on said pipe socket. Without a high effort, the described assembly ensures an especially dependable radial guidance of the first ring cylinder wall. Because of the pipe socket, the pneumatic power ring cylinder is further displaced by the distance of the bell-shaped housing wall in the direction of the center of the bell of the bell-shaped housing, which bell radially enlarges toward the motor. The pneumatic power ring cylinder can also be used if the bell-shaped housing has variable geometries or different space conditions.

In one embodiment of the present invention, on the face wall of the first ring cylinder wall, on the one hand, and in the area of the far end of the first ring cylinder wall with respect to the clutch release sleeve arrangement, on the other hand, certain conical nipples are held to seal the pneumatic chamber. The conical nipples are positioned to make contact with and to seal the sliding faces of the second ring cylinder wall and the ring-cylindrical pipe socket. In this way, relatively high precision has to be used only in the treatment of the second ring cylinder wall and the pipe socket, while substantially less precision is required for the production of the first ring cylinder wall, i.e., a largely raw or unmachined cast part can be used for the first ring cylinder wall.

In another possible embodiment of the present invention, seals or gaskets can be used to seal the pneumatic chamber. The seals or gaskets can slide along the faces of the second ring cylinder wall and the ring-cylindrical pipe socket.

Preferably, the second ring cylinder wall radially encloses the outside of the first ring cylinder wall. The control valve can be attached to the outside of the second ring cylinder wall. The pneumatic connection between the pneumatic power ring cylinder and the control valve can be obtained by a simple boring in the second ring cylinder wall. Conversely, if the first ring cylinder wall were located radially outside, a control valve attached to this outside first ring cylinder wall would also move during the operation of the pneumatic power ring cylinder. This movement is essentially possible, but would require a higher effort for the pneumatic connection to the control valve and the triggering or actuation of the control valve. The pipe socket can be designed as one piece with the second ring cylinder wall and the face wall of said second ring cylinder wall.

It is especially advantageous, if the pneumatic power cylinder arrangement includes a pneumatic power ring cylinder. The pneumatic power ring cylinder has, on its side that axially faces away from the clutch release sleeve arrangement, a coaxial pipe socket. The pipe socket is especially for inside and outside self-centering. The pipe socket can be located at the far end from the ring cylinder with fastening means to connect to the bell-shaped housing. The fastening means can form a fastening adapter, either together or at least with a partial area of the pipe socket, which fastening adapter is created separately from the pneumatic power ring cylinder. In this way, it is possible to use the same pneumatic power cylinder arrangement in an especially simple manner even if the symmetries of the bell-shaped housing and the space conditions are different. This results in substantial production cost advantages because the pneumatic power cylinder arrangement is produced in correspondingly high quantities.

The fastening adapter can have an oval half dog for the radial and/or axial mounting of the pipe socket. Special fastening measures for the pipe socket and thus the pneumatic power cylinder arrangement are therefore not necessary.

In other words, the fastening adapter can be designed to accept a rod with a hook, a screw, a bolt or any other type fastening device. The fastening adapter can also have an extension to mesh with a cut out portion of the pipe socket to axially and radially mount the pipe socket.

A spring-load can be assigned to the clutch release sleeve arrangement, which spring-load can be biased by means of the pneumatic power cylinder arrangement. The spring-load can be activated for the emergency operation of the friction clutch. In this way, an emergency operation of the friction clutch is possible without a corresponding hydraulic slave cylinder arrangement. Although an hydraulic slave cylinder arrangement which serves only for the emergency operation requires, as previously stated, extremely low maintenance and is not prone to repairs, there may be concerns with respect to an hydraulic slave cylinder arrangement which is arranged in the bell-shaped housing. The described spring-load then provides a good alternate solution.

The pneumatic source can be a pneumatic vacuum or suction pressure source or a pressure source which releases, emits or discharges pressure gas, pressurized gas or compressed gas. A pneumatic pressure source is preferred to a pneumatic vacuum source because smaller pneumatic power cylinder cross sections are possible in this manner.

The friction clutch for which the operation device is intended can be a pulled or a pressed clutch. When the clutch is pulled, the clutch release sleeve arrangement is displaced in the direction of the transmission for disengagement, whereas if the clutch is pressed, the clutch release sleeve arrangement is displaced in the direction of the combustion engine for disengagement.

The operation device is especially suitable for utility motor vehicles where a pneumatic pressure source is commonly provided anyway. The term utility motor vehicles used herein refers primarily to trucks, buses, heavy 4-wheel-drive vehicles and similar vehicles. However, passenger cars are not excluded from the field of possible applications for the operation device.

In another possible embodiment of the present invention, the operation device could be used for a single-disc clutch. The operation device would work in a manner similar to that described above and would also be arranged in a similar manner. The single-disc clutch can be typically used in an automobile. The hydraulic and pneumatic connections for the operation device can be adapted from existing connections or can be newly supplied to the operation device.

As mentioned above, the control valve according to the present invention is at least accessible, which means that the control valve can be accessed with the appropriate tools to perform maintenance and repairs in such a manner that the maintenance and repair, at least in normal cases, does not require a high effort. Maintenance and repair of the control valve can be performed without having to remove the bell-shaped housing from the combustion engine, i.e., without having to separate the drive train.

The present invention furthermore relates to an operation device for a friction clutch arranged in the drive train of a motor vehicle, particularly a utility motor vehicle. The operation device is arranged between a combustion engine and a transmission in a bell-shaped housing. The operation device includes a clutch release sleeve device which can move essentially coaxially to the friction clutch to operate the friction clutch. The operation device also includes a positioning servo arrangement with a compressed power cylinder arrangement. The compressed power cylinder arrangement acts on the clutch release sleeve arrangement. The compressed power cylinder arrangement is operated by a control valve. The control valve is connected to a compression source. The control valve operates the compressed power cylinder arrangement depending on a command variable, which command variable represents a desired position and an actual variable, which actual variable represents the axial position of the clutch release sleeve arrangement.

According to one embodiment of the present invention, it is suggested that the compressed power cylinder arrangement is arranged inside the bell-shaped housing. The means of pressure can be pneumatic means of pressure, especially a compressed gas with a higher pressure than ambient pressure of a pneumatic pressure source or possibly also a pneumatic medium with a lower pressure than ambient pressure of a vacuum pressure source, for example, a suction pipe of the combustion engine. The means of pressure can also be an hydraulic means of pressure (from using hydraulic fluid). Thus, the pressure source can be a pneumatic pressure source, pneumatic vacuum pressure source or hydraulic pressure source.

Preferably, the control valve is arranged outside of the bell-shaped housing, or at least partially inside of the bell-shaped housing, but is accessible from the outside when the bell-shaped housing is connected to the combustion engine and the transmission, especially so that the control valve can be removed. This will result in the advantages described above.

Preferably, an hydraulic slave cylinder arrangement is additionally provided to operate the clutch release sleeve arrangement. The slave cylinder arrangement is preferably operated by means of a pedal-operated master cylinder. In this context, reference is made to the foregoing designs or embodiments of slave cylinder arrangements.

It is preferred that the control valve includes a valve arrangement adjustable between a first control condition, which first control condition connects the compressed power cylinder arrangement and the compression source, and a second control condition, which second control condition connects the compressed power cylinder arrangement and a pressure compensation opening. The valve arrangement can be reversible between the two control conditions, depending on a difference variable assigned to the actual variable and the command variable. The valve arrangement is preferably adjustable depending on the difference or differential value of a third control condition where the compressed power cylinder arrangement is essentially pneumatically sealed or sealed pneumatically-tight. The control valve and/or the positioning servo arrangement can be designed with the pneumatic power cylinder arrangement corresponding to the control valve or the positioning servo arrangement of the operation device described above.

The latter also applies in general to the operation device with the compressed power cylinder arrangement according to the present invention. The operation device with the compressed power cylinder arrangement can be designed with the pneumatic power cylinder arrangement according to the operation device described above. The constructive details regarding the pneumatic power cylinder arrangement can be applied without problem to the compressed power cylinder arrangement, i.e., the compressed power cylinder arrangement is designed like the pneumatic power cylinder arrangement.

The present invention furthermore relates to an operation cylinder constructional unit, especially for an operation device according to the present invention. The operation cylinder constructional unit includes a compressed power cylinder arrangement, especially a pneumatic power cylinder arrangement. The operation cylinder constructional unit furthermore preferably includes an hydraulic slave cylinder or measuring cylinder arrangement and possibly includes a control valve. At least one of the cylinder arrangements is designed to be arranged concentrically around a clutch axis. According to the present invention, the means of pressure or pneumatic power cylinder arrangement is designed to correspond to the previously described pneumatic power cylinder arrangement or compressed power cylinder arrangement. The hydraulic slave cylinder or measuring cylinder arrangement is preferably designed to correspond to the previously described hydraulic slave cylinder arrangement or hydraulic measuring cylinder arrangement. The control valve is preferably designed to correspond to the previously described control valve.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in more detail below, with reference to the embodiments illustrated in the accompanying drawings, wherein:

FIG. 16A shows schematically the control loop of an embodiment of an operation device with a positioning control device; and FIG. 16B shows a command signal-desired position positional characteristic line which can serve as a basis for the positioning of the clutch release sleeve arrangement of the operation device of FIG. 16A.

DESCRIPTION OF THE PREFERRED EMBODIMENT

Figure 1:
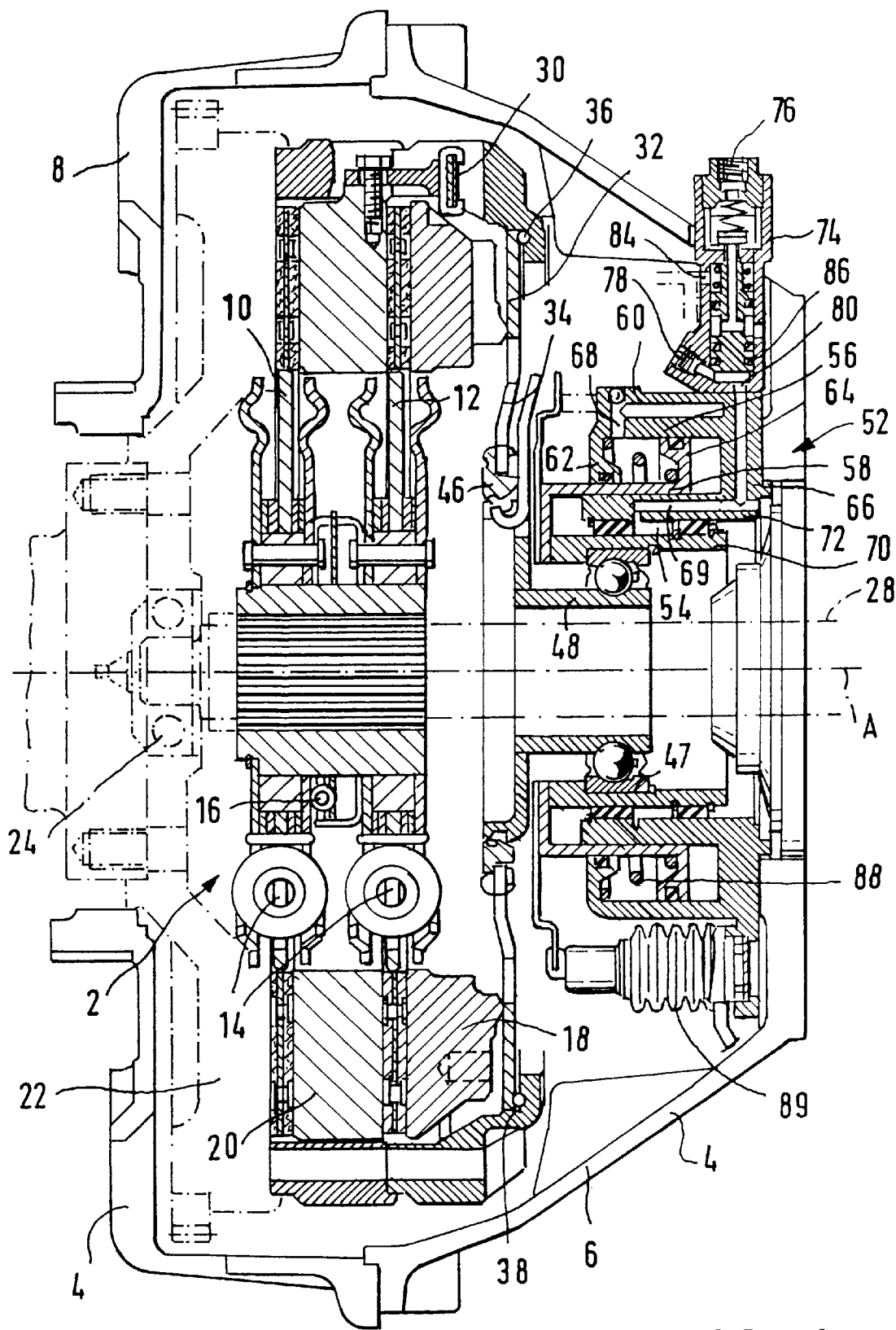
FIG. 1 shows a section through a friction clutch with an operation device according to a first embodiment, with an axial length cross section that runs through the clutch axis.

The friction clutch 2 shown in FIG. 1 can be arranged in a housing 4. The housing 4 can also be called a bell or bell-shaped housing because of its form. The housing or bell 4 can include a housing segment 6 which can be formed by a wall segment of a transmission (not shown). Another segment 8 of the housing 4 can be formed by a housing wall segment of a motor (not shown).

The friction clutch 2 is preferably a pulled two disk clutch of conventional construction, which, as it is well known in the art, makes a detailed explanation of the clutch 2 superfluous. Therefore, important components of the clutch 2 and components assigned to the clutch 2 are only briefly mentioned. The clutch 2 can include two clutch disks 10 and 12 to which a load damper 14 and a no-load damper 16 have been assigned. The clutch 2, furthermore, can include a pressure plate 18, which pressure plate 18 can be arranged on the transmission-side of the clutch 2, and an interposition pressure plate 20, which interposition pressure plate 20 can be arranged between the two clutch disks 10, 12. A motor-side flywheel 22 is indicated in FIG. 1 by dashed lines. Also indicated by dashed lines in FIG. 1 are a pilot sleeve 24 and an input gear shaft 28. The input gear shaft 28 can be non-rotationally connected to the clutch disks 10 and 12.

The pressure plate 18 can be biased in the direction of the transmission with tangential leaf springs 30. When the clutch 2 is in the engaged position, a membrane spring 32 can press the pressure plate 18 against the transmission-side clutch disk 12 and the transmission-side clutch disk 12 against the interposition pressure plate 20. In addition, interposition pressure plate 20 can then be pressed against the motor-side clutch disk 10 and the clutch disk 10 against the flywheel 22. The membrane spring 32 can have several membrane spring tongues 34. The membrane spring tongues 34 can extend to the radial inside in the direction of the input gear shaft 28. The radial inner free ends of the membrane spring tongues 34 can be attached to or can interact with a clutch release ring or clutch release sleeve ring 46 of a clutch release sleeve arrangement 48. The clutch release sleeve arrangement 48 can rotate with the clutch 2. Along the radial outer periphery, the membrane spring 32 can be supported in the direction of the transmission by an actual clutch housing 38 through a back-up ring or support ring 36. The clutch housing 38 can rotate with the pressure plates 18 and 20 and the flywheel 22.

To operate, i.e., to disengage the clutch 2, the free ends of the membrane spring tongues 34 can be pulled in the direction of the transmission when the clutch release ring 46 is displaced in the direction of the transmission by an operation cylinder constructional unit 52, which constructional unit 52 will be explained in more detail below. The pressure plate 18 is then no longer pressed against the clutch disk 12 by the membrane spring 32 and can be displaced away from the flywheel 22 in the direction of the transmission by the tangential leaf springs 30, which tangential leaf springs 30 can also be called lifting springs, so that the friction between the clutch disks 10, 12, the flywheel 22, and the pressure plates 18, 20 is essentially canceled out.

The following now describes the clutch release sleeve arrangement 48 and the operation cylinder constructional unit 52. The operation cylinder constructional unit 52 can have an hydraulic slave ring cylinder 54 and a pneumatic power ring cylinder 56. The pneumatic power ring cylinder 56 can be formed by two ring cylinder walls 58 and 60, which ring cylinder walls 58, 60 can extend equiaxially in radial distance (coaxial to the clutch axis A), and can be axially displaced against each other. Each ring cylinder wall 58, 60 can have for the delimitation of the pneumatic power ring cylinder 56 in the axial direction an annular face wall 62 or 64. The annular face walls 62, 64 can extend to the other ring cylinder wall 58, 60 and be formed integrally with the ring cylinder wall 60, 58. On their free circumferential edge, each of the face walls 62, 64 has a packing ring, washer or gasket, which packing ring rests sealingly on the other ring cylinder wall 58, 60, as is shown in FIG. 1.

In other words and in accordance with one possible embodiment, the pneumatic power ring cylinder 56 can be formed by the ring cylinder walls 58, 60. The ring cylinder wall 58 and the ring cylinder wall 60 can be arranged parallel to the clutch axis A and to each other. The ring cylinder wall 58 and the annular face wall 64 can be made in one integral piece. The annular face wall 64 can extend from the ring cylinder wall 58 to the ring cylinder wall 60 to form one end of the pneumatic power ring cylinder 56. The ring cylinder wall 60 and the annular face wall 62 can also be made in one integral piece. The annular face wall 62 can extend from the ring cylinder wall 60 to the ring cylinder wall 58 to form a second end of the pneumatic power ring cylinder 56.

The ring cylinder wall 60 can be part of a stationary body part 66, which body part 66 is attached to the housing or bell-shaped housing 4. The body part 66 can have borings 68, which borings 68 serve as pneumatic lines and end in the ring cylinder cavity of the pneumatic power ring cylinder 56.

The axially movable ring cylinder wall 58 is axially guided on a ring-shaped or cylindrical wall segment of the body part 66 and is rigidly connected to another axially movable and equiaxial ring cylinder wall 70. The ring cylinder wall 70 can have on its inside circumference a clutch release ring 47 that does not rotate when the clutch 2 rotates.

On its transmission-side end portion, the ring cylinder wall 70 can have an annular packing unit or washer which extends radially outwards. The packing unit can rest sealingly on a stationary and equiaxial radial outer opposite ring cylinder wall 72 of the body part 66. On its motor-side end portion, the ring cylinder wall 72 can have another radial inner annular packing unit, which packing unit rests sealingly on the radial outside circumference of the ring cylinder wall 70.

The ring cylinder walls 70 and 72 and the stated annular packing units can delimit the ring cylinder cavity of the hydraulic slave ring cylinder 54. The hydraulic slave ring cylinder 54 can also be formed by the stationary ring cylinder wall 72 of the body part 66, the axially displaceable ring cylinder wall 70, which ring cylinder wall 70 is rigidly connected to the ring cylinder wall 58 of the pneumatic power ring cylinder 56, and the stated annular packing units. The body part 66 can have other borings 69, which borings 69 serve as hydraulic channels and end in the ring cylinder cavity of the hydraulic slave cylinder 54.

On the operation cylinder constructional unit 52, which constructional unit 52 can include the hydraulic slave ring cylinder 54, the pneumatic power ring cylinder 56, and thus the body part 66, a control valve 74 is detachably mounted. The control valve 74 can have a compressed air connection 76. The compressed air connection 76 can be pneumatically connected to a compressed air source (not shown). The control valve 74 can also have an hydraulic connection 78. The hydraulic connection 78 can be hydraulically connected to a pedal-operated master cylinder (not shown). The control valve 74 can further have a compressed air outlet, which air outlet is not shown in FIG. 1, and an hydraulic outlet 80. The hydraulic outlet 80 can be connected through the borings 69 with the ring cylinder cavity of the hydraulic slave ring cylinder 54. The same applies to the compressed air outlet of the control valve 74. The compressed air outlet can be connected through the borings 68 with the ring cylinder space of the pneumatic power ring cylinder 56. The hydraulic outlet 80 and the hydraulic connection 78 may be connected by hydraulic chamber 86 of the control valve 74, which hydraulic chamber 86 can represent a control input of the control valve 74, independent of the control condition of the control valve 74 in hydraulic connection. The compressed air outlet is in pneumatic connection with the compressed air connection 76 or with a pressure compensation opening 84 to the inside of the bell-shaped housing 4, depending on the control condition of the control valve 74.

In other words and in accordance with at least one possible embodiment of the present invention, the hydraulic fluid in the hydraulic chamber 86 can be used as a control input to the control valve 74. The control input from the hydraulic chamber 86 can be independent of any operating position of the control valve 74.

The functioning method of the control valve 74 is explained in detail in connection with the embodiment of FIG. 6, where a similar control valve is provided. It may be anticipated at this point, however, that the control valve 74 works according to the so-called pressure balance principle. The control valve 74 can connect the compressed air connection 76 and the compressed air outlet when the hydraulic pressure in the hydraulic chamber 86, which hydraulic pressure forms the control input, is increased compared to a desired pressure. The control valve 74 can connect the compressed air outlet and the pressure compensation opening 84 when the hydraulic pressure in the hydraulic chamber 86 falls below a desired pressure. If the hydraulic pressure in the hydraulic chamber 86 corresponds to the desired pressure or to a desired pressure range, the compressed air outlet is closed, i.e., the cylinder ring cavity of the pneumatic power ring cylinder 56 is closed toward the outside and the compressed air source.

FIG. 1 shows clearly that the pneumatic power ring cylinder 56 and the hydraulic slave ring cylinder 54 may be mechanically coupled in such a manner that an increase in the volume of the ring cylinder cavity of the pneumatic power ring cylinder 56 is only possible if there is a simultaneous volume increase in the ring cylinder cavity of the hydraulic slave ring cylinder 54, and vice versa. The same applies to a decrease of volume of the ring cylinder space of the hydraulic slave ring cylinder 54 or the pneumatic power ring cylinder 56. The volume of the ring cylinder cavity of the hydraulic slave ring cylinder 54 can thus be a measure of the volume of the ring cylinder cavity of the pneumatic power ring cylinder 56 and thus for the axial position of the ring cylinder wall 58 and thus the clutch release sleeve arrangement 48.

In other words and in accordance with one possible embodiment of the present invention, the ring cylinder cavities can preferably be the areas of the hydraulic slave ring cylinder 54 or the pneumatic power ring cylinder 56 that can be used to contain a hydraulic or pneumatic medium. The volume of the ring cylinder cavity of the hydraulic slave ring cylinder 54 can be used to measure the axial position of the clutch release sleeve arrangement 48.

When the master cylinder, which is connected to the hydraulic connection 78, is operated by a clutch pedal, the pressure in the hydraulic chamber 86 increases compared to the desired pressure. Consequently, the control valve 74 allows compressed air to flow into the pneumatic power ring cylinder 56 so that its ring cavity volume increases and correspondingly displaces the ring cylinder wall 58, the ring cylinder wall 70, and thus the clutch release sleeve arrangement 48, toward the transmission. In doing so, the free ends of the membrane spring tongues 34 are preferably pulled by the clutch release ring 46 toward the transmission.

During this displacement movement, which also includes the ring cylinder wall 70, the ring cylinder cavity of the hydraulic slave ring cylinder 54 increases correspondingly. The volume changes of the two ring cylinder spaces can be in a fixed ratio. Because of the volume increase of the hydraulic slave ring cylinder 54, compressed oil can flow from the hydraulic chamber 86 toward the ring cylinder cavity of the hydraulic slave ring cylinder 54, which flow of oil will lower the pressure in the hydraulic chamber 86 until the desired pressure is reached. When the desired pressure is reached, the feed of compressed air to the pneumatic power ring cylinder 56 can be interrupted and the displacement movement of the stated components comes to a halt.

When the clutch pedal is no longer pressed, hydraulic oil can flow from the hydraulic chamber 86 through the hydraulic connection 78 toward the master cylinder. This flow can lower the pressure in the hydraulic chamber 86 below the desired pressure so that the control valve 74 now makes the connection between the cylinder ring space of the pneumatic power ring cylinder 56 and the pressure compensation opening 84. Because of the resilience, spring resistance or power of the membrane spring 32 or its membrane spring tongues 34, the clutch release sleeve arrangement 48, including all of the stated components, which clutch release sleeve arrangement 48 can be displaced in the axial direction against the force of a bias spring 88 in the ring cylinder cavity of the pneumatic power ring cylinder 56, are pulled toward the clutch 2 (i.e., toward the left in FIG. 1), which can then decrease the volumes of the ring cylinder cavities of the hydraulic slave ring cylinder 54 and the pneumatic power ring cylinder 56. Because of the volume reduction of the cylinder ring cavity of the hydraulic slave ring cylinder 54, compressed oil is pressed through the borings 69 back into the hydraulic chamber 86 so that the pressure there once again rises until the hydraulic pressure in the hydraulic chamber 86 has reached the desired pressure. In this way, the pneumatic connection between the pressure compensation opening 84 and the compressed air outlet of the control valve 74 is once again closed, so that the displacement movement of the clutch release sleeve arrangement 48 including the ring cylinder walls 58 and 70 comes to a halt.

Because of the control valve 74 and the operation cylinder constructional unit 52, an hydraulic positioning system arrangement is obtained where the hydraulic slave ring cylinder 54 represents a measuring cylinder which records the position of the clutch release sleeve arrangement 48. The measurement for the position of the clutch release sleeve arrangement 48 is the volume of the hydraulic slave ring cylinder 54. The hydraulic slave ring cylinder 54 is also called the measuring cylinder in the following. This volume of the hydraulic slave ring cylinder 54 represents an actual variable, which represents the axial position of the clutch release sleeve arrangement 48. In the same manner, the hydraulic oil volume that is displaced from the master cylinder when the clutch pedal is operated, is a measurement for the axial desired position of the clutch release sleeve arrangement 48, i.e., this displaced volume thus represents a command variable which represents the desired position of the clutch release sleeve arrangement 48.

As long as the positioning servo arrangement formed by the control valve 74, the pneumatic power ring cylinder 56, and the hydraulic slave ring cylinder or measuring cylinder 54 preferably work in the described manner, i.e., especially as long as compressed air is positioned at the compressed air connection 76, the hydraulic pressures appearing in the hydraulic system are so low that they are not sufficient to operate the hydraulic slave ring cylinder 54. The hydraulic pressures in the hydraulic system preferably do not operate the hydraulic slave ring cylinder 54 because the hydraulic thrusts or transverse loads acting on the clutch release sleeve arrangement 48 cannot actually overcome the resilience of the membrane spring 32. Thus, the hydraulic slave ring cylinder 54 serves under the above mentioned conditions only as a measuring cylinder and preferably does not contribute anything to the thrusts or loads which displace the clutch release sleeve arrangement 48.

However, in the case that the control valve 74 is not functioning, for example, because no compressed air is bearing or being supplied at the compressed air connection 76 because the motor is not running, the hydraulic slave ring cylinder 54 can be designed in such a manner that a correspondingly stronger operation of the clutch pedal, i.e., by creating a correspondingly higher hydraulic pressure, can enable an operation of the clutch 2 in the sense of an emergency operation by means of the hydraulic slave ring cylinder 54.

With respect to the embodiment of FIG. 1, it should also be mentioned that an electrical transmitter 89 can be provided which will record the position of the clutch release sleeve arrangement 48 and transmit the corresponding reading to an electronic control unit (not shown) which monitors clutch functions. The control unit can also be a control unit for an automatic or semi-automatic transmission. In this case, there is no need to provide a clutch pedal, and the master cylinder could be operated with an appropriate operation device, especially an electrical device.

With respect to the control valve 74, it should also be added that the control valve 74 is only partially arranged inside of the bell-shaped housing 4 and projects with the end that is connected to the compressed air from the bell-shaped housing 4. In the area of the control valve 74, an opening is provided in the bell-shaped housing 4, through which opening the control valve 74 can be accessed from the outside and can be detached, if necessary, without having to open the bell-shaped housing 4 as a whole, i.e., without having to separate the drive train.

With respect to the operation cylinder constructional unit 52, which can also be called a concentric servo slave cylinder, it should also be added that a compressed oil power ring cylinder can be provided instead of the pneumatic power ring cylinder 56. The control valve 74 would then have to be replaced by an appropriate hydraulically triggerable or controllable valve which is suitable to control the compressed oil feed or outflow to or from the compressed oil power ring cylinder.

Figure 2A:
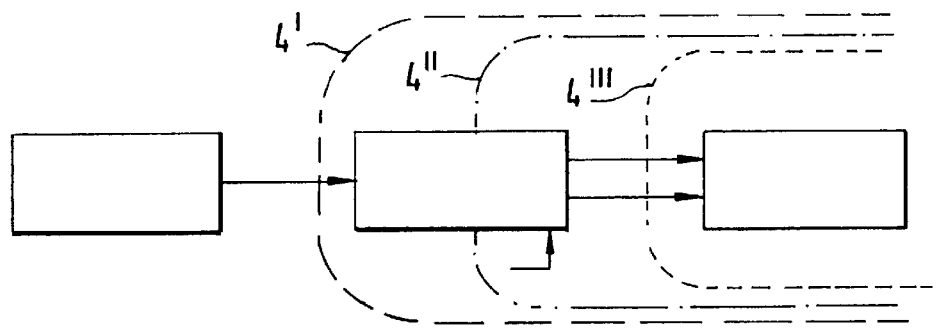
FIG. 2A shows schematically several arrangement options for the control or servo valve of an operation device with an operation cylinder constructional unit.
Figure 2B:
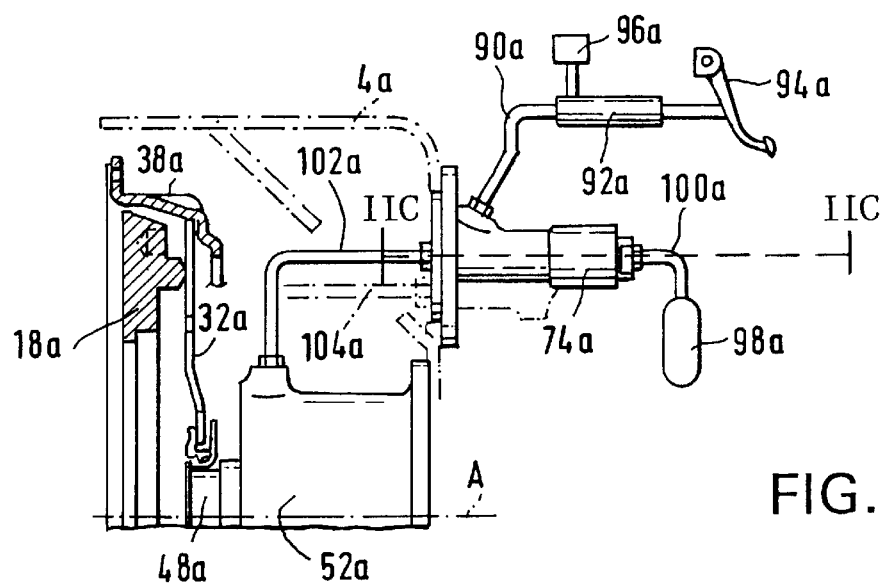
FIG. 2B shows an operation device according to a second embodiment with a control valve that is attached to the bell-shaped housing of the clutch and an operation cylinder constructional unit.
Figure 2C:
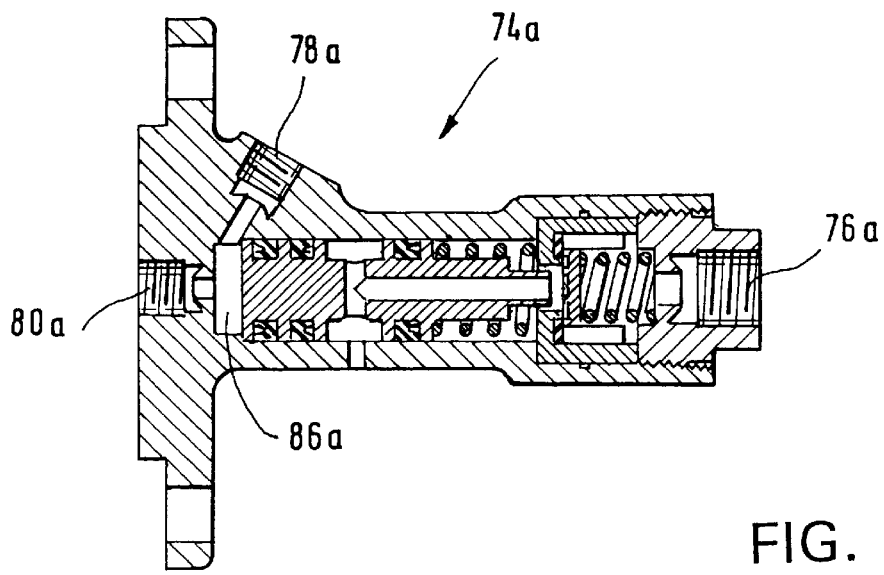
FIG. 2C shows a section through the control valve of FIG. 2B.
Figure 2D:
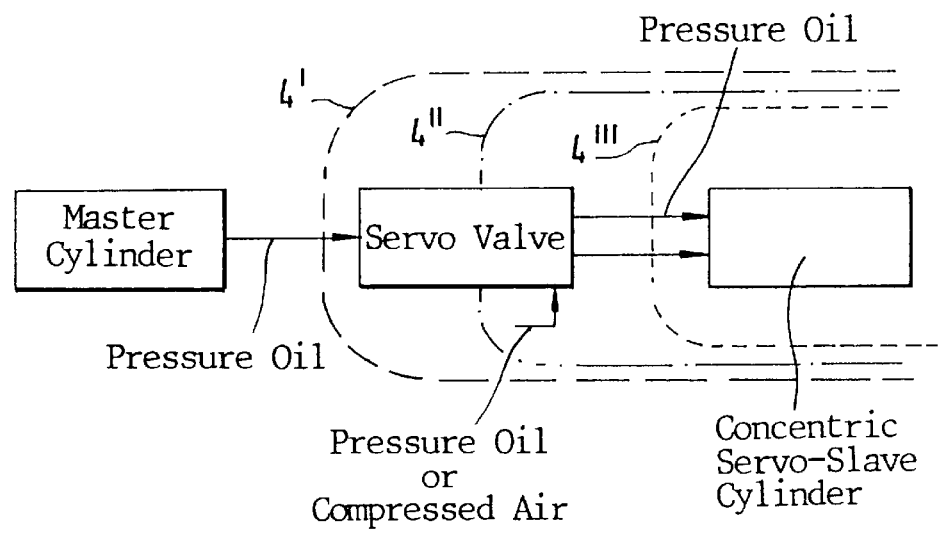
FIG. 2D shows additional features of the schematic arrangement options of FIG. 2A.

FIGS. 2A and 2D schematically show the basic construction of several embodiments of the operation device according to the present invention. The control valve (labeled as servo valve in FIG. 2D) is hydraulically triggered by means of an hydraulic master cylinder. The servo valve, which is preferably connected to a compressed air source or, if applicable, to a compressed oil source, triggers an operation cylinder constructional unit (labeled as concentric servo slave cylinder in FIG. 2D) through two connection lines. The operational cylinder constructional unit can include an hydraulic slave ring cylinder, which slave ring cylinder can serve as a measuring cylinder and/or as an emergency operation cylinder, and a compressed power ring cylinder, especially a pneumatic power ring cylinder. The two ring cylinders can be arranged concentrically to the input gear shaft. The transmission bell is symbolized in FIG. 2A for three versions by means of dashed lines 4', 4" and 4'". The servo valve can, as shown, be arranged inside the bell-shaped housing (4'), outside of the bell-shaped housing (4'") , or partially inside and partially outside of the bell-shaped housing (4"). In each position, the servo valve has to be accessible and/or detachable from the outside to enable an easy repair or maintenance of the servo valve.

In the following, further embodiments of the operation device according to the present invention or of the individual components of operation devices according to the present invention are explained. In doing so, the same reference symbols that were used for the same or analogous components in the previously described embodiments will be used in the following description of each embodiment. In doing so, reference will only be made to the difference between the embodiments which have already been explained, and the rest will be expressly incorporated by reference to the previous descriptions of the other embodiment(s). To differentiate between the embodiments, the reference symbols of the embodiments described in the following are marked with lower-case letters in alphabetical sequence, beginning with 'a'.

In the embodiment shown in FIG. 2B, the control valve 74a is removably attached to the outside of the bell-shaped housing 4a and can thus be accessed in an especially easy manner for maintenance and repair work. The control valve 74a, which is shown in section in FIG. 2C, can be constructed like the first embodiment according to FIG. 1. An hydraulic master cylinder 92a can be attached to the hydraulic connection 78a (see FIG. 2C) through an hydraulic line 90a. The master cylinder 92a can be operated by a clutch pedal 94a. The master cylinder 92a is preferably connected in a known manner to an hydraulic medium supply container 96a by a shifting boring and an hydraulic line. In this way, an automatic wear compensation of the clutch disk wear is achieved in a simple manner. A compressed air source 98a, which is shown symbolically, is connected to the compressed air connection 76a (see FIG. 2C) through a pneumatic line 100a.

The embodiment shown in FIG. 2B can also have an integrally designed operation cylinder constructional unit 52a including an hydraulic slave ring cylinder and a pneumatic power ring cylinder. The ring cylinders can be arranged concentrically to the input gear shaft or the transmission axis A. The connection between the ring cylinders and the control valve 74a can be made by two lines, namely an hydraulic line 102a and a pneumatic line 104a, which lines 102a, 104a lead from the operation cylinder constructional unit 52a to the control valve 74a. The pneumatic line 104a, which cannot be actually seen when looking at FIG. 2B, is represented as being staggered (corresponding to a control valve that is turned by 90 degrees, dashed outline line of the valve).

In other words and in accordance with one possible embodiment of the present invention, the embodiment shown in FIG. 2B can also have an integrally designed operation cylinder constructional unit 52a including an hydraulic slave ring cylinder 54 (see FIG. 1) and a pneumatic power ring cylinder 56 (see FIG. 1). The ring cylinders 54, 56 can be arranged concentrically to the input gear shaft 28 (see FIG. 1) or the clutch axis A. The connection between the ring cylinders 54, 56 and the control valve 74a can be made by two lines, namely an hydraulic line 102a and a pneumatic line 104a, which lines 102a, 104a lead from the operation cylinder constructional unit 52a to the control valve 74a. The pneumatic line 104a, which cannot be actually seen when looking at FIG. 2B, is represented as being staggered (corresponding to a control valve that is turned by 90 degrees and is shown in FIG. 2B by a dashed outline of the valve).

The clutch shown only partially in FIG. 2B is a pulled clutch, as in the embodiment in FIG. 1. The use of the illustrated operation device in the case of a pressed clutch is also possible.

Figure 3:
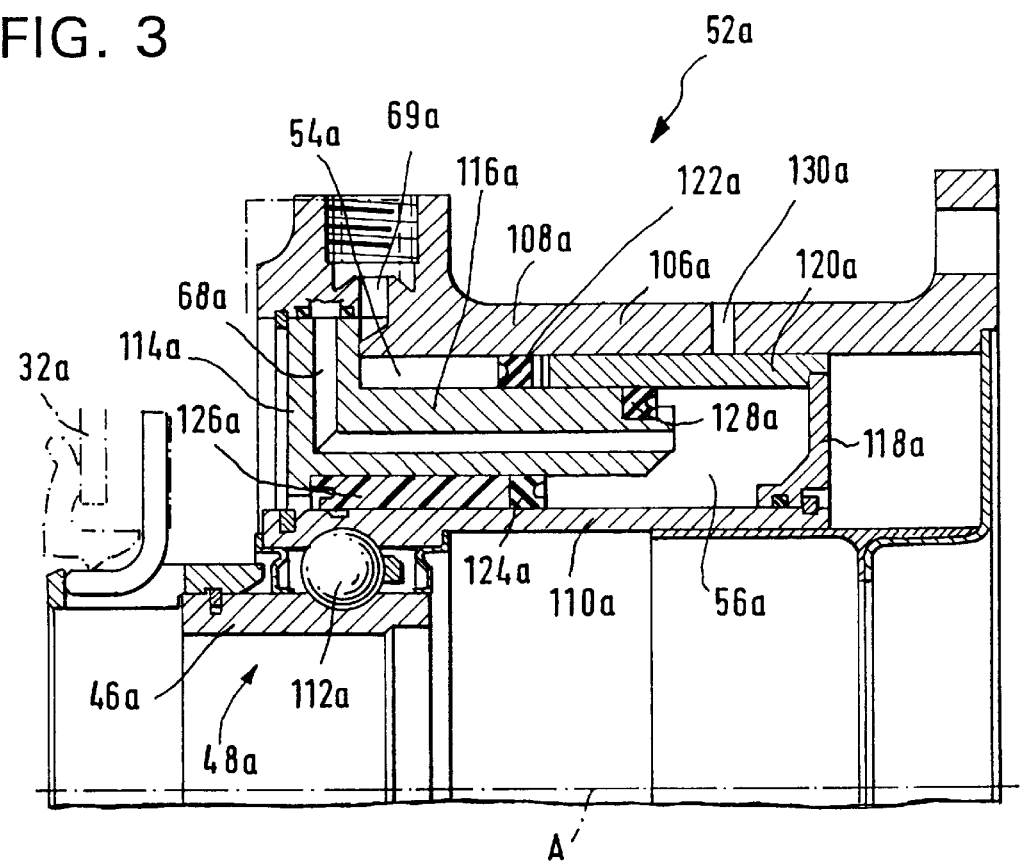
FIG. 3 shows an embodiment of an operation cylinder constructional unit having a compressed power ring cylinder, especially a pneumatic power ring cylinder, and an hydraulic slave ring cylinder.

FIG. 3 shows an advantageous embodiment of an operation cylinder constructional unit which can be used in the case of the operation device in FIG. 2B (for this reason, reference symbols with the letter 'a' are used here as well). The operation cylinder constructional unit 52a (which is suitable for the operation of a pulled clutch) can include a body part 106a. The body part 106a can be stationary in the bell-shaped housing and can have a ring cylinder wall 108a. The ring cylinder wall 108a can be coaxial to the clutch axis A or the input gear shaft. An axially displaceable ring cylinder wall 110a, which is also coaxial to the clutch axis A, has on its clutch-side end segment on the radial outer periphery side a roller bearing or anti-friction bearing 112a by means of which the clutch release or disengagement ring 46a, which clutch release ring 46a rotates with the clutch, is rotatably positioned at the ring cylinder wall 110a.

A ring space or cavity can be formed between the ring cylinder wall 108a and the more radially inner ring cylinder wall 110a. A ring cylinder wall segment 116a of a special intermediate element 114a, which intermediate element 114a is concentric to the clutch axis A and is positioned with contact at the body part 106a, extends from the clutch-side into the ring space. The radial outer circumference surface of the ring cylinder wall 108a and the radial inner circumference surface of the ring cylinder wall segment 116a are each preferably spaced a radial distance from each other so that each delimits one ring space or ring space segment in the axial position of the ring cylinder wall 110a shown in FIG. 3.

In another possible embodiment of the present invention, the radial inner surface of the ring cylinder wall 108a and the radial inner surface of either the ring cylinder wall segment 116a or the special intermediate element 114a are preferably spaced a radial distance from each other. The spacing between the ring cylinder wall 108a and the special intermediate element 114a can permit the ring space to have different volumes as the ring cylinder wall 110a moves along the clutch axis A.

On its far (transmission-side) end from the clutch release sleeve arrangement 48a, the ring cylinder wall 110a has at the outer circumference face an annular face wall 118a, which face wall 118a reaches to the other ring cylinder wall 108a. The face wall 118a is rigidly connected to the transmission-side end of a ring cylinder wall 120a. The ring cylinder wall 120a can be concentric to the clutch axis A. The radial dimensions of the ring cylinder wall 120a are preferably such that the ring cylinder wall 120a fits between the ring cylinder wall 108a and the ring cylinder wall segment 116a. Arranged in the ring space between the ring cylinder wall segment 116a and the ring cylinder wall 108a, on the side of the ring cylinder wall 120a which is closer to the clutch, can be a packing ring 122a. The sealing lips of the packing ring 122a point in the direction of the clutch. Together with the ring cylinder wall 120a, the packing ring 122a forms a ring piston of an hydraulic slave ring cylinder 54a which is delimited by said ring piston, the ring cylinder wall 108a, and the intermediate element 114a.

The axially displaceable ring cylinder wall 120a, which ring cylinder wall 120a serves as the ring piston, the face wall 118a, the ring cylinder wall 110a, the ring cylinder wall segment 116a and a packing ring 124a, which packing ring 124a is supported in the direction of the clutch by an annular support element arranged between the ring cylinder wall segment 116a and the ring cylinder wall 110a, can further delimit a pneumatic power ring cylinder 56a, which pneumatic power ring cylinder 56a is sealed toward the outside and, by means of another packing ring 128a, especially toward the hydraulic slave ring cylinder 54a. To achieve a better separation between the pneumatic and the hydraulic systems, the ring cylinder wall 108a preferably has a ventilation or aeration opening 130a where the air which escapes from the pneumatic ring space and passes the packing ring 128a can reach the ventilation opening 130a through channels provided between the ring cylinder wall 120a and the packing ring 122a and through a free ventilation path between the ring cylinder wall 120a and the ring cylinder wall 108a.

In another possible embodiment of the present invention, an annular support element 126a can be used to support the packing ring 124a. The annular support element 126a can be positioned between the ring cylinder wall 110a and ring cylinder wall segment 116a. The annular support element 126a can also be supported by the special intermediate element 114a.

The ring cylinder wall segment 116a can also serve as a stationary ring piston for the pneumatic power ring cylinder 56a (which ring cylinder 56a has axially movable cylinder walls 110a and 120a) . Because both the ring cylinder wall 120a and the ring cylinder wall segment 116a have a double function, and serve on the one hand as the ring piston of a ring cylinder, and on the other hand as a delimitation of each opposite ring cylinder space, the operation cylinder constructional unit 52a shown in FIG. 3 is especially compact.

The pneumatic air feed to the pneumatic power ring cylinder 56a can be obtained through channels or borings 68a in the intermediate element 114a. The feed of compressed oil to the hydraulic master ring cylinder occurs through a boring 69a in the body part 106a.

In another possible embodiment of the present invention, the feed of compressed oil to the hydraulic slave ring cylinder 54a can occur through borings 69a in the body part 106a.

The above description indicates that in the operation cylinder constructional unit 52a as well, the volumes of the two ring cylinders 54a, 56a can only be simultaneously increased or simultaneously decreased. Thus, the hydraulic slave ring cylinder 54a can serve as a measuring cylinder, as in the first embodiment, and is designed to enable an emergency operation of the clutch.

Figure 4A:
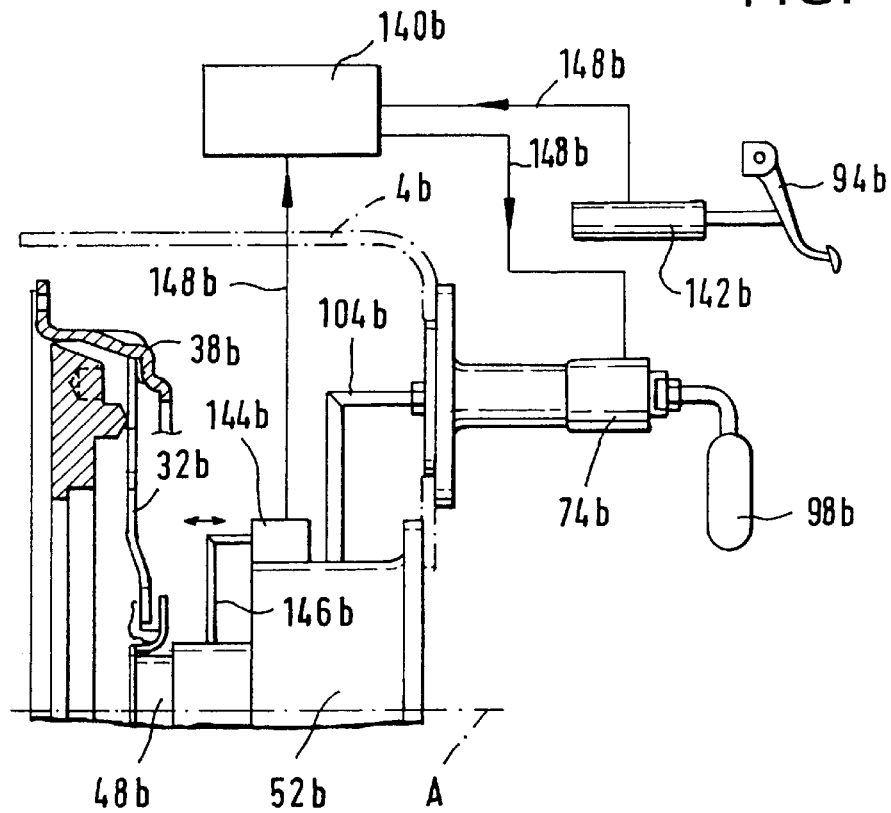
FIG. 4A shows an embodiment of the operation device corresponding to FIG. 2B.

FIG. 4A shows another embodiment of an operation device according to the present invention. The operation cylinder constructional unit 52b also has a pneumatic power ring cylinder which is concentric to the clutch axis A, but it does not necessarily also have an hydraulic slave ring cylinder. In this embodiment, the control valve 74b is preferably triggered electrically by an electronic control element 140b. The control element 140b can receive from a desired value transmitter 142b, which desired value transmitter 142b can be operated with the clutch pedal 94b, an electronic signal representing a desired value. The desired value transmitter 142b can, in one embodiment, include a potentiometer. The control element 140b can receive from an electrical transmitter 144b an electrical instantaneous value signal which represents the axial position of the clutch release sleeve arrangement 48b. For this purpose, the electrical transmitter 144b is preferably coupled to the clutch release sleeve arrangement 48b through a rod assembly, gears, rods or linkage of bars 146b. The electrical connection lines between the control unit 140b, the desired value transmitter 142b, the electrically triggerable control valve 74b and the electric transmitter 144b are shown by lines 148b, which lines 148b represent electrical lines. Where the arrows indicate the signal flow direction, the control unit 140b triggers the control valve 74b in such a manner that the axial position of the clutch release sleeve arrangement 48b is adjusted to the desired position defined by the desired value signal. Thus, an electrical control circuit, regulator circuit or servoloop can be obtained.

Figure 4B:
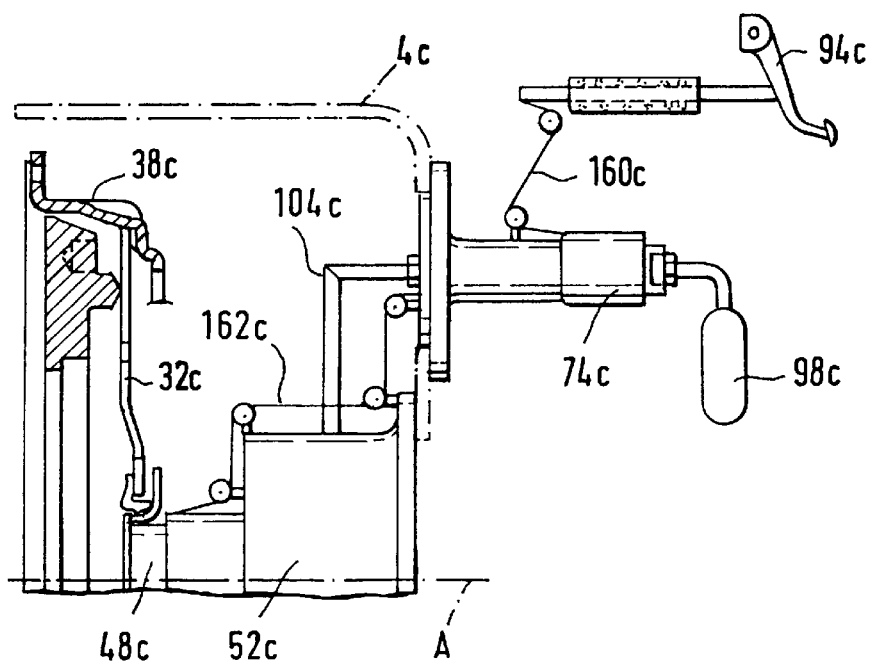
FIG. 4B shows an embodiment of the operation device corresponding to FIG. 2B.

FIG. 4B shows another embodiment of the present invention. In this embodiment, the operation cylinder constructional unit 52c can again include a pneumatic power ring cylinder, but not necessarily also an hydraulic slave ring cylinder. The control valve 74c, which is attached to the outside of the bell-shaped housing 4c as in the embodiment of FIG. 2B and the embodiment of FIG. 4A, is operated in the embodiment of FIG. 4B by a Bowden-control or Bowden cable wire 160c. The Bowden-control 160c can be operated by means of the clutch pedal 94c, whereby the length of the Bowden-control core or traction rope that is pulled in at the time of operating the clutch pedal 94c can represent the desired or reference value for the disengagement of the clutch release sleeve arrangement 48c. The axial position of the clutch release sleeve arrangement 48c is preferably scanned mechanically by means of another Bowden-control 162c and is coupled back to the control valve 74c, where the comparison between the instantaneous value and the desired value or reference value, i.e., in this case the comparison between two paths or path comparison is made.

For example, the Bowden-control 160c can engage at a spring-biased valve seat of a valve gate, which valve gate is axially movable in the valve seat. The Bowden-control 160c can axially displace the valve gate when the clutch pedal 94c is being operated, which effects the opening of a pneumatic connection between the compressed air source 98c and the pneumatic line 104c. The clutch release sleeve arrangement 48c can then be pulled in the direction of the transmission. The Bowden-control 162c can engage at the valve gate, which valve gate is spring-biased in an opposite direction, in such a manner that the Bowden-control core, which yields toward the transmission when the clutch release sleeve arrangement 48c is disengaged, permits the valve gate and the valve seat to return to their original relative axial positions until the pneumatic connection between the compressed air source 98c and the pneumatic line 104c closes again. The same applies when the clutch pedal 94c is being released and returns back to its original position due to resilience. The Bowden-controls 160c, 162c are symbolized in FIG. 4B by traction ropes guided on rollers.

The previously described embodiments applied to operation devices for pulled clutches or to operation cylinder constructional units for such operation devices. In the following, FIG. 5 describes an embodiment of an operation cylinder constructional unit 52d for a pressed in clutch.

The operation cylinder constructional unit 52d can also have a pneumatic power ring cylinder 56d which is concentric to the clutch axis A. The operation cylinder constructional unit 52d can also have a corresponding concentric hydraulic slave ring cylinder 54d which is arranged radially more inward toward the clutch axis A. Both ring cylinders 54d, 56d can be designed with stationary cylinder walls and with a ring piston element 170d or 172d each. The ring piston element 170d, 172d can be moved with respect to the cylinder walls.

The stationary components of the operation cylinder constructional unit 52d can include, primarily, three ring components 174d, 176d and 178d. The ring components 174d, 176d, 178d can be arranged coaxial to the clutch axis A and coaxial toward each other. Each of the ring components 174d, 176d, 178d can have a ring cylinder wall or ring cylinder wall segment 180d, 182d or 184d. The ring cylinder wall segment 180d, 182d, 184d can be coaxial to the clutch wall and coaxial toward the ring components 174d, 176d, 178d. The radially farthest inner stationary ring component 178d is preferably designed like a tube or sleeve with the ring cylinder wall 184d.

The ring piston element 172d of the pneumatic power ring cylinder 56d can be sealed and movably arranged in the axial direction between the radially farthest outside ring cylinder wall 180d of the radially farthest outside ring component 174d and the radial center ring cylinder wall 182d of the radial center ring component 176d. The ring piston element 172d can include a ring cylinder wall 190d. The ring cylinder wall 190d can also be coaxial to the clutch axis A and can be positioned in contact with a packing ring 186d and a sliding ring 188d at the radial outer periphery face of the ring cylinder wall 182d. An annular face wall 192d, which face wall 192d is designed integrally with the ring cylinder wall 190d, can extend at the clutch-side end of the ring cylinder wall 190d radially inward toward the clutch axis A. The face wall 192d can include the clutch release sleeve arrangement 48d. The clutch release sleeve arrangement 48d can include a stationary clutch release sleeve ring 47d and a ball holder 112d as well as a second sleeve ring 46d. The second sleeve ring 46d can be rotatably positioned at the stationary clutch release sleeve ring 47d and can rotate with the clutch. The sleeve ring 46d is preferably identical to the clutch release ring 46d.

In another possible embodiment of the present invention, the second sleeve ring 46d can be designed substantially identical to the clutch release sleeve ring 47d.

Figure 5:
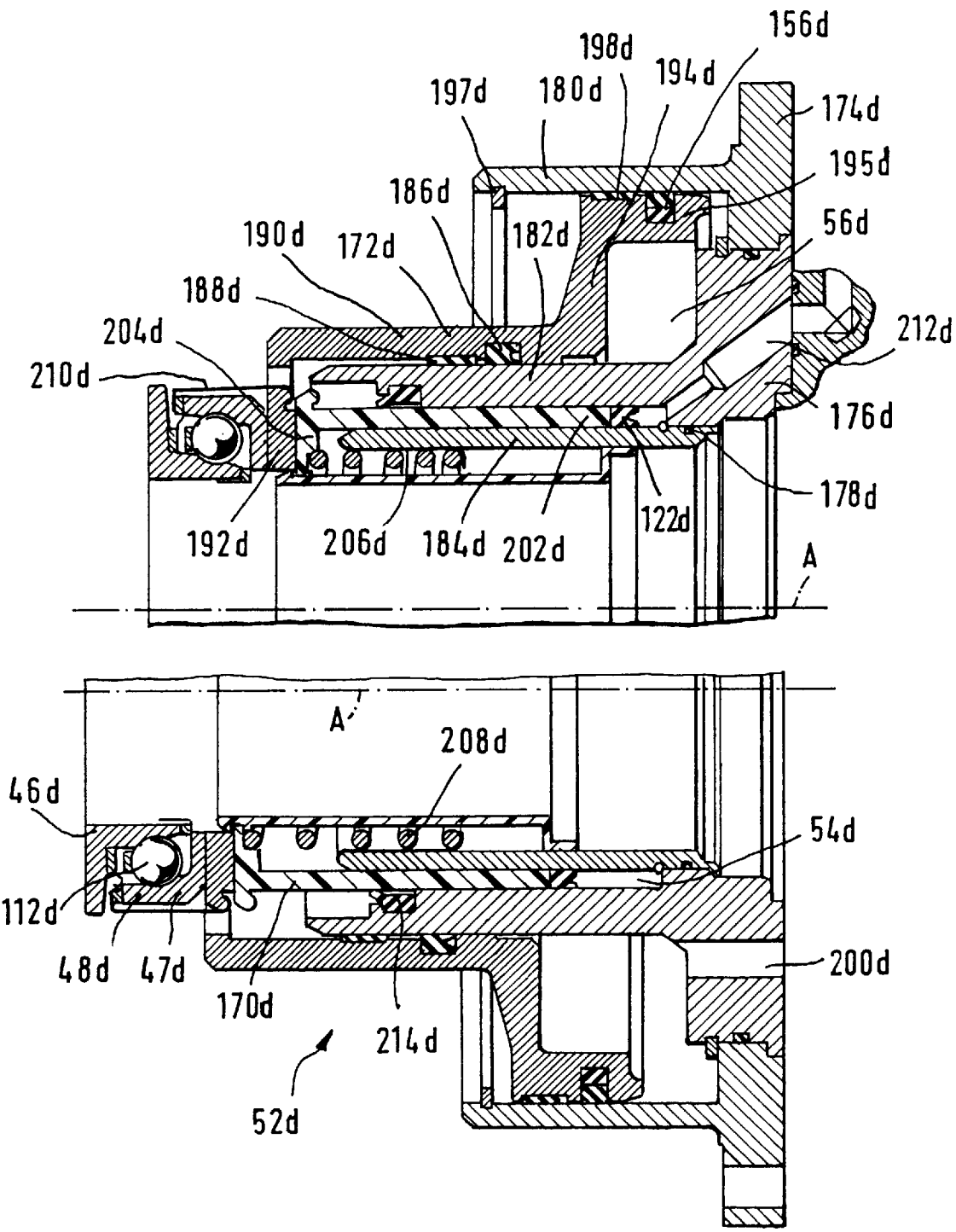
FIG. 5 shows a section of another embodiment of an operation cylinder constructional unit having a compressed power ring cylinder, especially a pneumatic power ring cylinder, and an hydraulic slave ring cylinder.
Figure 5A:
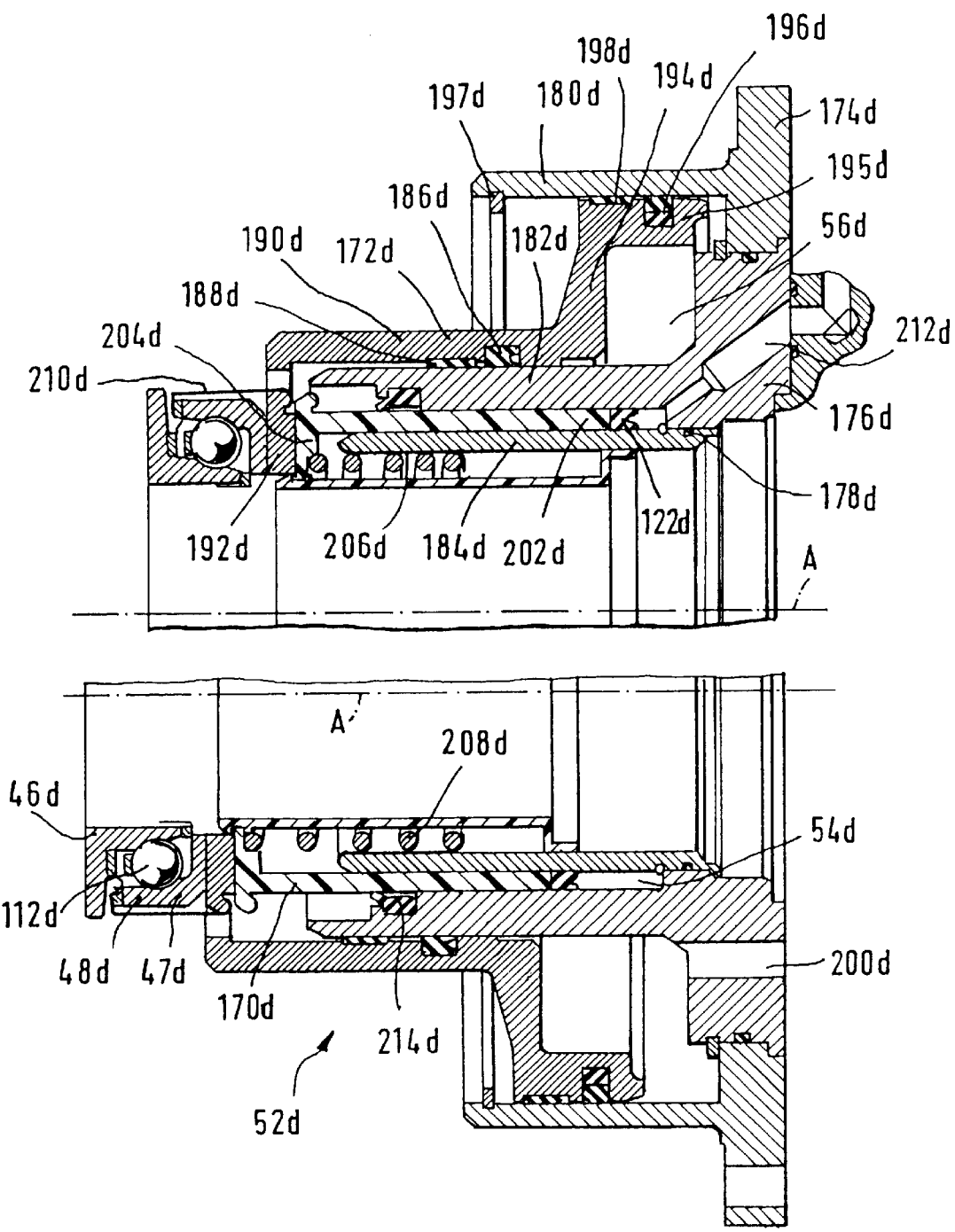
FIG. 5A shows additional features of the operation cylinder constructional unit of FIG. 5.

At its transmission-side end, the ring cylinder wall 190d can be integrally designed with a face wall 194d, which face wall 194d can extend radially outside toward the stationary ring cylinder wall 180d, and a ring cylinder wall segment 195d, which ring cylinder wall segment 195d can be coaxial to the clutch axis A and can extend toward the transmission at the radial outer end of the face wall 194d. The ring cylinder wall segment 195d can be positioned with contact at the inner periphery face of the ring cylinder wall 180d by means of an annular packing unit 196d (see FIG. 5A) and an annular sliding ring 198d, where the wall segment 195d acts as a seal and is axially displaceable. The feed of compressed air (or possibly an alternative means of pressure) can be achieved through a boring 200d in the stationary ring component 176d from the side of the transmission. FIG. 5 and the preceding description show that the ring cylinder cavity of the pneumatic power ring cylinder 56d is delimited by the ring piston element 172d and the two stationary ring components 174d and 176d. The piston function can essentially be performed by the face wall 194d. The axial movement range of the ring piston element 172d can be delimited by a stop ring 197d at the ring component 174d.

In another possible embodiment of the present invention, a seal or gasket 156d can be used in a manner similar to annular packing unit 196d. The seal 156d can be placed between the ring cylinder wall 180d and the face wall 194d.

A ring space is preferably formed between the ring cylinder wall 182d and the ring cylinder wall 184d. The ring space can have a sleeve or tube-like ring cylinder wall segment 202d of the ring piston element 170d. The ring cylinder wall segment 202d can be coaxial to the clutch axis A and displaceable in the axial direction. On the transmission-side of the ring cylinder wall segment 202d, the ring space can have a packing ring 122d which, in conjunction with the ring cylinder wall segment 202d, performs a piston function for the hydraulic slave ring cylinder 54d. FIG. 5 shows that the ring space of the hydraulic slave ring cylinder 54d is preferably delimited by the packing ring 122d and the stationary ring components 176d and 178d. For this purpose, appropriate sealing means (for example, a packing ring) which act between the ring component 178d and the ring component 176d are preferably provided. The same can apply for the sealing of the ring cylinder space of the pneumatic power ring cylinder 56d. For this purpose, appropriate means of sealing, especially an appropriate packing ring, can be provided between the ring component 174d and the ring component 176d.

On its clutch-side end, the ring piston element 170d preferably has an annular face wall segment 204d. The annular face wall segment 204d can extend slightly radially outward and somewhat more radially inward. A pressure spring 208d, which pressure spring 208d can be supported at the ring component 178d by an annular intermediate element 206d that is S-shaped in cross-section, can bias the ring piston element 170d in the direction of the face wall 192d of the other ring piston element 172d. The ring piston element 172d can support the clutch release sleeve arrangement 48d. The face wall segment 204d stops at the face wall 192d and thus biases the ring piston element 170d toward the clutch. In this way, the ring piston element 170d of the hydraulic slave ring cylinder 54d always follows the movement of the ring piston element 172d of the operating power ring cylinder 56d. As with the embodiments in FIGS. 1 and 3, the hydraulic slave ring cylinder 54d can therefore serve as a measuring cylinder for a control valve, which control valve can be connected to the operation cylinder constructional unit 52d, for example, on the outside of the bell-shaped housing.

The ring piston element 170d could also be interlocked or connected by positive fit with the ring piston element 172d and the clutch release sleeve arrangement 48d. For example, a clamp-like holding ring 210d, as is shown in FIG. 5, which holding ring 210d serves to fasten the stationary clutch release sleeve ring 47d at the ring piston element 172d and is for this purpose interlocked with the clutch release sleeve ring 47d and the face wall 192d, could be designed in such a manner that the holding ring 210d interlocks with the face wall segment 204d of the ring piston element 170d instead of interlocking with the face wall 192d. For this purpose, the face wall segment 204d has a contact collar or shoulder for an appropriate holding ring, which contact collar is preferably designed exactly like a contact collar of the face wall 192d for the holding ring 210d.

As in the embodiments of FIGS. 1 and 3, the hydraulic slave ring cylinder 54d can be designed to serve for the emergency operation of the clutch when loaded with sufficient hydraulic pressure. The feed of the pressure oil to the hydraulic slave ring cylinder 54d feeds through a boring 212d in the stationary ring component 176d from the side of the transmission.

It is advantageous that effective sliding elements (such as the sliding rings 188d and 198d) and wiping elements (such as the wiping ring 214d shown in FIG. 5) can be provided between the movable and the stationary components. The wiping ring 214d is located in a snap ring groove in the inner circumference face of the ring cylinder wall 182d and its wiping lip, which wiping lip approximately extends toward the clutch, engages at the outer periphery face of the ring cylinder wall segment 202d of the ring piston element 170d.

Figure 6:
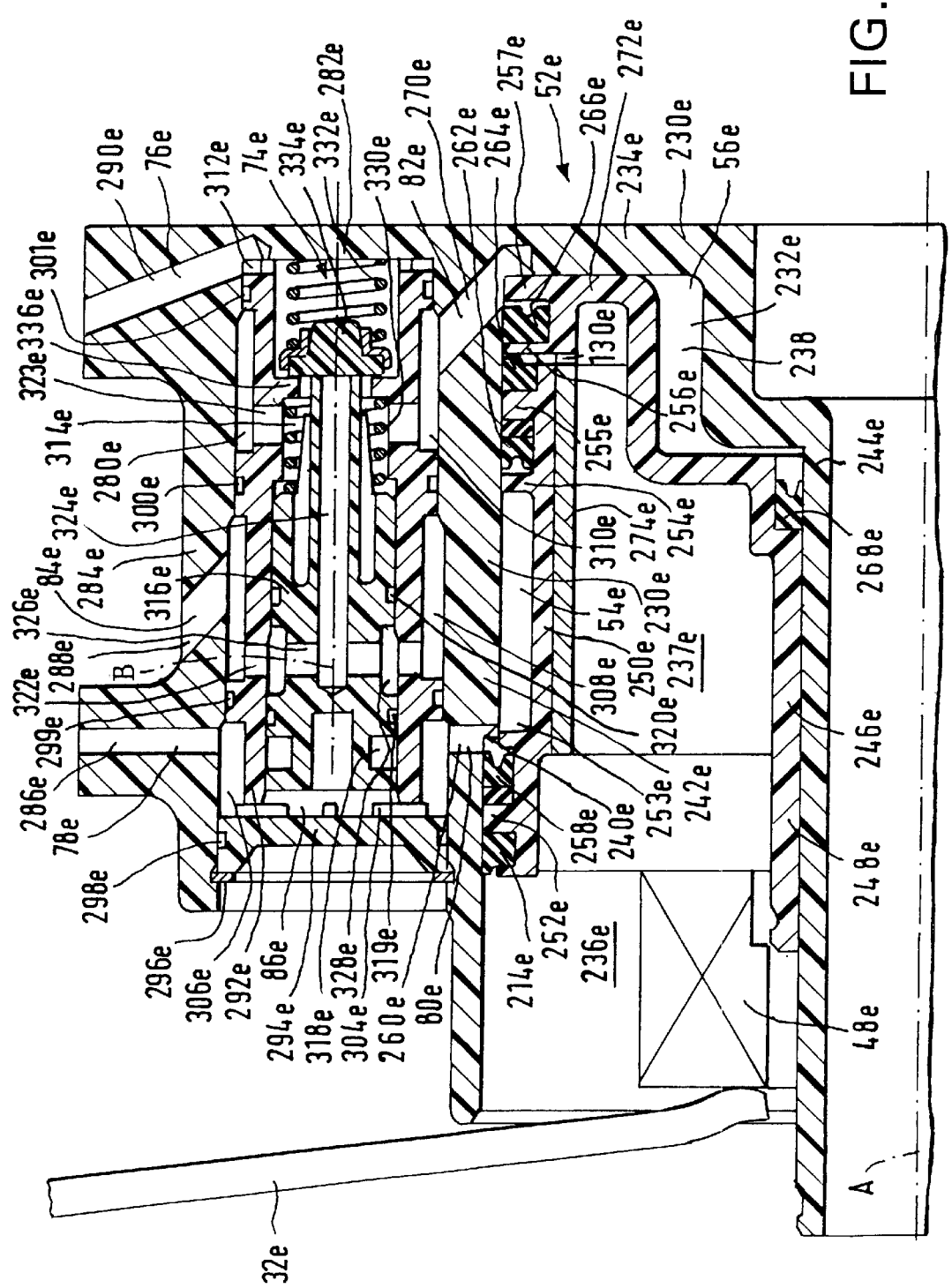
FIG. 6 shows a section of another embodiment of an operation device or operation cylinder constructional unit having a compressed power ring cylinder, especially a pneumatic power ring cylinder, and an hydraulic slave cylinder which is designed as a step cylinder and has an integrated control valve.

Another embodiment of an operation cylinder constructional unit 52e for an operation device according to the present invention is shown in FIG. 6. The operation cylinder constructional unit 52e can again be used for a pressed clutch. This operation cylinder constructional unit 52e can be constructed integrally with the control valve 74e as one constructional unit. However, the control valve 74e on the one hand and the operational cylinder arrangement on the other hand can also easily be constructed as separate constructional units which can be removably connected.

The operation cylinder constructional unit 52e can include a stationary body part 230e. The stationary body part 230e can be positioned with contact at the bell-shaped housing. The body part 230e can also have a concentric annular-cylindrical through-opening toward the clutch axis or transmission axis A for the input gear shaft (not shown). In FIG. 6, the transmission axis A is not shown with the correct radial distance to the segment of the body part 230e that is shown in FIG. 6.

Figure 6A:
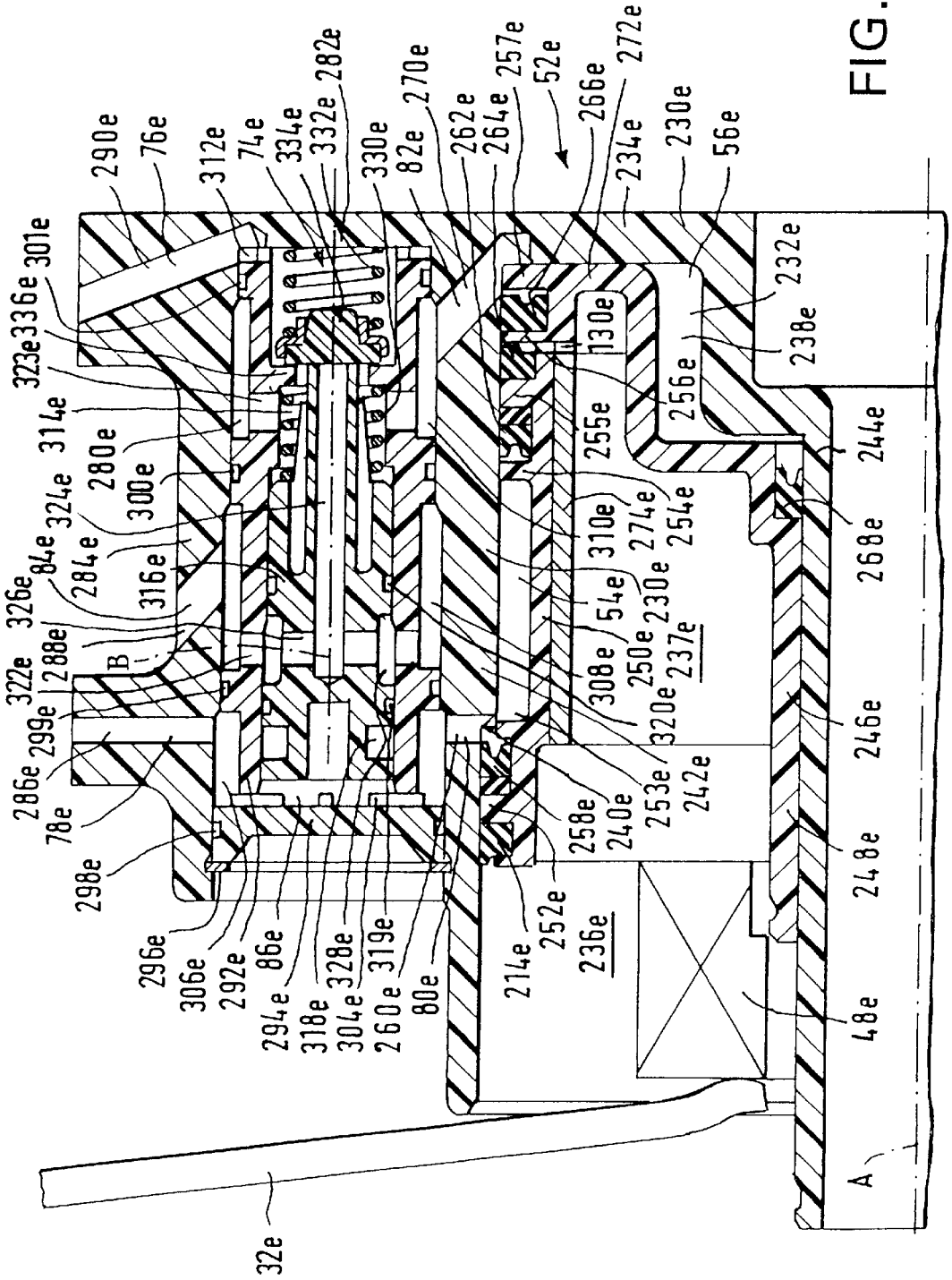
FIG. 6A shows additional features of the operation cylinder constructional unit of FIG. 6.

Toward the transmission axis A, the body part 230e can have a ring-cylindrical recess 232e. The ring-cylindrical recess 232e can be open toward the clutch and closed by a face wall segment 234e of the body part 230e toward the transmission. The radial width of the recess 232e is preferably not constant along its axial length, but rather changes step by step. From the clutch side, a segment 236e with the largest radial measurement is followed by a medium segment 237e of the recess 232e with a reduced radial measurement and finally a clutch-side end segment 238e (see FIG. 6A) of the recess 232e with the smallest radial measurement. The change of the radial dimension of the ring-cylindrical recess 232e between the segment 236e and the segment 237e can be achieved by an appropriate step 240e on a ring-cylindrical wall segment 242e of the body part 230e. The wall segment 242e delimits the recess 232e radially toward the outside and is coaxial to the clutch axis A. The step 240e can be extremely important for the function of the described embodiment of FIG. 6, as is described in more detail in the following.

In accordance with another possible embodiment of the present invention, a segment 238 can be positioned near the stationary body part 230e inside the pneumatic ring cylinder 56e.

Another step can be provided on a wall segment 244e, which wall segment 244e is coaxial to the clutch axis A, with the step causing the different radial dimensions of the segments 237e and 238e of the recess 232e. The step is of no further importance for the functioning of the operation cylinder constructional unit 52e, but the step provided on wall segment 244e enables an appropriate enlargement of the through-opening for the input gear shaft at the transmission-side end of the through-opening. For example, the appropriately radially enlarged through-opening segment can receive a bearing ring (not shown) for the input gear shaft, which bearing ring is positioned with contact at the bell-shaped housing.

A pneumatic ring piston element 246e can be arranged to be displaceable in the axial direction in the ring-cylindrical recess 232e, i.e., between the radial outer ring-cylindrical wall segment 242e and the radial inner ring-cylindrical wall segment 244e. The ring piston element 246e can include a radial inner wall segment 248e, which wall segment 248e is coaxial to the clutch axis A and largely positioned with contact at the ring-cylindrical wall segment 244e, and a radial outer ring-cylindrical wall segment 250e, which wall segment 250e is coaxial to the clutch axis A. The ring-cylindrical wall segment 250e preferably has ring collars or shoulders 252e, 253e, 254e, 255e, 256e and 257e which project radially outside. Each ring collar 252e, 253e, 254e, 255e, 256e, 257e can have a cylindrical outer circumference face which is coaxial to the clutch axis A. The outer circumference face of the ring collars 252e, 254e, 255e, 256e and 257e can serve as sliding faces. The sliding faces can be movably positioned at an appropriate inner circumference face segment of the ring-cylindrical wall segment 242e. The outer circumference faces of the ring collars 254e, 255e, 256e and 257e can be positioned with contact at the stated inner circumference face in the area of the recess segments 237e and 238e. The outer circumference face of the ring collar 252e can be positioned with contact at the stated inner circumference face in the area of the recess segment 236e and positioned an axial distance from the step 240e (i.e., on its clutch side).

In other words and in accordance with one possible embodiment of the present invention, the outer circumference faces of the ring collars 254e, 255e, 256e, and 257e can be positioned with contact at the stated inner circumference face of the ring cylindrical wall segment 242e in the area of the recess segments 237e and 238e. The outer circumference face of the ring collar 252e can be positioned with contact at the stated inner circumference face of the ring cylindrical wall segment 242e in the area of the recess segment 236e. The outer circumference face of the ring collar 252e can be positioned on the clutch side of the step 240e.

Between the ring collar 252e and the ring collar 253e that is axially closer to the transmission, a groove packing ring 258e is preferably contained in the ring piston element 246e in a circumferential groove that is axially delimited by the two ring collars 252e, 253e. The groove packing ring 258e can essentially seal a ring space formed between the ring collar 253e and the axially nearest ring collar 254e located toward the transmission. The ring space is preferably between the ring-cylindrical wall segment 242e of the body part 230e and the ring-cylindrical wall segment 250e of the ring piston element 246e in the direction of the clutch. This ring space is preferably the ring space of the hydraulic slave ring cylinder 54e of the operation cylinder constructional unit 52e. The hydraulic slave ring cylinder 54e is preferably designed as a step cylinder. For this purpose, the ring collar 253e in the shown position on the ring piston element 246e, which ring piston element 246e can be submerged as far as possible in the recess 232e (i.e., it assumes its axial position closest to the transmission), is arranged at the clutch-side of step 240e. The ring collar 253e can form a step piston for the hydraulic slave ring cylinder 54e in conjunction with the packing ring 258e, which packing ring 258e is supported at its snap ring groove, and the ring collar 252e.

In another possible embodiment of the present invention, the ring-cylindrical wall segment 250e, when the ring piston element 246e is axially located near the transmission, is arranged at the clutch-side of step 240e. The ring-cylindrical wall segment 250e can form a step piston for the hydraulic slave ring cylinder 54e in conjunction with the packing ring 258e, which packing ring 258e is supported at its snap ring groove, and the ring collar 252e.

The ring collar 253e, whose outer circumference face is preferably in alignment with the outer circumference faces of the ring collars 254e to 257e, which ring collars 254e to 257e are arranged closer to the transmission, is arranged approximately in an axial center area of a boring 260e. The boring 260e can serve as an hydraulic oil feed and hydraulic oil carrying-off, conveyance or transport boring. The boring 260e can be provided to border directly on the step 240e in the recess segment 236e and thus achieve an hydraulic connection between the ring space of the hydraulic slave ring cylinder 54e in the radial outer direction.

In other words, the boring 260e can be used to permit flow of hydraulic fluid into and out of the hydraulic slave ring cylinder 54e. The boring 260e is preferably located on the radial outer side of the hydraulic slave ring cylinder 54e.

The only effective piston face of the step piston is the ring face segment of the packing ring 258e. The ring face segment of the packing ring 258e can project beyond the ring collar 253e to the radial outside because the hydraulic pressure forces in effect at the ring collars 253e and 254e cancel each other out.

In the direction of the recess floor, i.e., in the direction of the transmission, the ring space of the hydraulic slave ring cylinder 54e is sealed by a packing ring 262e. The packing ring 262e can be contained in a snap ring groove formed between the ring collar 254e and the ring collar 255e, which collar 255e is axially closer to the transmission. Provided at the clutch-side end of the ring-cylindrical wall segment 250e is preferably a wiping element 214e. The wiping element 214e can engage at the inner circumference face of the ring-cylindrical wall segment 242e of the body part 230e in the area of the recess segment 236e. Also provided at the clutch-side end of the ring-cylindrical wall segment 250e are preferably two more packing rings 264e and 266e.

In another possible embodiment of the present invention, the packing rings 264e and 266e can be provided at the transmission-side end of the ring-cylindrical wall segment 250e.

The packing rings 264e and 266e can serve to seal the pneumatic power ring cylinder 56e of the operation cylinder constructional unit 52e, which constructional unit 52e will be described in more detail below. The packing ring 264e is preferably arranged in a snap ring groove between the ring collar 255e and the ring collar 256e, which ring collar 256e is axially closer to the transmission. The packing ring 266e, which is designed as a sealing ring, i.e., with two sealing lips, can be contained in a corresponding snap ring groove between the ring collar 256e and the ring collar 257e, which ring collar 257e is located closest to the transmission. Both packing rings 264e and 266e can be in close contact with the inner circumference face of the ring-cylindrical wall segment 242e and the pneumatic ring piston element 246e.

The ring cylinder space of the pneumatic ring cylinder 56e can be delimited by the ring-cylindrical wall segment 244e, the face wall segment 234e, and the ring-cylindrical wall segment 242e of the body part 230e, as well as by the pneumatic ring piston element 246e. The sealing of this ring cylinder space is preferably achieved by the already mentioned packing ring 266e and another packing ring 268e. The packing ring 268e can be effective between the ring-cylindrical wall segment 248e of the ring piston element 246e and the ring-cylindrical wall segment 244e of the body part 230e. The wall segment 248e of the ring piston element 246e preferably has a step of the ring-cylindrical wall segment 244e which extends farther radially toward the outside, so that a free ring space that is arranged in the area of these steps remains even when the ring piston element 246e is completely inserted in the ring-cylindrical recess 232e. When the ring piston element 246e is completely inserted, this ring space can be connected to a boring 270e. The boring 270e can extend radially out into the recess 232e through grooves or such in the face wall segment 234e, which are not shown in FIG. 6. Such grooves can also be provided in a face wall segment 272e of the ring piston element 246e. The face wall segment 246e can be positioned with contact at the face wall segment 234e when the position of the ring piston element 246e is as shown in FIG. 6. The boring 270e can serve as a compressed air feed and a compressed air discharge opening. The boring 270e can run into the recess 232e in the peripheral area which is arranged radially the farthest on the outside and axially the farthest from the transmission. The boring 270e preferably extends from this peripheral area at an angle, radially outside toward the clutch.

In another possible embodiment of the present invention, the boring 270e can run into the recess 232e in the peripheral area which is arranged radially the farthest on the outside and axially the closest to the transmission. The boring 270e preferably extends from this peripheral area radially outward and diagonally toward the clutch.

The description of the ring piston element 246e and the hydraulic slave ring cylinder 54e or the pneumatic power ring cylinder 56e show that the ring piston element 246e with the ring-cylindrical wall segments 244e and 242e of the body part 230e can form on the one hand the pneumatic power ring cylinder 56e, and on the other hand the hydraulic slave ring cylinder 54e. The volumes of the pneumatic power ring cylinder 56e and the hydraulic slave ring cylinder 54e can only be increased or decreased simultaneously. The volume increase or the volume decrease of the ring space of the hydraulic slave ring cylinder 54e takes place only in the recess segment 236e. In this way, the volume change of the hydraulic slave ring cylinder 54e can be in a constant preset ratio to the volume change of the pneumatic power ring cylinder 56e. Thus, as in the case of the previously described embodiments of FIGS. 1, 3 and 5, the hydraulic slave ring cylinder 54e preferably serves as a measuring cylinder for the control valve 74e. In addition, the hydraulic slave ring cylinder 54e can also serve for the emergency operation of the clutch in case of a failure of the control valve 74e, or in case there is no compressed air at the control valve 74e.

The ring piston element 246e can be designed as a plastic component, as is the case in the embodiment of FIG. 6. The hydraulic pressures that occur in the hydraulic slave ring cylinder 54e when the control valve 74e is functional are so small that the stability of the ring piston element 246e would already be sufficient. However, substantially higher pressures in the hydraulic slave ring cylinder 54e can be required for the emergency operation of the clutch. The ring piston element 246e therefore has a ring-cylindrical metal enforcement sleeve 274e. The enforcement sleeve 274e can be concentric to the clutch axis A. The ring-cylindrical wall segment 250e of the ring piston element 246e is preferably supported on its radial inner circumference side by the enforcement sleeve 274e.

To achieve a particularly dependable separation between the hydraulic system and the pneumatic system, the already mentioned packing ring 264e can be provided in addition to the packing ring 266e. The ring piston element 246e preferably has, between the two packing rings 264e, 266e, a ventilation opening 130e through the ring-cylindrical wall segment 250e, through which any compressed air which passes through the packing ring 266e can escape. The packing ring 264e can then dependably prevent the compressed air from penetrating in the direction of the hydraulic slave ring cylinder 54e between the ring-cylindrical wall segment 250e of the ring piston element 246e and the ring-cylindrical wall segment 242e of the body part 230e.

Before addressing the control valve 74e, it should be mentioned that the clutch release sleeve arrangement 48e, which is only shown in symbolic terms in FIG. 6, is preferably attached at the ring piston element 246e in the radial area between the two ring-cylindrical wall segments 248e and 250e of the ring piston element 246e. In this type of arrangement, the clutch release sleeve arrangement 48e can dip completely or partially into the ring-cylindrical recess 232e, which results in a short axial construction length of the operation cylinder constructional unit 52e including the clutch release sleeve arrangement 48e.

The control valve 74e is preferably contained in an axis-parallel ring-cylindrical boring 280e of the body part 230e. The boring 280e can be closed by a face wall segment 282e of the body part 230e in the direction of the transmission, which face wall segment 282e turns into the face wall segment 234e. With respect to a boring axis B, which boring axis B is parallel to the clutch axis A and radially outside of the ring-cylindrical wall segment 242e, the boring 280e is preferably delimited radially outside by a ring cylinder wall segment 284e of the body part 230e, which wall segment 284e turns into the ring-cylindrical wall segment 242e.

In another possible embodiment of the present invention, the control valve 74e can be located in the boring 280e. The boring 280e can be in the form of a ring-shaped cylinder and extend along the clutch axis A. The ring cylinder wall segment 284e can extend substantially parallel to the ring-cylindrical wall segment 242e. The ring cylinder wall segment 284e can also be connected with the face wall segment 282e.

The body part 230e preferably has three other borings 286e, 288e, and 290e, of which the boring 286e is in alignment with the boring 260e, and the boring 288e is in alignment with the boring 270e. More specifically, the borings 286e and 260e can be understood as part of a single boring which cuts the boring 280e for the valve 74e. The borings 288e and 270e can also be understood as part of a single boring which cuts the boring 280e for the valve 74e. The boring 290e can extend at the same boring axis level as the borings 286e and 288e and extend from the periphery segment of the boring 280e that is radially farthest toward the outside with respect to clutch axis A and closest to the transmission sloped, slanted or askew radially outside toward the clutch. The boring 290e preferably serves as the compression air connection 76e. The boring 286e can serve as the hydraulic connection 78e. The boring 270e may serve as the compression air output 82e. The boring 260e preferably serves as the hydraulic input and output 80e (also described as hydraulic output), and the boring 288e serves as a pressure compensation opening 84e of the control valve 74e.

In another possible embodiment of the present invention, the boring 290e can be positioned axially near the transmission. The boring 290e can extend diagonally from the radial outer periphery of the boring 280e in the direction of the clutch.

The control valve 74e can include a valve element 292e, which valve element 292e can have axial and radial borings (not shown) with respect to the boring axis or valve axis B. The valve element 292e is preferably positioned with contact in the boring 280e by means of a lid component 294e. The lid component 294e can close off the boring 280e toward the clutch. The lid component 294e is preferably held axially by a holding ring 296e, which holding ring 296e engages in a snap ring groove (not shown) of the boring 280e. The lid component 294e has a packing ring (not shown) in a ring circumference groove or snap ring groove 298e, which packing ring seals the inside of the boring 280e.

On its outer circumference, the valve element 292e has snap ring grooves 299e, 300e, and 301e. Each of the snap ring grooves 299e, 300e, 301e may contain a packing ring (not shown). The packing rings can be in sealing contact with the inner circumference face of the boring 280e, as is the packing ring in the snap ring groove 298e.

The packing rings in the snap ring grooves 298e, 299e, 300e and 301e, in conjunction with the lid component 294e and the valve element 292e subdivide the boring 280e into four areas. The axial area between the packing rings in snap ring grooves 298e and 299e preferably serves as an hydraulic chamber 86e through which chamber 86 the hydraulic connection 78e and the hydraulic output 80e can be in constant hydraulic connection. For this purpose, the lid component 294e has spacing collars 304e, which spacing collars 304e extend radially outside with respect to the valve axis B. Formed between the spacing collars 304e are preferably channels for the pressure oil. Furthermore, a ring space 306e can be formed on the radial outside of the valve element 292e with respect to the valve axis B between the packing rings arranged in the snap ring grooves 298e and 299e. The borings 286e and 260e can extend into the ring space 306e. Corresponding ring spaces 308e, 310e, and 312e can also be formed in the remaining areas of the boring 280e. The boring 288e can extend into the ring space 308e between the packing rings that are arranged in the snap ring grooves 299e and 300e, i.e., the ring space that is axially closest to the ring space 306e in the direction of the transmission. The boring 270e can extend into the ring space 310e, i.e., in the ring space between the packing rings that are contained in snap ring grooves 300e and 301e. This is preferably the axially closest ring space to the ring space 308e in the direction of the transmission. The boring 290e can extend into the ring space 312e that is arranged between the packing ring contained in the snap ring groove 301e and the face wall segment 282e, i.e., into the ring space that is closest to the transmission.

An axially displaceable valve gate 316e can be contained in an axial recess or axial boring 314e of the valve element 292e. The valve gate 316e on a ring-cylindrical outer circumference face can have several snap ring grooves 318e, 319e and 320e for packing rings. The ring-cylindrical outer circumference face of the valve gate 316e can be movably positioned at a ring-cylindrical inner circumference face of the axial boring 314e. The packing rings contained in the snap ring grooves 318e, 319e, 320e are not shown in FIG. 6. In conjunction with the packing ring contained in the snap ring groove 299e, the packing rings contained in the snap ring grooves 318e and 319e can achieve a dependable separation between the hydraulic chamber 86e and the ring space 306e and the other areas of the boring 280e which contain air or compressed air.

Disregarding the valve gate 316e, the two ring spaces 308e and 310e are connected by radial borings 322e and 323e of the valve element 292e. The radial borings 322e and 323e can extend into the axial boring 314e of the valve element 292e. When taking the valve gate 316e into account, a packing ring (not shown) that is inserted into the snap ring groove 320e, in conjunction with the packing ring contained in the snap ring groove 300e, can enable a separation between the ring space 308e and the ring space 310e. The packing ring contained in the snap ring groove 301e can furthermore enable a principal separation between the ring space 312e and the ring space 310e.

The ring space 310e and thus the pressure air output 82e can be connected optionally either to the ring space 312e and thus to the compression air connection 76e, or to the ring space 308e and thus to the pressure compensation opening 84e.

For this purpose, the valve gate 316e has an axial transmission-side pocket boring 324e with respect to the boring axis B. The pocket boring 324e can be closed toward the hydraulic chamber 86e and is in constant air exchange connection with the ring space 308e and thus the pressure compensation opening 84e through radial borings 326e in the valve gate 316e, and a ring space 328e that is formed between the valve gate 316e and the valve element 292e. In the position of the valve gate 316e shown in FIG. 6, which valve gate 316e can be biased with a pressure spring 330e in the direction of the clutch, the transmission-side end of the axial boring 324e of the valve gate 316e is closed by a closing element 334e. The closing element 334e can also be closed in the direction of the clutch by another pressure spring 332e. The closing element 334e is preferably contained in a segment of the axial boring 314e of the valve element 292e and stops at a ring collar 336e of the valve element 292e, which ring collar 336e projects radially inward into the boring 314e. The closing element 334e, which is designed as a sealing element, thus closes simultaneously, i.e., as long as it stops at the ring collar 336e, the pneumatic connection between the ring space 312e and the compressed air connection 76e or the compressed air connection 76e and the ring space 310e or the compressed air output 82e.

In other words and in accordance with another possible embodiment of the present invention, the valve gate 316e can be designed to close the connection from the compressed air connection 76e and ring space 312e to the ring space 310e and compressed air output 82e. The valve gate 316e can also simultaneously close the connection between the pressure compensation opening 84e and ring space 308e and the ring space 310e and compressed air output 82e.

If the valve gate 316e is displaced against the bias of the spring 330 in the direction of the transmission, i.e., to the right in FIG. 6, the closing element 334e is lifted from the ring collar 336e. The lifting of the closing element 334e from the ring collar 336e can effect the opening of a ring opening between the ring collar 336e and the end segment of the valve gate 316e which is near the transmission. The ring opening can connect the segment of the axial boring 314e to the right of the ring collar 336e and the segment of the axial boring 314e to the left of the ring collar 336e and thus connect the compressed air connection 76e and the compressed air output 82e. Compressed air can flow into the pneumatic power ring cylinder 56e and release the pneumatic ring piston element 246e from the ring-cylindrical recess 232e in the direction of the clutch.

In other words, the compressed air can flow from the compressed air connection 76e past the ring opening and into the compressed air output 82e and thus into the pneumatic power ring cylinder 56e. As the compressed air builds pressure in the pneumatic power ring cylinder 56e the pneumatic ring piston element 246e can be displaced in the direction of the clutch to increase the volume of the pneumatic power ring cylinder 56e. The pneumatic ring piston element 246e can then be used to engage with the clutch release sleeve arrangement 48e to disengage the pressure plate from the clutch disc.

If to the contrary, the valve gate 316e is displaced from the position shown in FIG. 6 toward the left, i.e. toward the clutch, especially with the help of the pressure spring 330e, the closing element 334e can continue to be positioned or displaced to form a seal at the ring collar 336e with the help of the pressure spring 332e, so that the connection between the compressed air connection 76e and the compressed air output 82e remains closed. In this way, the closing element-side end of the valve gate 316e and thus the opening of the axial boring 324e of the valve gate 316e move away from the closing element 334e, so that now a connection between the compressed air output 82e and the ring space 310e can be achieved through the axial boring 324e, the radial borings 326e, the ring space 328e, the radial borings 322e and the ring space 308e. If the ring piston element 246e has previously been disengaged in the direction of the clutch, the ring space of the pneumatic power ring cylinder 56e will contain compressed air which can now escape through the stated pneumatic connection. The pneumatic ring piston element 246e can again move into the recess 232e with the help of the bias of the membrane spring 32e until the stated pneumatic connection is closed again by the appropriate displacement of the valve gate 316e in the direction of the closing element 334e, or the face wall segment 272e of the ring piston element 246e stops at the face wall segment 234e of the body part 230e.

The control valve 74e will now preferably function as follows. Assuming that a cylinder, especially a clutch pedal-operated cylinder, is connected to the hydraulic connection 78e and that the clutch pedal is not pressed, the pressure in the hydraulic chamber 86e will be very low so that the valve gate 316e will be displaced axially as far as possible in the direction of the clutch. There is preferably a pneumatic connection between the pressure compensation opening 84e and the compressed air output 82e. Accordingly, there will preferably be a corresponding/respective ambient air pressure in the ring cylinder space of the pneumatic power ring cylinder 56e.

If the clutch pedal is now used to operate the hydraulic master cylinder, hydraulic oil will flow into the hydraulic chamber 86e and displace the valve gate 316e against the force of the pressure spring 330e in the direction of the closing element 334e. This will preferably create pressure in the hydraulic chamber 86e, which pressure will correspond to the bias of the pressure spring 330e at the present axial position of the valve gate 316e. The bias exerted by the pressure spring 330e on the valve gate 316e and thus the pressure in the hydraulic chamber 86e can rise because of the increasing compression of the pressure spring 330e by the displacement of the valve gate 316e in the direction of the closing element 334e. During the appropriate operation of the master cylinder, the closing element-side end of the valve gate 316e will preferably then reach the closing element 334e, which closing element 334e can be positioned with contact at the ring collar 336e, and then the axial boring 324e will preferably be closed. In the hydraulic chamber 86e, there is now a desired pressure which is set by the bias of the pressure spring 330e. When the master cylinder is operated again, the valve gate 316e will preferably be displaced farther to the right, i.e., in the direction of the transmission, with a corresponding increase of pressure in the hydraulic chamber 86e. The closing element 334e can be lifted off the ring collar 336e so that the pneumatic connection between the compressed air connection 76e and the compressed air output 82e is now preferably achieved. In this way, the pressure in the hydraulic chamber 86e corresponds to the resulting axial force on the valve gate 316e in the direction of the clutch. The resulting axial force can include the force contributions of the pressure spring 330e, the pressure spring 332e, and the forces exerted by the pneumatic pressure medium (preferably compressed air) on the closing element 334e and the valve gate 316.

As soon as the pneumatic connection between the compressed air connection 76e and the compressed air output 82e and the pneumatic power ring cylinder 56e is achieved, the pneumatic ring piston element 246e will be released from the ring-cylindrical recess 232e in the direction of the clutch. In this way, the volume of the hydraulic slave ring cylinder 54e, which ring cylinder 54e serves as a measuring cylinder, is necessarily increased so that pressure oil from the hydraulic chamber 86e can flow into the hydraulic slave ring cylinder 54e. The ring piston element 246e can be released from the ring-cylindrical recess 232e until the hydraulic slave ring cylinder 54e has preferably taken up a pressure oil volume that corresponds to the pressure oil volume that was displaced from the master cylinder. The valve gate 316e then returns to the position shown in FIG. 6, where the pneumatic power ring cylinder 56e is preferably sealed, i.e., where there is no connection between the compressed air output 82e and the compressed air connection 76e and the pressure compensation opening 84e. As long as the clutch pedal remains pressed in the operation position, the hydraulic pressure in the hydraulic chamber 86e will preferably correspond to the pressure force that is exerted by the pressure spring 330e on the valve gate 316e. This hydraulic pressure can prevail throughout the entire hydraulic system.

When the clutch pedal is released, either completely or partially, pressure oil will flow through the hydraulic connection 78e in the direction of the master cylinder, so that the valve gate 316e will be displaced by the force of the pressure spring 330e in the direction of the clutch. The pneumatic connection between the compressed air output 82e and the pressure compensation opening 84e opens. Through the stated pneumatic connection, compressed air can now be released from the pneumatic power ring cylinder 56e. The release of compressed air from the pneumatic power ring cylinder 56e can cause the ring piston element 246e to engage again under the bias of the membrane spring 32e with a simultaneous volume reduction of the ring cylinder space of the hydraulic slave ring cylinder 54e. In this way, pressure oil can be displaced from the ring cylinder space of the hydraulic slave ring cylinder 54e into the hydraulic chamber 86e to counteract the stated axial displacement of the valve gate 316e in the direction of the clutch. If the clutch pedal is held pressed in an intermediate position, the ring piston element 246e can engage to such an extent until the pressure oil that was displaced from the hydraulic slave ring cylinder 54e has displaced the valve gate 316e back into the axial position shown in FIG. 6. Accordingly, the pneumatic connection from the pneumatic power ring cylinder 56e to the pressure compensation opening 84e can again be closed and the ring piston element 246e and thus the clutch release sleeve arrangement 48e can assume an appropriate axial interposition. A complete release of the clutch pedal will finally lead to the situation of a maximally worn clutch as shown in FIG. 6, i.e., with a maximally engaged ring piston element 246e.

Instead of the functional description of the control valve 74e on the basis of the displaced or assumed pressure oil volume, as was given hereinabove in connection with the embodiment of the example in FIG. 1, it is also possible to describe the function on the basis of the pressure oil pressure in the hydraulic chamber 86 or 86e and thus in the entire assigned hydraulic system. An hydraulic pressure in the hydraulic chamber 86 or 86e can correspond precisely to each axial position of the valve gate 316e, which hydraulic pressure is determined by the forces that act on the valve gate 316e at each axial position. Because the hydraulic oil is essentially incompressible, the description on the basis of the oil volume, as performed here, makes more sense.

It should also be mentioned, however, that the pressure forces that are exerted by the compressed air on the valve gate 316e have not been fully taken into account in the preceding considerations. Because the pressure force exerted by the membrane spring 32e on the disengaging or pneumatic ring piston element 246e changes when the clutch is operated, the pressure of the compressed air in the pneumatic power ring cylinder 56e will also change accordingly. This pressure can also act on the valve gate 316e in the area of the pressure spring 332e. The valve gate 316e can thus be pressed with changing pressure forces in the direction of the clutch when the clutch is operated, so that the hydraulic pressure which appears in the hydraulic chamber 86e also changes accordingly. Thus, the hydraulic pressure in the hydraulic chamber 86e and, when in a stationary condition throughout the entire hydraulic system, can accordingly be used as a command variable (compare to the description in connection with the embodiment of FIG. 1) instead of the hydraulic oil volume that was displaced from the master cylinder. Regardless of the method of observation or reference, the valve gate 316e can be axially displaced in the valve element 292e depending on the difference in the force exerted by the hydraulic oil in the hydraulic chamber 86e on the valve gate 316e in the direction of the transmission and the resulting force in the direction of the clutch because of the force exerted by the pressure springs 330e and 332e and the force exerted on the valve gate 316e by the air or compressed air. The control valve 74e can assume the described control conditions (no connection between the compressed air output 82e and the compressed air connection 76e, and no connection between the compressed air output 82e and the pressure compensation opening 84e).

The described operation cylinder constructional unit 52e can be distinguished by the fact that the treatment of the body part 230e is very simple because of the comparatively large ring-cylindrical recess 232e, and also because only two parts are required to form the pneumatic power ring cylinder 56e and the hydraulic slave ring cylinder 54e (the packing rings 258e, 262e, 264e, 266e and 268e were disregarded).

Because the pneumatic power ring cylinder 56e can project past the hydraulic slave ring cylinder 54e in the direction of the clutch axis A toward the transmission and the hydraulic slave ring cylinder 54e can enclose the pneumatic power ring cylinder 56e radially on the outside, both ring cylinders 54e, 56e can be supplied with hydraulic oil or compressed air through short channels or borings radially from the outside.

With respect to the control valve 74e, the constructional unit 52e shown in FIG. 6 can also be constructed in a very simple manner and can thus be produced in a cost-efficient manner because essentially a total of only four borings (boring 280e, borings 286e and 260e, borings 288e and 270e, boring 290e) are required in the body part 230e for the control valve 74e and the described connections or connection channels. The segment of the body part 230e which has the control valve 74e could, for example, be separated from the remaining body part 230e after the borings have been made and then be reattached at the original location by providing appropriate sealing means to make the control valve 74e more accessible or removable.

Figure 7:
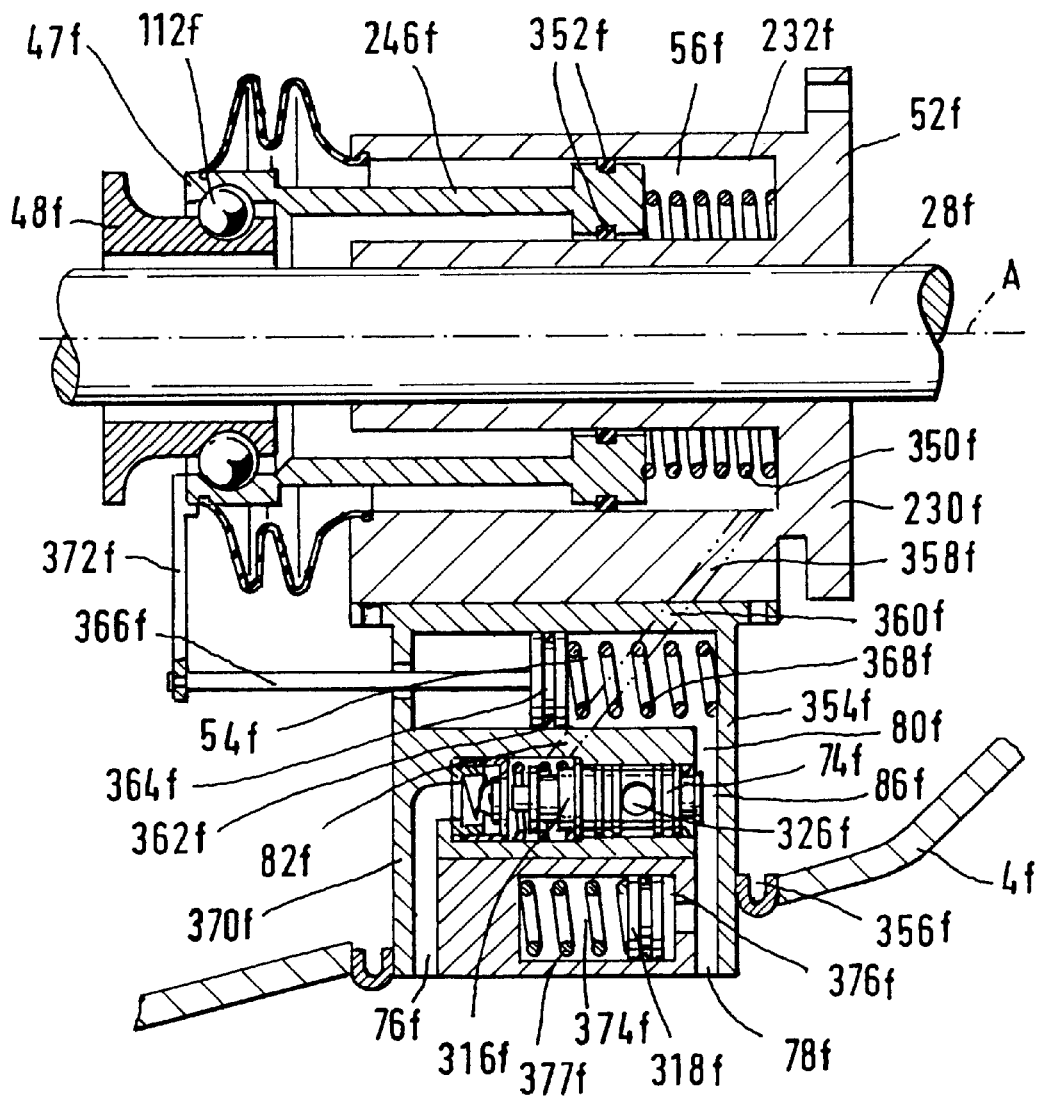
FIG. 7 shows a schematic section view of another embodiment of the operation device with a compressed power ring cylinder, especially a pneumatic power ring cylinder, which does not require an hydraulic slave cylinder arrangement.

Another advantageous embodiment for an operation device according to the present invention or for an operating cylinder constructional unit according to the present invention is shown in FIG. 7. The operation cylinder constructional unit 52f can include a pneumatic power ring cylinder 56f. The pneumatic power ring cylinder 56f can be formed by a ring-cylindrical recess 232f in a stationary body part 230f and by a pneumatic ring piston element 246f. The pneumatic ring piston element 246f can be biased by means of springs 350f in the direction of the clutch and can have packing rings 352f to seal the ring cylinder space of the pneumatic power ring cylinder 56f. As is the case in the embodiment in FIG. 6, the shown embodiment of FIG. 7 is an operation device for a pressed clutch.

The operation cylinder constructional unit 52f can have a control valve constructional unit 354f, which control valve constructional unit 354f is removably attached to the operation cylinder constructional unit 52f and can include a control valve 74f similar to the control valve in the embodiments of FIGS. 1, 2C and 6. The control valve constructional unit 354f may be arranged in such a manner that the control valve constructional unit 354f projects past the outside of the bell-shaped housing 4f through an assigned opening 356f in the bell-shaped housing 4f. A compressed air connection 76f and a hydraulic connection 78f may be provided on the portion of the control valve constructional unit 354f that projects outside the housing 4f.

Both the body part 230f and the control valve constructional unit 354f can have an air channel 358f or 360f respectively, and these channels 358f, 360f can be connected when the control valve constructional unit 354f is attached to the operation cylinder constructional unit 52f. In this way, there is a connection between the ring cylinder space of the pneumatic power ring cylinder 56f, which ring cylinder space is concentric to the clutch axis A, and a compressed air output 82f of the control valve 74f.

The pressure compensation opening of the control valve 74f is not shown in the illustration of FIG. 7, but there is an identified radial boring 326f of the displaceable valve gate 316f, through which the connection between the compressed air output 82f and the pressure compensation opening can be achieved.

The control valve constructional unit 354f can furthermore have an hydraulic measuring cylinder 54f, which measuring cylinder 54f can function in the same way as each hydraulic slave ring cylinder described in the above embodiments, and thus has the same reference symbols, when the clutch is operated through an hydraulic master cylinder and there is sufficient pneumatic pressure at the compressed air connection 76f and the control valve 74f is functioning. However, at least in the embodiment shown in FIG. 7, the measuring cylinder 54f, contrary to the above described hydraulic slave ring cylinders, cannot serve for the emergency operation of the clutch if the control valve 74f is not functioning or there is no compressed air at the compressed air input 76f.

The measuring cylinder 54f can include a piston 364f, which piston 364f is on a piston rod 366f and has a packing ring 362f. The piston 364f, which can be displaced parallel to the clutch axis A, can be biased by a pressure spring 368f in the direction of the clutch, i.e., in the direction of disengagement of the clutch release sleeve arrangement 48f when the clutch is operated for disengagement. The cylinder cavity of the measuring cylinder 54f is preferably in connection with the hydraulic output 80f of the control valve 74f. Through an opening in the control valve constructional unit 354f, the piston rod 366f can project past a body or a housing 370f of the control valve constructional unit 354f in the direction of the clutch and can push with its free end under the bias of the pressure spring 368f on a coupling element 372f (which has the form of a ridge or rod in the shown embodiment of FIG. 7). The coupling element 372f can be attached or positioned with contact at the clutch release sleeve arrangement 48f, or more specifically, at the clutch release ring 47f. The coupling element 372f can extend, with respect to the clutch axis A, from the clutch release ring 47f radially outward to the piston rod 366f. The piston rod 366f only stops at the clutch or coupling element 372f, but is not connected to the same.

Because the piston 364f is biased by the pressure spring 368f and coupled with the clutch release sleeve arrangement 48f through the coupling element 372f and the piston rod 366f, the piston 364f can follow any movement of the clutch release sleeve arrangement 48f or the pneumatic ring piston element 246f. An increase in the volume of the pneumatic power ring cylinder 56f can thus lead to a corresponding increase in the volume of the measuring cylinder 54f, and a decrease in the volume of the pneumatic power ring cylinder 56f can thus lead to a corresponding decrease in the volume of the measuring cylinder 54f. The triggering of the pneumatic power ring cylinder 56f through the control valve 74f, or more specifically, the regulation of the axial position of the clutch release sleeve arrangement 48f, can thus be achieved in the same manner as explained previously in connection with the embodiment of FIGS. 1, 3 and 6.

The coupling element 372f and the measuring cylinder 54f including the piston rod 366f are preferably not designed to generate or transmit to the clutch release sleeve arrangement 48f the pressure forces that are required if the control valve 74f fails or there is not enough compressed air to operate the clutch. Thus, an emergency operation of the clutch is not provided in the embodiment shown in FIG. 7. However, even if the measuring cylinder 54f can be arranged in a constructional unit that is separate from the pneumatic power ring cylinder 56f, it would not be a problem to design the measuring cylinder 54f and the appropriate coupling elements (piston rod 366f, coupling element 372f) in such a manner that an emergency operation could be possible.

Figure 7A:
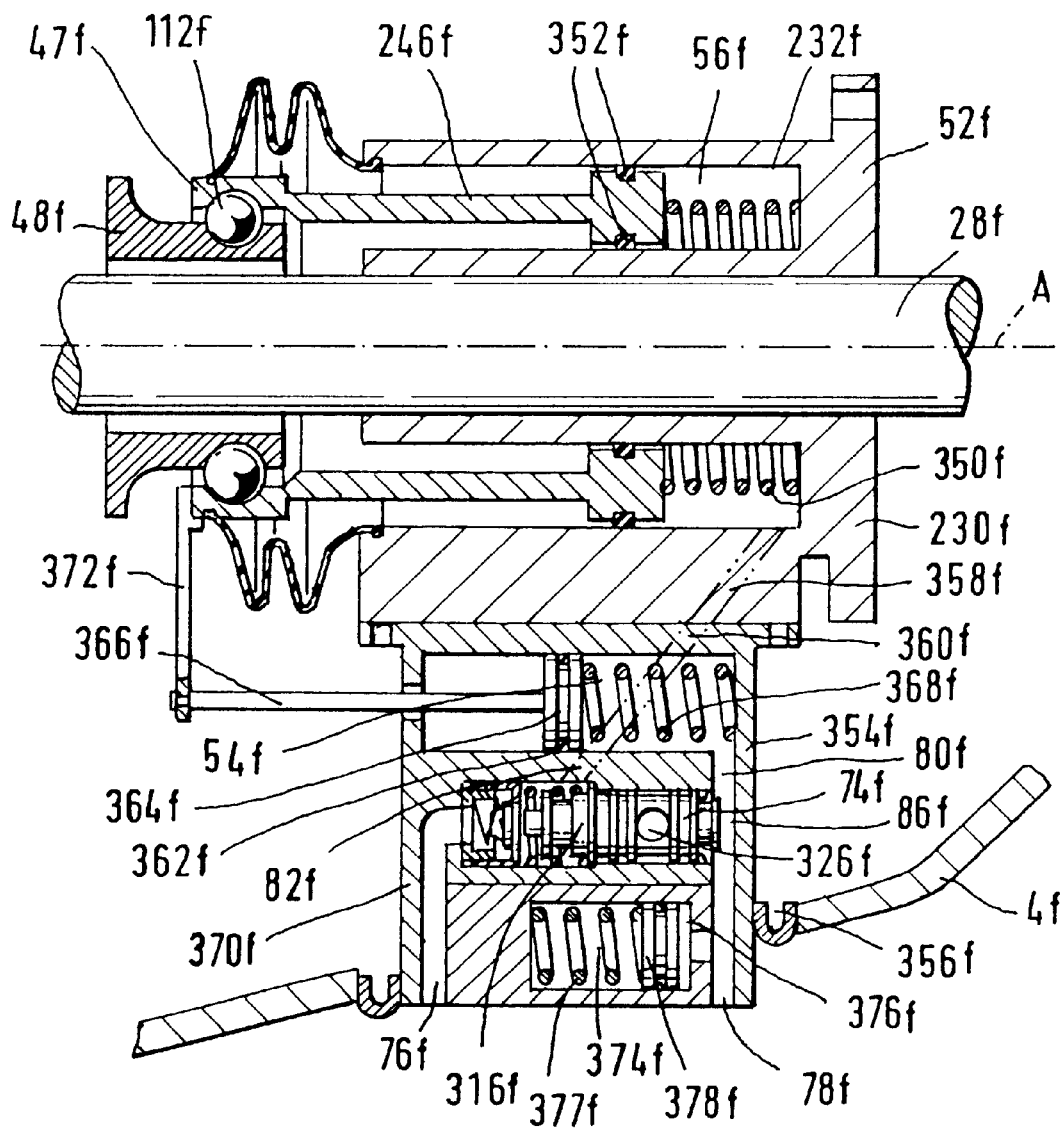
FIG. 7A shows additional features of the operation cylinder constructional unit of FIG. 7.

To avoid excessively high hydraulic pressures in the case of a failure of the control valve 74f or in the case of a lack of compressed air, the control valve constructional unit 354f can have an overload protection 374f. The overload protection or connection 374f can include a cylinder 376f connected to the hydraulic connection 78f, and a sealed piston 378f (see FIG. 7A) biased in the direction of a volume decrease of the cylinder 376f. The bias is such that the hydraulic pressures of a working control valve 74f are preferably not sufficient to move the piston 378f against the bias of spring 377f in the sense of a volume increase of the cylinder 376f. When the control valve 74f is not functioning or there is a lack of compressed air at the compressed air connection 76f, the cylinder 376f can take up a pressure oil volume that corresponds to the maximum pressure oil volume that is displaced from the master cylinder. Thus, the occurrence of hydraulic pressures that are high enough to damage the control valve 74f, the piston rod 366f or the coupling element 372f, can be avoided with confidence.

In accordance with another possible embodiment of the present invention, a piston 318f can be positioned in the cylinder 376f and can function in a similar manner as sealed piston 378f.

Figure 8:
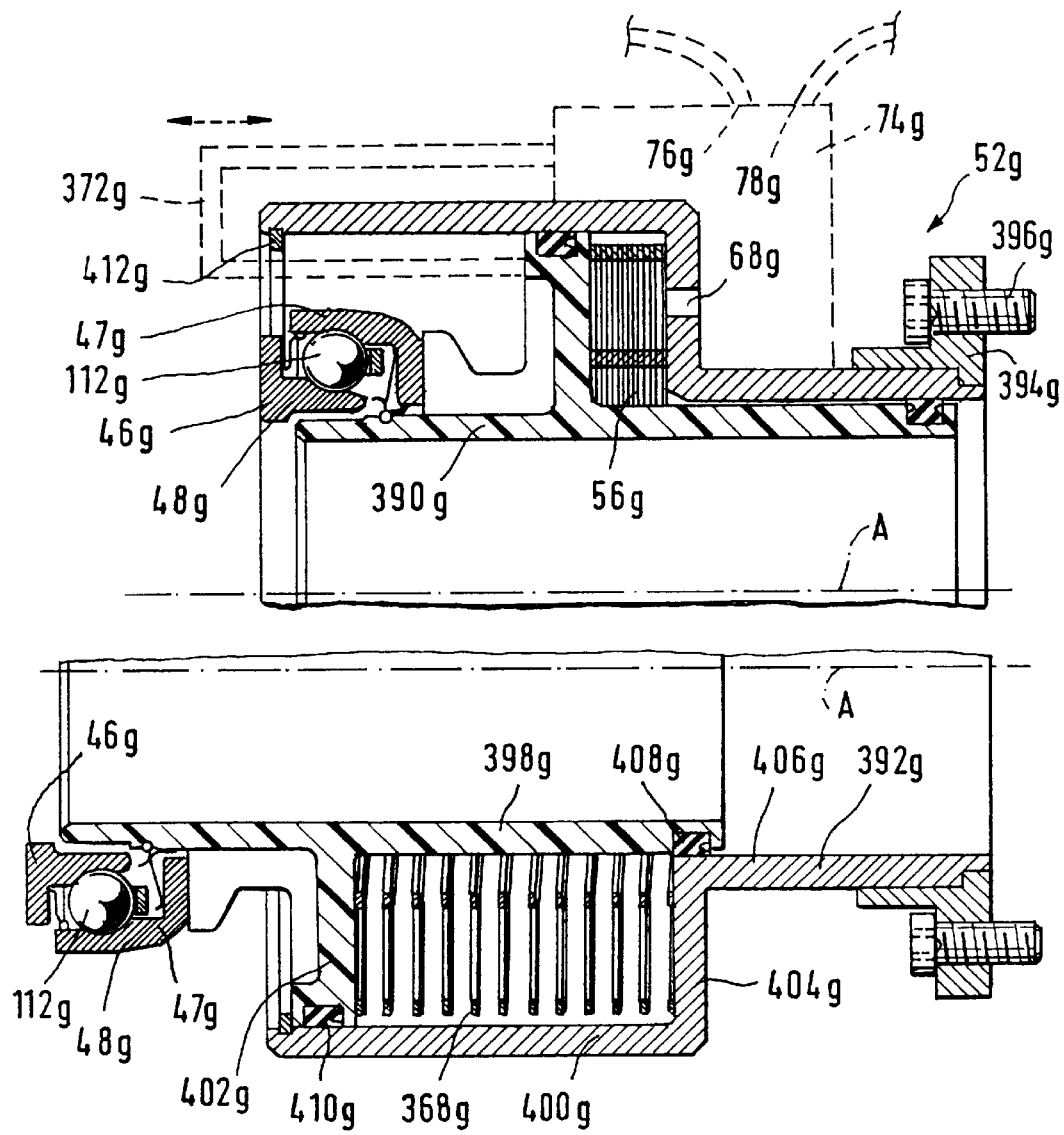
FIG. 8 shows a section of another embodiment of an operation cylinder constructional unit having a compressed power ring cylinder, especially a pneumatic power ring cylinder, for an operation device which does not require an hydraulic slave cylinder arrangement.

FIG. 8 shows an advantageous operation cylinder constructional unit 52g for an operation device with a pressed clutch according to the present invention. The operation cylinder constructional unit 52g can include a pneumatic power ring cylinder 56g. The pneumatic power ring cylinder 56g is preferably concentric to the clutch axis A. A control valve 74g, which is preferably removably attached to the operation cylinder constructional unit 52g and is accessible from the outside, is shown only schematically in dashed lines. The control valve 74g can be connected by a coupling element 372g, which coupling element 372g is also shown in dashed lines, to an axially displaceable pneumatic piston cylinder wall element 390g of the operation cylinder constructional unit 52g to couple the axial position of the clutch release sleeve arrangement 48g back to the control valve 74g. This back-coupling can also be performed in other ways, for example, electrically.

The operation cylinder constructional unit 52g can furthermore include a stationary pneumatic cylinder wall element 392g. The pneumatic cylinder wall element 392g can be attached on the transmission-side of the bell-shaped housing (not shown) by means of a fastening adapter ring 394g and fastening screws 396g. The pneumatic piston cylinder wall element 390g, which is designed in one piece, and the pneumatic cylinder wall element 392g, which is also designed in one piece, each can have a ring cylinder wall segment 398g or 400g respectively. The ring cylinder wall segments 398g or 400g can be coaxial to the clutch axis A and can be arranged a radial distance from each other. The pneumatic piston cylinder wall element 390g and the pneumatic cylinder wall element 392g can also have a face wall segment 402g or 404g. The face wall segments 402g or 404g can extend from each ring cylinder wall segment 398g or 400g in a radial direction to the other ring cylinder wall segment 400g or 398g. The ring cylinder wall segment 398g and the face wall segment 402g of the pneumatic piston cylinder wall element 390g and the ring cylinder wall segment 400g and the face wall segment 404g of the pneumatic cylinder wall element 392g can delimit the cylinder ring space or pressure space of the pneumatic power ring cylinder 56g. In this way, the ring cylinder wall segment 398g is located more radially inward toward the clutch axis A than the ring cylinder wall segment 400g, and the face wall segment 402g is located axially closer to the clutch compared to the face wall segment 404g. The spring means 368g, which can be arranged in the ring space of the pneumatic power ring cylinder 56g, can bias the face wall segment 402g and thus the pneumatic piston cylinder wall element 390g, in the direction of the clutch.

The ring cylinder wall segment 398g can extend axially in the direction of the clutch past the face wall segment 402g. The ring cylinder wall segment 398g can have on its clutch-side end, i.e., on the side of the face wall segment 402g that faces the clutch, the clutch release sleeve arrangement 48g. The pneumatic cylinder wall element 392g can furthermore include a second ring cylinder wall segment 406g. The second ring cylinder wall segment 406g can extend from the radial inner end of the face wall segment 404g in the direction of the transmission and also extend coaxial to the clutch axis A. The ring cylinder wall segment 406g, which can also be identified as a pipe socket, has on its inner circumference face a sliding face, and positioned with contact on the sliding face is a packing ring 408g. The packing ring 408g can be attached radially outwards on the transmission-side end of the ring cylinder wall segment 398g and can seal the ring cylinder space of the pneumatic power ring cylinder 56g. A second packing ring 410g, which seals the ring space, is preferably attached on an outer circumference segment of the face wall segment 402g and is preferably positioned with contact at the inner circumference face of the ring cylinder wall segment 400g. The ring cylinder wall segment 400g is preferably designed as a gliding face. Thus, the ring cylinder wall segment 398g can be guided axially and movably on the ring cylinder wall 392g, and the face wall segment 402g can be guided axially and movably on the ring cylinder wall element 400g.

The ring cylinder wall 392g is preferably in a holding engagement with the fastening adapter ring 394g. One outer circumference face of the ring cylinder wall 392g can be positioned with contact on an inner circumference face of the fastening adapter ring 394g and can thus be radially mounted in this manner. An additional axial mounting can also be provided, for example, by bayonet connection means (not shown in FIG. 8) or similar connection, at the fastening adapter ring 394g and at the ring cylinder wall segment 392g. An axial delimitation of the movement path of the pneumatic piston cylinder wall element 390g can be achieved by a stop ring 412g. The stop ring 412g can be attached radially inwards at the clutch-side end of the ring cylinder wall element 400g.

The operation cylinder constructional unit 52g, which can include the pneumatic piston cylinder wall element 390g and the pneumatic cylinder wall element 392g, can be used in various assembly situations by using a fastening adapter ring 394g that is adjusted to each assembly situation. In this respect, the ring cylinder wall segment 392g is advantageous because the ring cylinder wall segment 392g can provide an axial distance between the pneumatic power ring cylinder 56g and the bell-shaped housing. The pneumatic power ring cylinder 56g can be displaced from the area of the bell-shaped housing near the transmission, where there is often a lack of space, into the direction of the center of the bell-shaped housing.

It should be added that the pneumatic piston cylinder wall element 390g has a boring 68g in the face wall segment 404g, and that the compressed air output of the control valve 74g is connected to the boring 68g.

Figure 9:
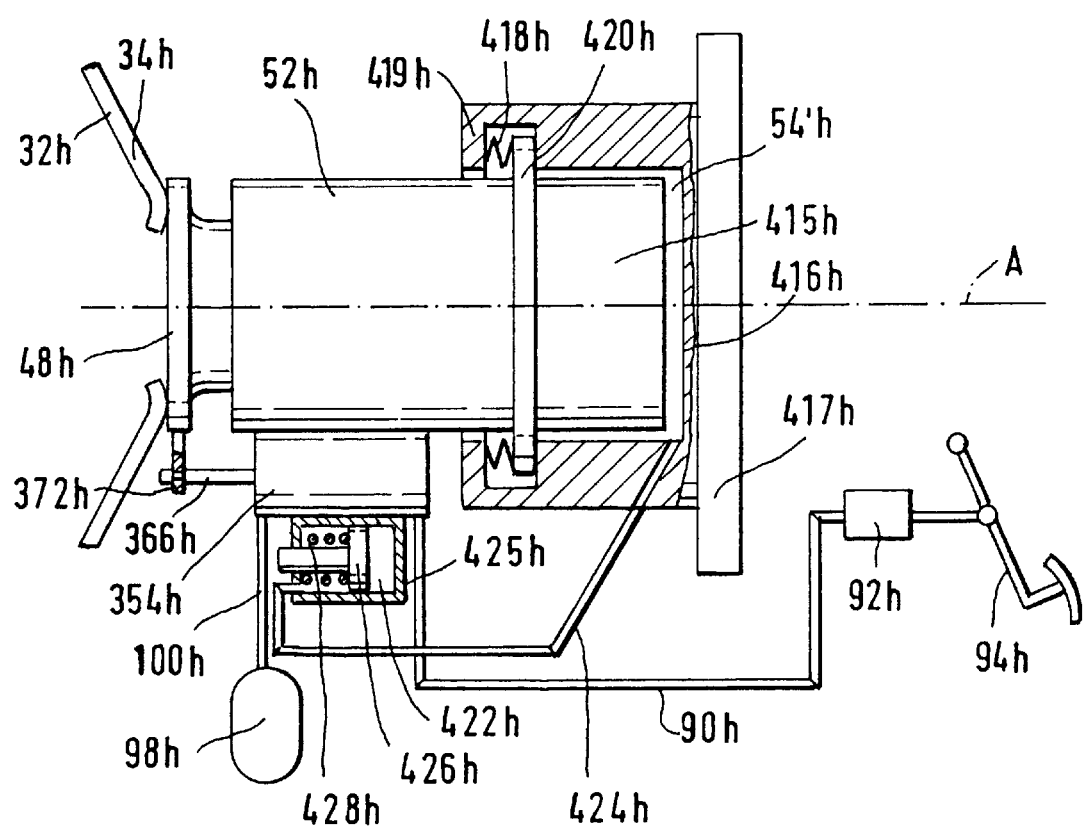
FIG. 9 shows schematically a modification of the operation device shown in FIG. 7, which modification has an hydraulic slave cylinder for the emergency operation of the clutch.

FIG. 9 shows a further embodiment of an operation device according to the present invention. The operation device can include an operation cylinder constructional unit 52h and a control valve constructional unit 354h. The control valve constructional unit 354h can be removably connected to the operation cylinder constructional unit 52h. The construction and the function of the constructional units 52h, 354h correspond to the operation cylinder constructional unit 52f and the control valve constructional unit 354f of the embodiment of FIG. 7.

Contrary to the operation cylinder constructional unit 52f, however, the operation cylinder constructional unit 52h is not attached to the bell-shaped housing on the transmission-side, but rather has a cylindrical piston segment 415h. The cylindrical piston segment 415h can be contained in a cylindrical recess 416h of a holding element 417h, which holding element 417h can be attached to the bell-shaped housing. The recess 416h can be open in the direction of the clutch. The operation cylinder constructional unit 52h and thus the piston segment 415h can be biased in the direction of the transmission by pressure springs 418h. The pressure springs 418h can engage at a ring collar 420h of the operation cylinder constructional unit 52h that projects radially outward and at a ring collar 419h of the holding element 417h. The holding element 417h can be staggered in the axial direction with respect to the ring collar 420h in the direction of the clutch.

In another possible embodiment of the present invention, the ring collar 420h can project radially outward from the cylindrical piston segment 415h. The ring collar 419 of the holding element 417h can be a support for the pressure springs 418h. The pressure springs 418h can then engage the ring collar 420h to bias the cylindrical piston segment 415h toward the transmission.

The axially movable piston segment 415h and the recess 416h form an hydraulic slave cylinder 54h (see FIG. 9A) for the emergency operation of the clutch and is thus called an emergency operation cylinder below. The emergency operation cylinder 54h thus does not serve as a measuring cylinder like the hydraulic measuring cylinder 54f in the embodiment of FIG. 7 or the hydraulic slave ring cylinders of the remaining previously described embodiments. A special hydraulic measuring cylinder corresponding to the hydraulic measuring cylinder 54f of the embodiment in FIG. 7 can be provided in the control valve constructional unit 354h.

In another possible embodiment of the present invention, a cylinder 54'h can be formed by the cylindrical piston segment 415h located in the cylindrical recess 416h of the holding element 417h. The cylinder 54'h can possibly be used for the emergency operation of the clutch.

However, the control valve constructional unit 354h differs from the control valve constructional unit 354f in the embodiment of FIG. 7 because of the coupling of the hydraulic measuring cylinder to a clutch release sleeve arrangement 48h. According to the embodiment in FIG. 9, a piston rod 366h can be connected to a coupling element 372h in alignment, preferably removable, by a connecting bolt (not shown). The connecting bolt can intersperse or be disposed through a hole in both the coupling element 372h and the piston rod 366h, so that the piston of the hydraulic measuring cylinder and the clutch release sleeve arrangement 48h are preferably movement-coupled. Movement-coupled, in this context, means that the piston of the hydraulic measuring cylinder follows every movement of the clutch release sleeve arrangement 48h. The biasing of the piston of the hydraulic measuring cylinder, for example by means of a spring corresponding to spring 368f, is therefore not necessary. Because of the movement-coupling between the piston of the hydraulic measuring cylinder and the clutch release sleeve arrangement 48h, an advantageous dampening of the pneumatic system is achieved. The dampening can counteract overshooting and other vibration occurrences related to the compressibility of the pneumatic medium (compressed air).

During normal operation, i.e., when the control valve of the control valve constructional unit 354h is functioning and there is compressed air with sufficient pressure at the compressed air connection of the control valve, the operation cylinder constructional unit 52h always assumes its extreme position near the transmission, i.e., the piston segment 415h immerses or dips as far as possible into the recess 416h in the direction of the transmission (toward the right in FIG. 9). This immersion of the piston segment 415h can be achieved by the spring 418h, which spring 418h can exert a relatively high force on the operation cylinder constructional unit 52h, and also by a cylinder separation piston unit 422h. The separation piston unit 422h can connect the emergency operation cylinder 54h to a hydraulic line 90h by hydraulic lines 424h and 425h. The hydraulic line 90h can lead from a clutch-pedal operated hydraulic master cylinder 92h to the control valve constructional unit 354h and thus to the control valve. The cylinder separation piston unit 422h has a cylinder space which is divided into a first and second work chamber by a separation piston 426h. The separation piston 426h can be displaceably arranged in the cylinder space. The separation piston 426h may be biased by a pressure spring 428h in the sense of a decrease of the first work chamber and an increase of the second work chamber. The hydraulic line 425h, which extends from the hydraulic line 90h to the cylinder separation piston unit 422h, can be connected to the first work chamber. The hydraulic line 424h between the cylinder separation piston unit 422h and the emergency operation cylinder 54h can be connected to the second work chamber. The work chambers, as well as the hydraulic lines 90h, 424h, 425h, are preferably filled with hydraulic oil.

Figure 9A:
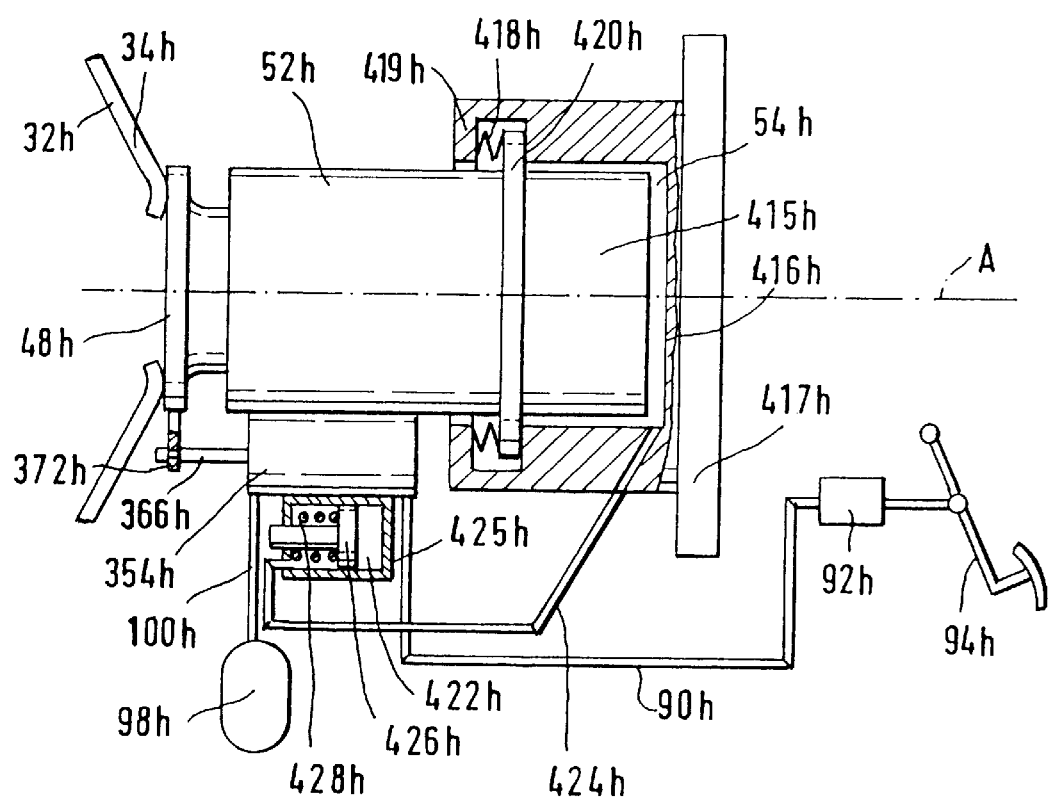
FIG. 9A shows additional features of the operation device of FIG. 9.

In other words and in accordance with another possible embodiment of the present invention, the hydraulic line 425h shown in more detail in FIG. 9A can be used to connect the hydraulic line 90h to the first work chamber of the cylinder separation piston unit 422h. The hydraulic line 425h can then permit the hydraulic oil from the master cylinder to enter the first work chamber of the cylinder separation piston unit 422h.

For the operation of the emergency operation cylinder 54h, the pressure in the hydraulic system must be sufficient to move the separation piston 426h against the force of pressure of the pressure spring 428h in the sense of an increase of the first work chamber and a decrease of the second work chamber. The pressure in the hydraulic system should also be sufficient to move the piston segment 415h and thus the operation cylinder constructional unit 52h against the force of the pressure spring or pressure spring means 418h in the direction of the clutch. The forces of pressure of the pressure spring means 418h and the pressure spring 428h are preferably chosen in such a manner that the hydraulic pressures that occur in the hydraulic system when the control valve is functioning and there is sufficient pneumatic pressure are not sufficient to operate the emergency operation cylinder 54h. During normal operation, the piston segment 415h remains in its transmission-side extreme position so that sealing means such as packing rings and the like which seal the emergency operation cylinder 54h are not subjected to wear.

However, if the control valve fails or a pressure source 98h does not supply compressed air, the pressure in the hydraulic system can be raised by an appropriately stronger operation of the master cylinder 92h by the clutch pedal 94h in such a manner that the spring forces of the pressure spring 428h and the pressure spring means 418h are overcome. The piston segment 415h may be released from the recess 416h with corresponding displacement of the entire operation cylinder constructional unit 52h in the direction of the clutch and corresponding displacement of the separation piston 426h can also occur. In this way, the membrane feather tongues 34h of the pressed-type clutch are preferably pressed through the clutch release sleeve arrangement 48h in the direction of the clutch, so that the pressure plate or pressure plates lift off the clutch disk or clutch disks, i.e., the clutch disengages.

Instead of the cylinder separation piston unit 422h, or in addition to the same, a control valve can be provided in the hydraulic connection between the hydraulic line 90*h* and the emergency operation cylinder 54*h*. The control valve can block the hydraulic oil flow in the direction of the emergency operation cylinder 54*h* in a first control condition, and permits the hydraulic oil flow in the direction of the emergency operation cylinder 54*h* in a second control condition.

Figure 10A:
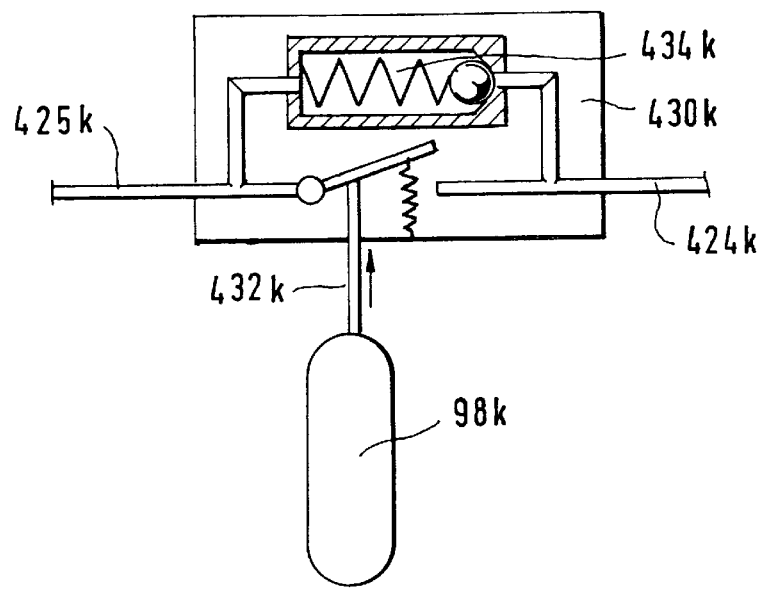
FIG. 10A shows modifications or additions of the operation device in FIG. 9.

FIG. 10A shows a possible embodiment of such a control valve, which control valve can be provided instead of the cylinder separation piston unit 422*h* in an operation device according to FIG. 9. A control valve 430*k* may be connected to the hydraulic line that leads to the clutch-operated master cylinder 92*h* by a hydraulic line 425*k*, and to the emergency operation cylinder 54*h* by the hydraulic line 424*k*. The control valve 430*k*, which is only represented symbolically, can furthermore be connected to a compressed air source 98*k* by a pneumatic line 432*k*. As long as the compressed air source 98*k* supplies compressed air with sufficient pressure, there is no hydraulic connection between the hydraulic lines 425*k* and 424*k* in the direction of the emergency operation cylinder 54*h* through the control valve 430*k*. However, in the opposite direction of flow, i.e., from the emergency operation cylinder 54*h* to the master cylinder 92*h*, an hydraulic connection can be provided through a return valve, reflux valve, check valve, back-pressure valve or non-return valve 434*k* of the control valve 430*k*.

In other words, as long as the compressed air source 98*k* supplies compressed air with sufficient pressure, there is no hydraulic connection between the hydraulic lines 425*k* and 424*k* in the direction of the emergency operation cylinder 54*h* through the control valve 430*k*. However, in the opposite direction of flow, i.e., from the emergency operation cylinder 54*h* to the master cylinder 92*h*, an hydraulic connection can be provided through a return valve 434*k* of the control valve 430*k*.

However, if the compressed air source 98*k* does not supply compressed air, or only air with insufficient pressure, the control valve 430*k* can create a connection between the hydraulic lines 425*k* and 424*k* in the direction from the master cylinder 92*h* to the emergency operation cylinder 54*h* as well.

By means of the control valve 430*k*, achieving an operation of the emergency operation cylinder 54*h* can be possible only when the compressed air source 98*k* does not supply any compressed air, or supplies air with insufficient pressure only. The hydraulic pressures required for the operation of the emergency operation cylinder can then be reduced compared to the embodiment in FIG. 9, because pressure threshold means such as the cylinder separation piston unit 422*h* and the pressure spring means 418*h* are not necessary, or their pre-stressing forces can be reduced.

Figure 10B:
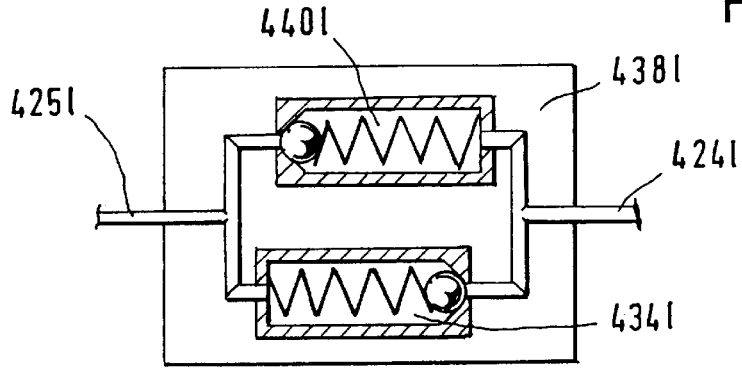
FIG. 10B shows modifications or additions of the operation device in FIG. 9.

Instead of the cylinder separation piston unit 422*h* or the control valve 430*k*, or in addition to the same, a return valve unit can be provided between the hydraulic line 90*h* and the emergency operation cylinder 54*h* in the embodiment of FIG. 9. A suitable return valve unit 438*l* is shown in FIG. 10B. The return valve unit 438*l* can have a return valve 434*l*, which return valve 434*l* corresponds to the return valve 434*k* (shown in FIG. 10A), and can enable a return connection from the hydraulic emergency operation cylinder 54*h* to the hydraulic master cylinder 92*h*. In addition, the return valve unit 438*l* has a return valve 440*l* with an opposite flow direction. Return valve 440*l* can be connected in parallel to the return valve 434*l*. The return valve 440*l*, which opens against a bias, may be designed in such a manner, i.e., the bias is calculated, that a flow connection between a hydraulic line 425*l* and a hydraulic line 424*l* in the direction of the emergency operation cylinder 54*h* and thus from the master cylinder 92*h* to the emergency operation cylinder 54*h* can be achieved only when the hydraulic pressure at the input of the return valve 440*l* and thus the hydraulic pressure in the hydraulic system reaches a preset hydraulic pressure threshold that is defined by the pre-load. The resulting hydraulic pressure threshold, which threshold must be overcome for the operation of the emergency operation cylinder 54*h*, can correspond to an operation power threshold for the operation power that acts on the master cylinder.

Figure 10C:
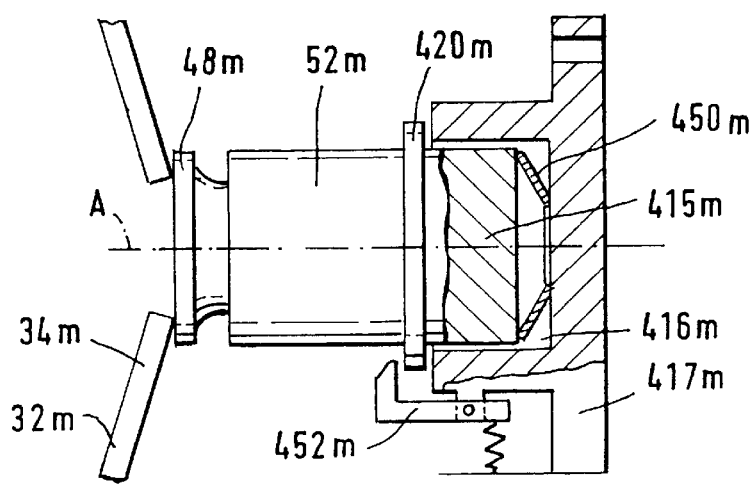
FIG. 10C shows how the emergency operation of a clutch can be realized by providing a spring load.

An embodiment as to how a possibility for the emergency operation of the clutch can be provided, for example, for an operation device according to FIG. 7, is schematically shown in FIG. 10C.

As in the embodiment of FIG. 9, the operation cylinder constructional unit 52*m* engages with a segment 415*m* in a recess 416*m* of a holding part 417*m*, which holding part 417*m* can be attached to the bell-shaped housing, and is principally axially displaceable in the recess 416*m*. The operation cylinder constructional unit 52*m* is preferably biased by a spring-load in the direction of the clutch, in the shown embodiment of FIG. 10C by a plate spring 450*m* or similar device. The operation cylinder constructional unit 52*m* can be arranged in the recess 416*m* between the segment 415*m* and the holding element 417*m*. During normal operation, i.e., as long as the control valve (not shown here) is functioning and there is enough compressed air with sufficient pressure, the operation cylinder constructional unit 52*m* can be held in its axial extreme position farther away from the clutch. The segment 415*m* can be engaged in the recess 416*m* as much as possible, by a spring-loaded catch or stop 452*m*. The spring-loaded catch 452*m* can engage at a ring collar 420*m* of the operation cylinder constructional unit 52*m*. In this way, the plate spring 450*m* may be biased to such an extent that the force the plate spring 450*m* exerts on the operation cylinder constructional unit 52*m* in the direction of the clutch is sufficient to displace the operation cylinder constructional unit 52*m* sufficiently in the direction of the clutch for the emergency operation of the clutch as soon as the catch 452*m* no longer engages at the ring collar 420*m*.

If the clutch must be operated by means of the spring-load in case of emergency, the catch 452*m*, which catch 452*m* is pivotally connected to the fastening element 417*m*, for example, by means of a Bowden-control (not shown) or similar connection, can be disengaged from the ring collar 420. The plate spring 450*m* can then displace the operation cylinder constructional unit 52*m* in the direction of the clutch and thus disengage the clutch.

The clutch can then remain in this disengaged position until a normal operation of the clutch is again possible through the pneumatic power ring cylinder of the operation cylinder constructional unit 52*m*. With appropriate operation of the pneumatic power ring cylinder, the operation cylinder constructional unit 52*m*, which operation cylinder constructional unit 52*m* may be supported at a membrane spring 32*m* by a clutch release sleeve arrangement 48*m*, which clutch release sleeve arrangement 48*m* disengages from the operation cylinder constructional unit 52*m*, is preferably displaced into the original position in the direction of the transmission, where the catch 452 reaches around the ring collar 420*m* and the plate spring 450*m* is biased. For this purpose, the catch 452*m* preferably has an intake slant where the ring collar 420*m* engages and pushes the catch 452*m* radially outward so that the ring collar 420*m* can pass the engagement segment at the catch 452*m* and the catch 452*m* can snap into place at the clutch-side of the ring collar 420*m*.

Figure 11:
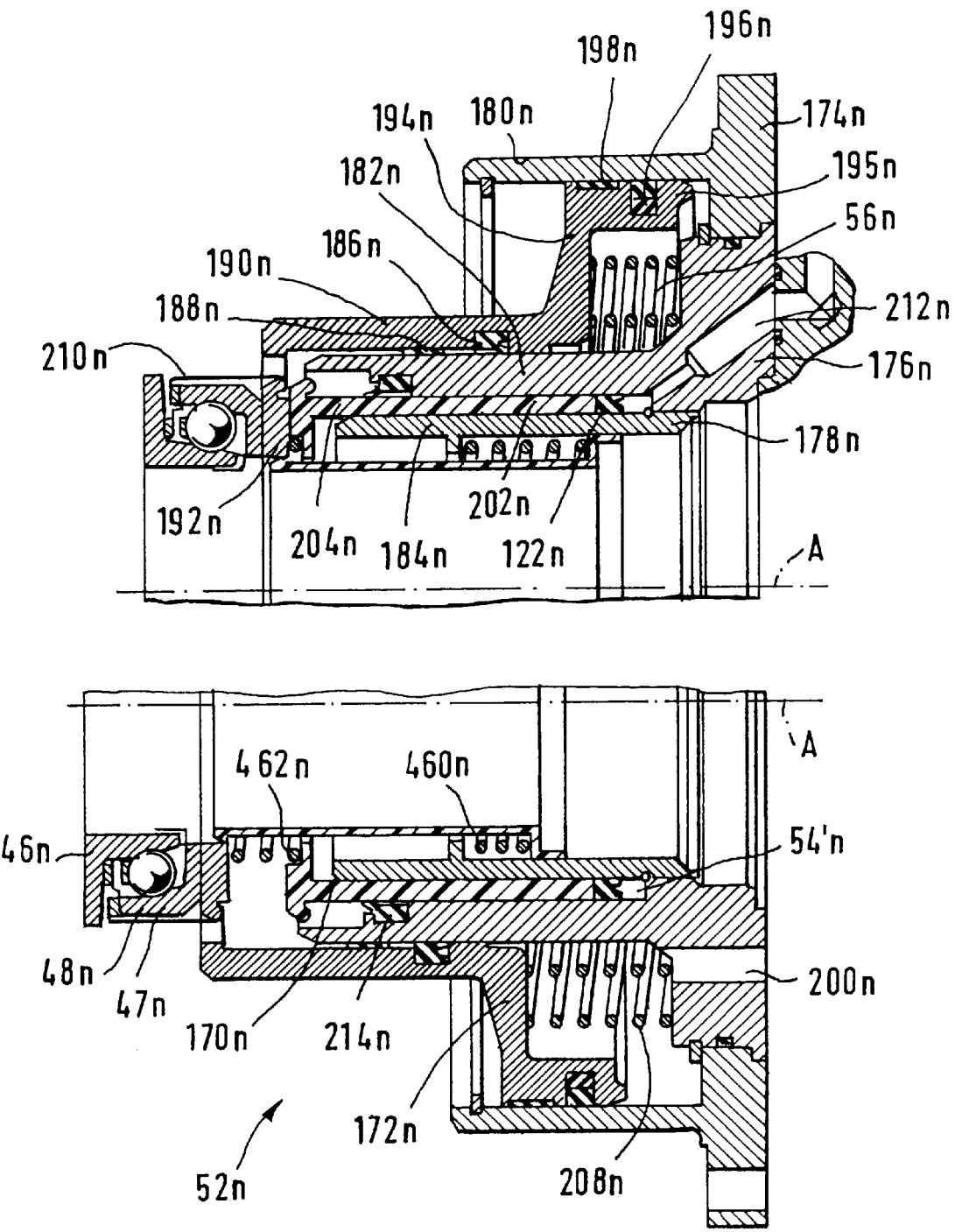
FIG. 11 shows a modification of the operation cylinder constructional unit of FIG. 5, where the hydraulic slave cylinder is for the sole purpose of emergency operation.
Figure 11A:
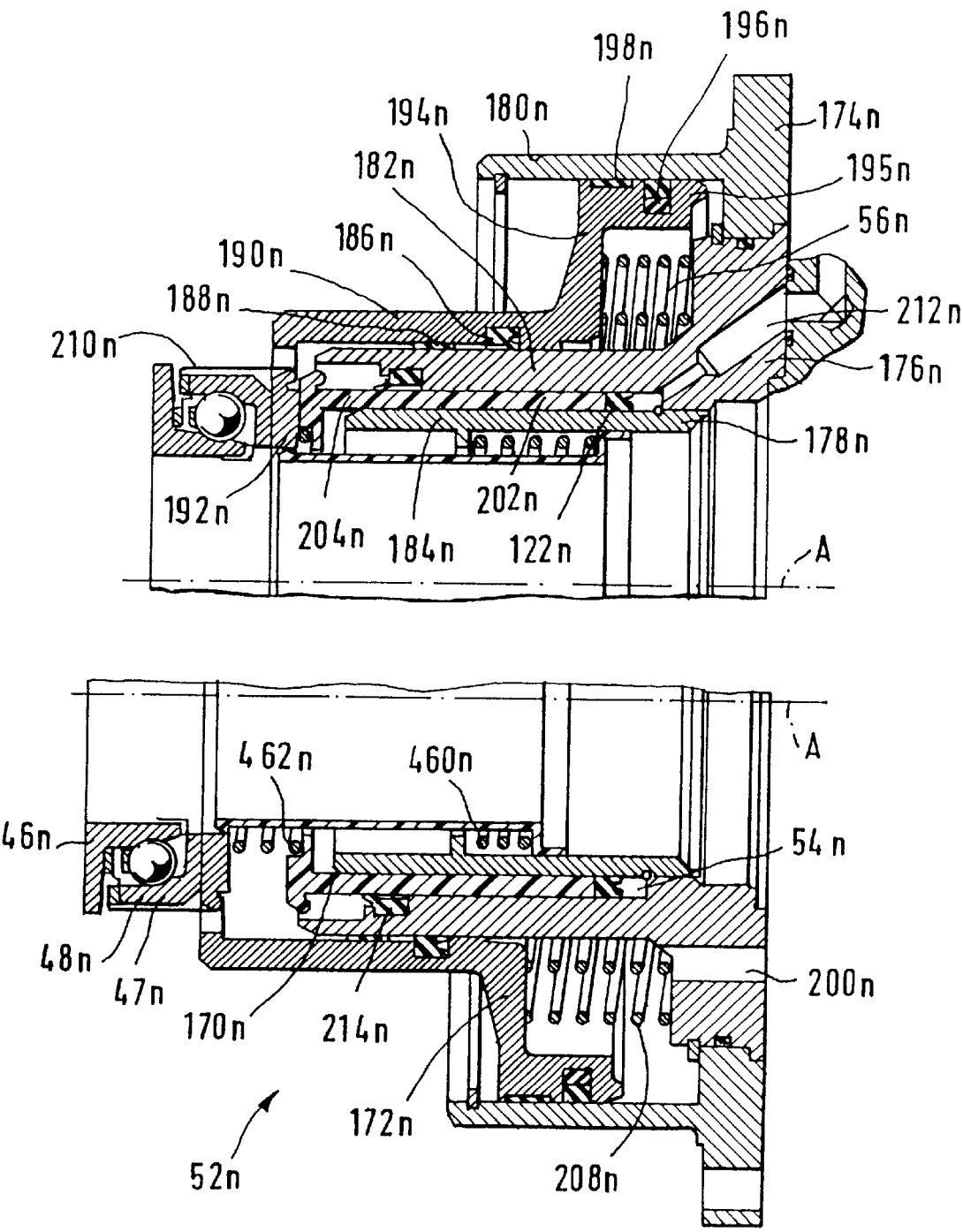
FIG. 11A shows additional features of the operation cylinder constructional unit of FIG. 11.

FIG. 11 shows an embodiment of the operation cylinder constructional unit of FIG. 5. The operation cylinder constructional unit 52n of FIG. 11 differs from the embodiment of FIG. 5 in that a ring piston element 170n can be biased in the direction of the transmission by a spring-load. The spring-load can engage at a ring collar 460n (as shown in FIG. 11A) of the stationary ring cylinder wall 184n. To bias the ring piston element 172n in the direction of the clutch, pressure spring means 208n, which pressure spring means 208n can be arranged in the ring cylinder space of the pneumatic power ring cylinder 56n, are preferably provided instead of the pressure spring 208d in the embodiment shown in FIG. 5.

If the pneumatic power ring cylinder 56n is loaded with compressed air without the hydraulic slave ring cylinder 54n (see FIG. 11A) being simultaneously loaded with pressure oil, the ring piston element 170n of the pneumatic power ring cylinder 56n can remain in its axial position shown in FIG. 11, where the volume of the cylinder ring space of the hydraulic slave ring cylinder 54n is minimal. In that way, the ring piston element 170n can contact a stop (not shown) under the force or load of the tension spring 462n. Contrary to the hydraulic slave ring cylinder 54d in the embodiment of FIG. 5, the hydraulic slave ring cylinder 54n in the embodiment of FIG. 11 does not serve as a measuring cylinder for an assigned control valve, but exclusively as an emergency operation cylinder for the operation of the clutch in case of a failure of the control valve or insufficient pneumatic pressure.

In another possible embodiment of the present invention, the cylinder 54'n formed by the ring piston element 170n and ring components 176n and 178n can be used for the emergency operation of the clutch in a manner similar to that described above.

The hydraulic slave ring cylinder 54n is then preferably connected at the assigned, especially clutch-pedal operated, hydraulic master cylinder by pressure threshold means such as the cylinder separation piston unit 422h (shown in FIG. 9) and the return valve unit 438l (shown in FIG. 10B) and/or a control valve such as the control valve 430k (shown in FIG. 10A).

With respect to the emergency operation of the clutch, there are preferably no significant differences compared to the embodiment in FIG. 5. However, the hydraulic slave ring cylinder 54n has to be loaded with an appropriately higher hydraulic pressure because of the tension spring 462n and the pressure threshold means which may have been provided.

Furthermore, suitable back-coupling means may be provided for a precise positioning of the clutch release sleeve arrangement. The back-coupling means can back-couple the axial position of the clutch release sleeve arrangement 48n to the control valve or to a control unit. Such back-coupling means are not shown in FIG. 11. A special hydraulic measuring cylinder may be provided for back-coupling. The measuring cylinder can engage through appropriate mechanical coupling elements, for example, at the clutch release sleeve arrangement 48n, or an electrical or mechanical back-coupling as in the embodiments in FIG. 4 may be provided.

Figure 12:
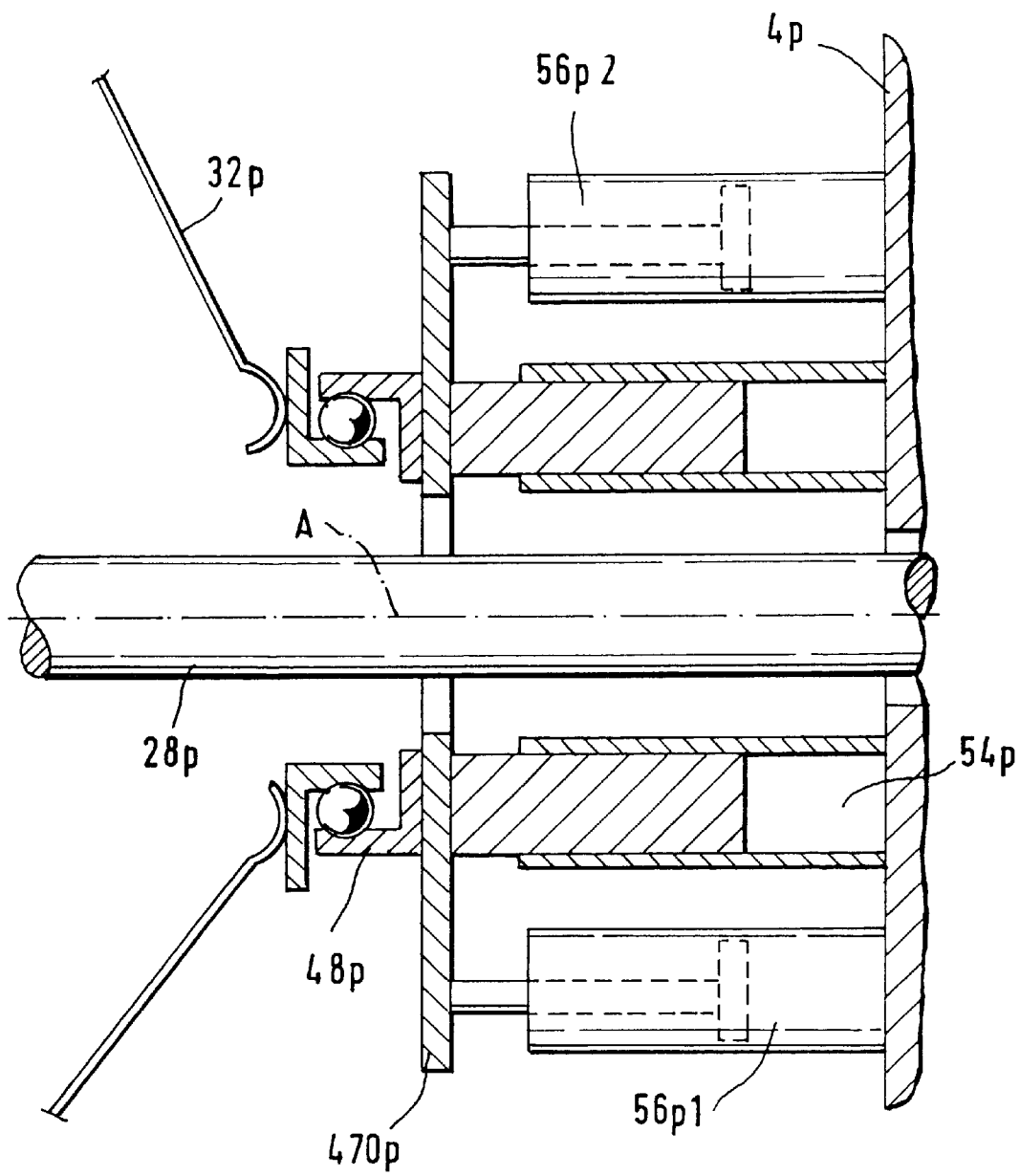
FIG. 12 shows a section of a combination of an hydraulic slave ring cylinder with several individual compressed power cylinders, especially pneumatic power cylinders, which is arranged in a bell-shaped housing of the clutch.

Another operational cylinder arrangement for a pressed clutch according to the present invention is shown in FIG. 12. The arrangement can include an hydraulic slave ring cylinder 54p. The hydraulic slave ring cylinder 54p can serve as a measuring cylinder and as an emergency operation cylinder. The hydraulic slave ring cylinder 54p can be arranged concentrically to the clutch axis A. Several individual pneumatic power cylinders 56p1, 56p2 can be arranged in distribution around clutch axis A with equal circumferential angle distances and with equal distances from clutch axis A. FIG. 12 shows two pneumatic power cylinders 56p1 and 56p2. The hydraulic slave ring cylinder 54p and the pneumatic power cylinders 56p1, 56p2 can engage at a ring plate 470p. The ring plate 470p can support the clutch release sleeve arrangement 48p. The arrangement could also be reversed, with a pneumatic power ring cylinder 56p and several individual hydraulic slave ring cylinders 54p. The radial position of the slave cylinders 54p could also be interchanged.

Figure 13:
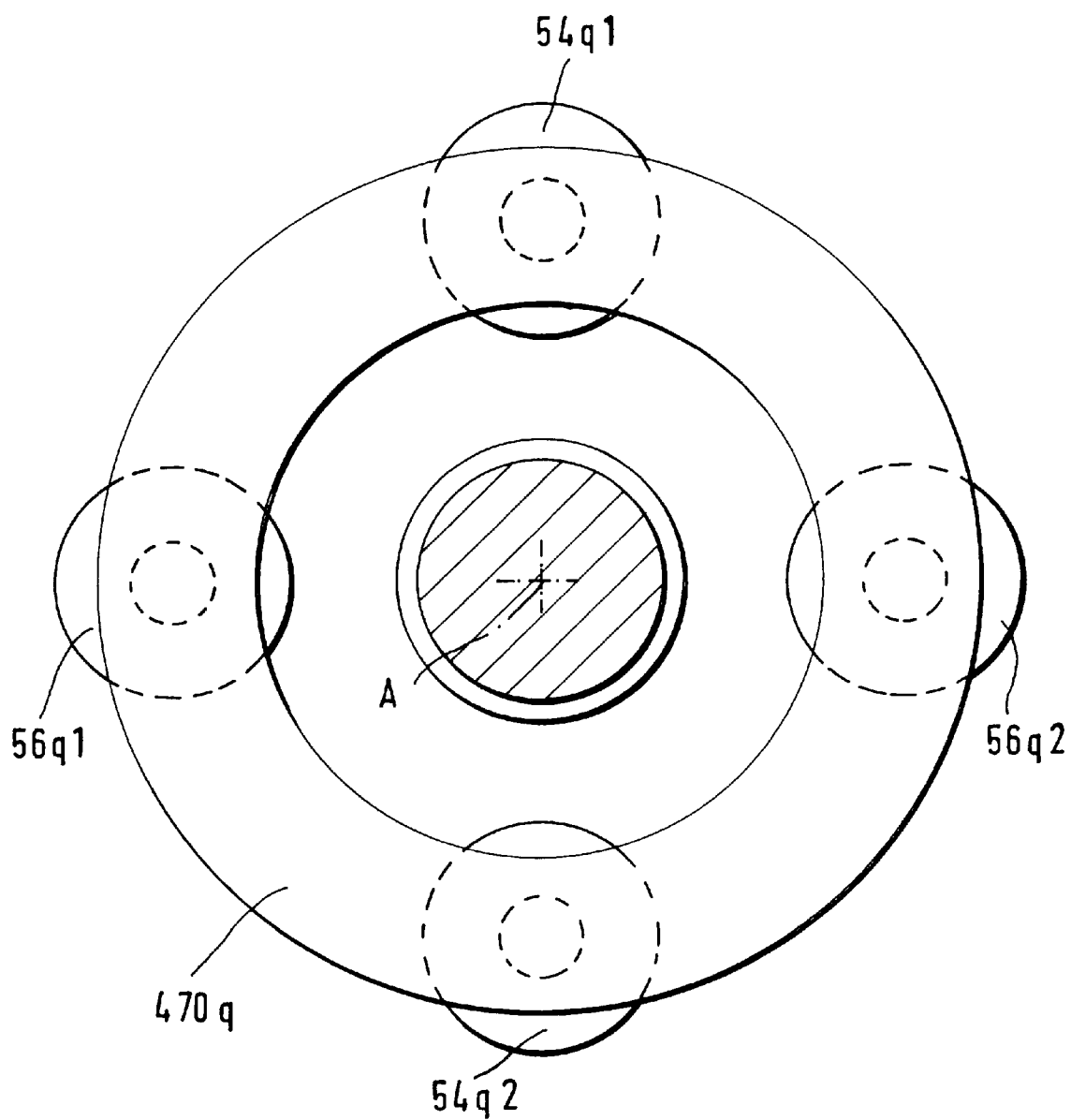
FIG. 13 shows schematically a view of the clutch release sleeve of a clutch looking from the combustion engine towards the transmission of a combination of two individual compressed power cylinders, especially pneumatic power cylinders, and two individual hydraulic slave cylinders which are arranged in the bell-shaped housing.

Another operational cylinder arrangement according to the present invention is shown in FIG. 13. In the arrangement of FIG. 13, two hydraulic slave cylinders 54q1 and 54q2, which hydraulic slave cylinders 54q1, 54q2 are diametrically opposed in relation to clutch axis A, as well as two pneumatic power cylinders 56q1 and 56q2, which pneumatic power cylinders 56q1, 56q2 are diametrically opposed in relation to clutch axis A, are preferably provided. The four operational cylinders 54q1, 54q2, 56q1, 56q2 can be arranged in distribution around the clutch axis A. The four operational cylinders 54q1, 54q2, 56q1, 56q2 can be arranged with equal circumferential angle distances and equal distances to the clutch axis A and engage at a joint ring plate 470q. The ring plate 470q can support the clutch release sleeve arrangement (not shown). The hydraulic slave cylinders 54q1 and 54q2 serve as emergency operation cylinders and as hydraulic measuring cylinders for a control valve (not shown).

Figure 14:
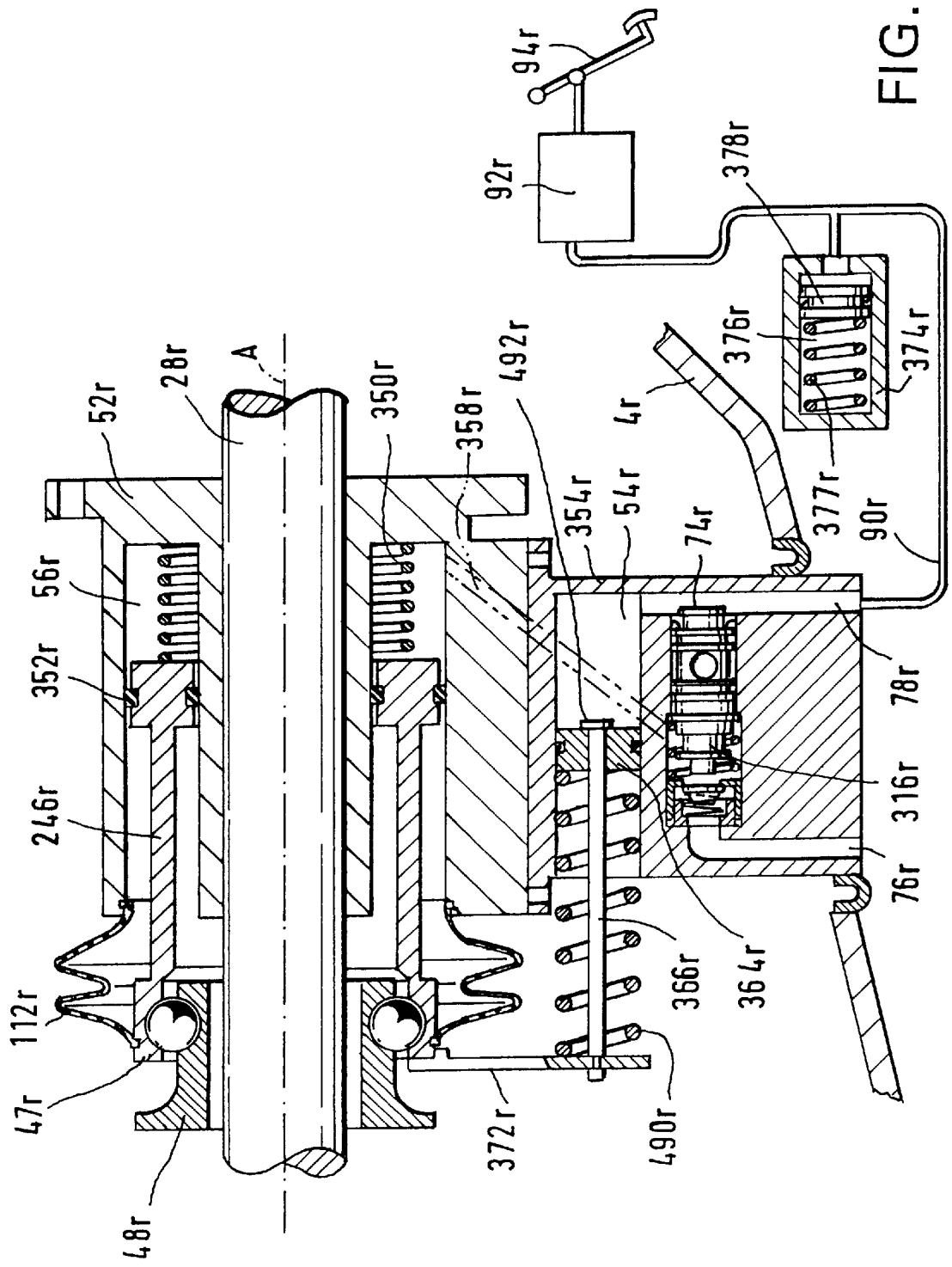
FIG. 14 shows another embodiment of the operation device shown in FIG. 7.

Another advantageous embodiment of an operation device according to the present invention is shown in FIG. 14. The operation device shown in FIG. 14 differs from the embodiment shown in FIG. 7 only in that the design of the overload protection for the avoidance of excessively high hydraulic pressures is different. The embodiment in FIG. 14 can provide two different overload protection arrangements to show different possibilities with respect to the design of the overload protection. In practice, only one of the two overload protection arrangements, which are explained in the following, can be provided.

The first overload protection arrangement is preferably designed similar to the overload protection 374f in the embodiment of FIG. 7. The first overload protection arrangement can include an overload protection 374r that is separated from the control valve constructional unit 354r. The overload protection 374r may include an hydraulic line 90r. The hydraulic line 90r can connect the cylinder 376r from the clutch-operated master cylinder 92r to the hydraulic connection 78r. The overload protection 374r can also include a sealed piston 378r. The sealed piston 378r can be spring-biased in the direction of a volume decrease of the cylinder space of the cylinder 376r. The cylinder 376r can be connected to the hydraulic system. The functioning of the overload protection 374r is the same as the overload protection 374f in the embodiment of FIG. 7. The overload protection 374r can be provided at any location within the hydraulic pressure path between the master cylinder 92r and the control valve 74r.

In another possible embodiment of the present invention, the hydraulic line 90r can connect the master cylinder 92r to the hydraulic connection 78r. The cylinder 376r can be connected into the hydraulic line 90r by an additional line to permit the cylinder 376r to receive hydraulic medium from the master cylinder 92r.

The second overload protection arrangement can be achieved through a special design of the hydraulic measuring cylinder 54r, or more specifically, the piston 364r and the piston rod 366r. As in the embodiment of FIG. 9, the piston rod 366r and the coupling element 372r are preferably connected in alignment, especially removably connected. The piston rod 366r can thus be movement-coupled to the clutch release sleeve arrangement 48r.

The piston 364r can be sealed and arranged to be displaced on the piston rod 366r. The piston 364r can be biased by a coil pressure spring 490r that acts between the coupling element 372r and the piston 364r in the direction of the far end of the piston rod 366r with respect to the coupling or clutch element 372r. The piston rod 366r has a stop 492r for the piston 364r. The spring-bias of the spring 490r can be assigned in such a way that the hydraulic pressures that occur when the control valve 74r is working or when there is sufficient pneumatic pressure, is not sufficient to move the piston 364r of the hydraulic measuring cylinder 54r noticeably against the spring power or tension or bias along the piston rod 366r in the direction of the coupling element 372r, i.e., in the sense of a volume increase of the hydraulic measuring cylinder 54r. Thus, the piston 364r can always essentially assume its final position shown in FIG. 14, where the piston 364r can be positioned at the stop 492r. The hydraulic measuring cylinder 54r can then function precisely as in the embodiment in FIG. 7 or with respect to the dampening of the pneumatic system as in the embodiment in FIG. 9.

However, if the control valve 74r is unable to function or there is a lack of compressed air at the compressed air connection 76r, the hydraulic measuring cylinder 54r can accept the hydraulic oil volume that is displaced from the master cylinder 92r, especially during an adequately stronger operation of the clutch pedal 94r. The hydraulic measuring cylinder 54r can accept the hydraulic oil volume by correspondingly displacing the piston 364r against the force of the spring 490r along the piston rod 366r so as to avoid any damage of the control valve 74r, the piston rod 366r, or the coupling element 372r due to strongly increased hydraulic pressures or strong forces acting on the hydraulic pressures.

Figure 15A:
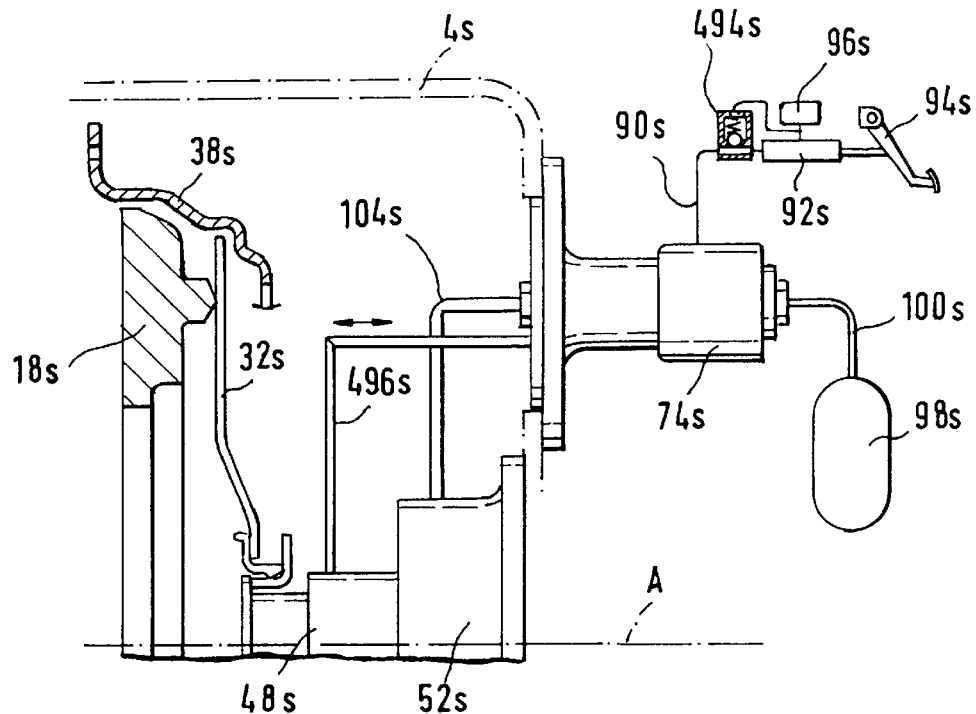
FIG. 15A shows an embodiment of the operation device corresponding to FIG. 2B.

Another way to avoid excessively high hydraulic pressures in case of a failure of the control valve or in case of a lack of compressed air is shown in FIG. 15A. The operation device according to the present invention shown in FIG. 15A corresponds largely to the operation device of FIG. 2B. In the embodiment of FIG. 15A, an overload valve 494s can be provided as overload protection. The overload valve 494s can be connected on the one hand to the hydraulic line 90s extending from the hydraulic master cylinder 92s to the control valve 74s, and on the other hand to the hydraulic line between the hydraulic medium supply 96s and the master cylinder 92s. The overload valve 494s, which is designed as a return valve, may permit a flow of hydraulic medium from the hydraulic line 90s to the supply side of the master cylinder 92s only when the hydraulic pressure exceeds a preset pressure threshold. The pressure threshold is chosen in such a manner that the overload valve 494s makes a return flow of hydraulic medium from the pressure area to the supply side of the master cylinder 92s possible only when the occurring hydraulic pressure reaches an excessive level because of a lack of pneumatic pressure or because of the failure of the control valve 74s.

Contrary to the embodiment of FIG. 2B, the back coupling of the position of the clutch release sleeve arrangement 48s to the control valve 74s can be achieved in the embodiment of FIG. 15A not through an hydraulic measuring cylinder arrangement with a corresponding hydraulic line between the operation cylinder constructional unit 52s and the control valve 74s, but rather through a rod assembly 496s. The rod assembly 496s can be connected with the clutch release sleeve arrangement 48s and one or more control valve components of the control valve 74s, for example, a valve seat.

Figure 15B:
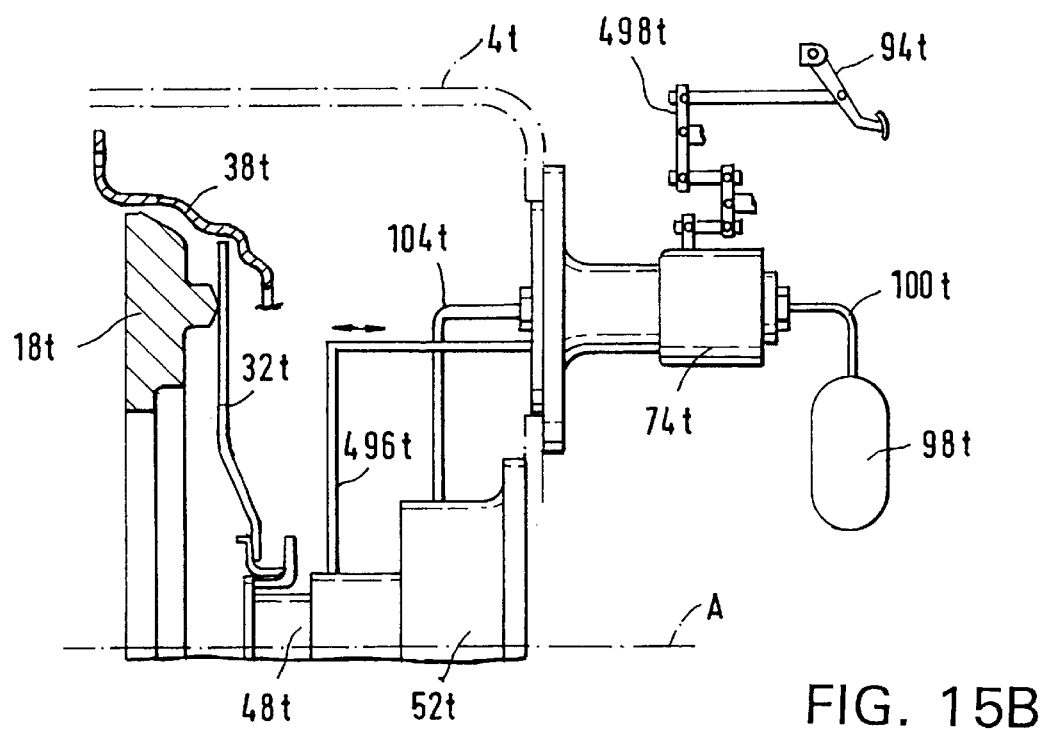
FIG. 15B shows an embodiment of the operation device corresponding to FIG. 2B.

Another embodiment of an operation device according to the present invention is shown in FIG. 15B. In this embodiment, the control valve 74t is preferably triggered by the clutch pedal 94t through a rod assembly 498t to set the desired axial position of the clutch release sleeve arrangement 48t. The rod assembly 498t can include several rod assembly elements connected by joints. A clutch pedal-side rod assembly element may be connected by a joint to the clutch pedal 94t, and a control valve-side rod assembly element can be connected to one or several control valve components of the control valve 74t, for example, a valve gate. The back-coupling of the actual axial position of the clutch release sleeve arrangement 48t to the control valve 74t is performed here through a rod assembly 496t, in the same way as shown in the embodiment in FIG. 15A.

FIG. 16A shows a diagram which explains the principle of an operation device according to the present invention, specifically with respect to the positioning of the clutch release sleeve arrangement 48u. Besides the actual power cylinder arrangement, especially pneumatic power cylinder arrangement 56u, the operation device may include primarily the control valve 74u. The control valve 74u can operate the power cylinder arrangement 56u through a connection path y and controller output, correcting variable or manipulating variable Y depending on a command variable. The command variable is preferably derived from a command signal W which, as shown in FIG. 16A, is transmitted from a clutch pedal 94u to the control valve 74u through a connection path w. To convert the command signal W into the command variable, conversion means 500u can be assigned to the corresponding signal connection 78u of the control valve 74u.

In another possible embodiment of the present invention, the conversion means 500u can utilize any number of possible arrangements, so long as the command signal W can be converted into a command variable that can be transmitted as the controller output Y to the pneumatic power cylinder arrangement 56u.

The triggering of the power cylinder arrangement 56u can depend on the command variable, which command variable represents the desired position of the clutch release sleeve arrangement 48u and an actual variable, which actual variable can represent the actual position of the clutch release sleeve arrangement 48u. The actual variable is preferably derived from an instantaneous value signal X. The instantaneous value signal can be transmitted through a connection path X to the control valve 74u by a transmitter element arrangement 504u. The transmitter element arrangement 504u can be assigned to the clutch release sleeve arrangement 48u. Means of conversion 502u can also be assigned to the corresponding signal connection 80u of the control valve 74u to perform the conversion of the instantaneous value signal X into the actual variable.

In another possible embodiment of the present invention, the means of conversion 502u can utilize any number of possible arrangements, so long as the instantaneous value signal X can be converted into an actual variable that can be transmitted as the controller output Y to the pneumatic power cylinder arrangement 56u to control operation of the clutch release sleeve arrangement 48u.

The control valve 74u, the power cylinder arrangement 56u, the transmitter element arrangement 504u assigned to the clutch release sleeve arrangement 48u and the paths x, y form a control circuit. The control circuit can control the position of the clutch release sleeve arrangement 48u according to the preset values of the command signal W. In the shown embodiment of FIG. 16A, the control is performed by switching the control valve 74u between three valve conditions. A filling control condition I where the pressure means source (especially a pneumatic source) is preferably connected to the power cylinder arrangement 56u through the valve connections 76u and 82u. A discharge control condition II, where the power cylinder arrangement 56u is preferably connected to an adjustment volume (especially the atmosphere) through the valve connections 82u and 84u. Finally, a holding control condition III, where the means of pressure cannot escape from the power cylinder arrangement 56u through the control valve 74u. A special holding control condition III of the control valve 74u is not necessarily required. If an individual holding control condition for the control valve 74u is provided, then the holding control condition III can also be realized by continuous switching between the filling connection 76u–82u and the discharge connection 82u–84u. If an individual holding control condition of the control valve 74u is not provided, the operation device can still have a hold function. The hold function can be such that there will be a continuous switching of the control valve 74u between the filling control condition I and the discharge control condition II in certain operating conditions.

The command signal W which states the desired position, as well as the back-coupling or instantaneous value signal X can be attained independently of each other by all suitable signal types. Each of the signals X, W can be an hydraulic, pneumatic, mechanical, electrical or optical signal, just to mention some important signal types. Depending on the type of signal, each signal X, W can be represented by a pressure, a volume, a power, a path, an angle, a current, a tension or a luminous intensity, just to mention some important physical signal representations. It is important that the command variable W and the instantaneous value signal X can also be different signals or that the command signal W and the instantaneous value signal X can be represented by different physical variables. If the command signal W and the instantaneous value signal X are different or are represented by different physical variables, a conversion of the signals into variables (command variable or actual variable) of the same type can be performed by the stated means of conversion 500u and 502u.

It is also possible to derive from the actual value and the command value a difference value which defines the control condition of the control valve 74u. In the shown example of FIG. 16A, the control valve assumes the filling control condition I if the command variable is larger than the actual variable, and the discharge control condition II if the command variable is smaller than the actual variable. When the command variable equals the actual variable, the control valve 74u in the embodiment of the FIG. 16A assumes the holding control condition III.

The actual variable, the command variable and the difference variable, if applicable, can each be an hydraulic, pneumatic, mechanical or electrical variable, especially a pressure, a volume, a power, a path, an angle, a current or a tension, or also a mere calculation value, preferably with corresponding digitalization, which is present in the storage area of an electronic control device (not shown), preferably a microprocessor, of the control valve 74u.

With respect to the instantaneous value signal X, it should be added that this value can also state or represent the release path, the release power or the moment transmitted by the clutch, instead of a direct statement of the absolute clutch release position. Correspondingly, the command signal W can also state the desired release path, the desired release power or the moment to be transmitted, instead of the absolute desired position of the clutch release sleeve arrangement 48u.

In practice, it often makes sense if there is no linear connection between the command variable W and the axial position of the clutch release sleeve arrangement 48u. The axial position of the clutch release sleeve arrangement 48u can be effected by the control or regulation of the control valve 74u. For example, to perform a careful manual engagement of the clutch by operating the clutch pedal 94u, it is advantageous if a medium desired position range of the clutch, which medium position range is delimited by a position of starting moment of torsion S and a position EK for an essentially maximum transmission of the moment of torsion, is spread, expanded or widened in the assigned range of command signals W with respect to the remaining desired position ranges. A corresponding position recognition line, which assigns a desired axial position to each command signal W, is shown in FIG. 16B. Because the desired axial position of the clutch release sleeve arrangement 48u, which desired axial position of the clutch release sleeve arrangement 48u is directed by the command variable W, is readjusted by the control valve 74u because of the operation of the power cylinder arrangement 56u and then corresponds to the instantaneous value signal X, the horizontal axis of the diagram, which diagram illustrates the position characteristic line, or predetermined characteristic line, is marked with X in FIG. 16B.

Proceeding from a disengaged position, such an assignment between command signal W and the desired position of the clutch release sleeve arrangement 48u enables on the one hand a faster closing of the clutch up to the point of slipping S, and on the other hand the already mentioned spread between the point of slipping S and the clutch engagement position EK, which engagement position EK enables a careful coupling. The control of the axial position of the clutch release sleeve arrangement 48u after the position characteristic line can be performed by appropriately converting or changing the command signal W in the conversion means 500u or the instantaneous value signal X in the conversion means 502u.

One feature of the invention resides broadly in the operation device for a friction clutch 2 which is arranged in the drive train of a motor vehicle, especially a utility motor vehicle, under a bell-shaped housing 4 between a combustion engine and a transmission, gear, shift gear, or change gear, comprising a clutch release sleeve 48 which can be moved essentially equiaxially to the friction clutch to operate the friction clutch 2, a positioning servo arrangement 74, 52 with a pneumatic power cylinder arrangement 56 which acts on the clutch release sleeve and can be operated by a control valve 74 connected to a pneumatic source 98 depending on a command variable, signal, reference variable input, or control input representing a desired or standard position and an actual value which represents the axial position of the clutch release sleeve arrangement 48, characterized in that the pneumatic power cylinder arrangement 56 is arranged inside of the bell-shaped housing 4, and the control valve 74 is arranged outside of the bell-shaped housing 4 or at least partially inside of the bell-shaped housing 4, but is accessible from the outside, especially for removal, when the bell-shaped housing 4 is connected to the combustion engine and the transmission.

Another feature of the invention resides broadly in the operation device characterized in that the control valve 74 comprises an adjustable valve arrangement 292, 316, 334 between a first control condition I which connects the pneumatic power cylinder arrangement 56 to the pneumatic source 98, and a second control condition II which connects the pneumatic power cylinder arrangement 56 to a pressure compensation opening 84, which valve arrangement can be adjusted between the two control conditions I, II depending on difference value assigned to the actual value and the command variable.

Yet another feature of the invention resides broadly in the operation device characterized in that the valve arrangement 292, 316, 334 can by adjusted depending on the difference variable in a third control condition III, where the pneumatic cylinder arrangement 56 is sealed essentially pneumatic-tight.

Still another feature of the invention resides broadly in the operation device characterized in that at least one of the variables-command variable, actual value, and difference variable, if applicable-is an hydraulic, pneumatic, mechanical, or electrical variable, especially a pressure, a volume, a power, a path, an angle, a flow, or a current.

A further feature of the invention resides broadly in the operation device characterized in that the control valve 74 has a first signal connection 78 to receive a command signal W which transmits the command variable, especially that of a clutch pedal arrangement 94, and a second signal connection 80 to receive an instantaneous value signal X which transmits the actual value of a master element arrangement 54, 144b, 162c, 504u which is assigned to the clutch release sleeve arrangement 48.

Another feature of the invention resides broadly in the operation device characterized in that the command signal W is an hydraulic, pneumatic, electrical, or optical signal which is represented especially by a pressure, a volume, a power, a force, an angle, a current, a tension, or a luminous intensity, whereby means of conversion or first conversion apparatus 500u may be assigned to the first signal connection 78u to convert the command signal W into the command variable.

Yet another feature of the invention resides broadly in the operation device characterized in that the signal for the instantaneous value X is an hydraulic, pneumatic, mechanical, electrical, or optical signal which is represented especially by a pressure, a volume, a force, a path, an angle, a current, a tension, or a luminous intensity, whereby means of conversion or second conversion apparatus 502u may be assigned to the second signal connection 80u to convert the signal for the instantaneous value X into the actual variable.

Still another feature of the invention resides broadly in the operation device characterized in that the positioning servo arrangement 74, 52 comprises a positioning system arrangement 74u, 504u which regulates the position of the clutch release sleeve arrangement 48 depending on the command signal W, the instantaneous value signal X, and a prescribed positional characteristic line FIG. 16B.

A further feature of the invention resides broadly in the operation device characterized in that the positional characteristic line FIG. 16B assigns a desired or standard position W1 of the clutch release sleeve arrangement 48 to each command signal in such a manner that a relatively bigger command signal range is assigned to a desired position range that is delimited by a torque transmission S which essentially begins from a position and a coupled position EK for an essentially maximum torque transmission, than is assigned to the remaining desired position ranges.

Another feature of the invention resides broadly in the operation device characterized in that the positioning servo arrangement 74b, 52b, 140b, 144b comprises an electrical positioning system circuit 140b with an electrical transmitter, measurement transducer, sensor, pick-off, pick-up or primary element 144b which directly or indirectly reads, measures or records the position of the clutch release sleeve arrangement.

Yet another feature of the invention resides broadly in the operation device characterized in that the positioning servo arrangement 74c, 52c comprises a mechanical positioning system arrangement with a mechanically coupled master element 162c which directly or indirectly reads the position of the clutch release sleeve arrangement.

Still another feature of the invention resides broadly in the operation device characterized in that the positioning servo arrangement 74, 52 comprises an hydraulic positioning system arrangement with an hydraulic measuring cylinder arrangement 54, especially with one single measuring cylinder 54 which directly or indirectly reads the position of the clutch release sleeve arrangement.

A further feature of the invention resides broadly in the operation device characterized in that the control valve 74 comprises an adjustable valve arrangement 292, 316, 334 between a first control condition which connects the pneumatic power cylinder arrangement 56 and the pneumatic source 98, and a second control condition which connects the pneumatic power cylinder arrangement 56 and a pressure compensation opening 84, and that said valve arrangement is reversible or can be adjusted, shifted or switched between the two control conditions depending on the difference power between an actual power which corresponds to the hydraulic pressure in the measuring cylinder arrangement 54, and a threshold, pre-load or initial load 330, 332.

Another feature of the invention resides broadly in the operation device characterized in that the control valve 74f and the measuring cylinder arrangement 54f form a constructional element 354f that is detachably attached to the pneumatic power cylinder arrangement 56f.

Yet another feature of the invention resides broadly in the operation device characterized in that the measuring cylinder arrangement 54f can be coupled, or is essentially rigidly coupled, to the clutch release sleeve arrangement 48f or the clutch release sleeve arrangement-side of the pneumatic power cylinder arrangement 56f.

Still another feature of the invention resides broadly in the operation device characterized in that a piston 364f of the measuring cylinder arrangement 54f which can be moved essentially axis-parallel to the clutch axis A is biased, pre-stressed, pre-tensed, or pre-loaded in the direction of the friction clutch, preferably against the coupler element 372f which is firmly connected to the clutch release sleeve arrangement 48f.

A further feature of the invention resides broadly in the operation device characterized in that a piston 364r of the measuring cylinder arrangement 54r which can be moved essentially axis-parallel to the clutch axis A is movement-coupled or can be movement-coupled with the clutch release sleeve arrangement 48h, 48r, preferably through the coupling element 372h, 372r that is firmly connected to the clutch release sleeve arrangement 48h, 48r.

Another feature of the invention resides broadly in the operation device characterized in that the measuring cylinder arrangement 54a and the pneumatic power cylinder arrangement 56a form a constructional unit 52a, and that the control valve 74a is removably or detachably held at the bell-shaped housing 4a and is connected to the measuring cylinder arrangement 54a and the pneumatic power cylinder arrangement 56a by means of channels and/or lines 102a, 104a.

Yet another feature of the invention resides broadly in the operation device characterized in that the measuring cylinder arrangement 54 and the pneumatic power cylinder arrangement 56 form a constructional unit 52, and that the control valve 74 is removably attached to the constructional unit 52.

Still another feature of the invention resides broadly in the operation device characterized in that the measuring cylinder arrangement 54 is designed as a slave cylinder arrangement 54 which acts on the clutch release sleeve arrangement 48, and said slave cylinder arrangement is hydraulically connected or connectable to a master cylinder 92, especially a master cylinder that can be operated by a clutch pedal, for emergency operation of the clutch.

A further feature of the invention resides broadly in the operation device characterized in that, especially in the case of a measuring cylinder arrangement 54f, 54r which is not designed as a slave cylinder for the emergency operation of the clutch 2, means of hydraulic pressure delimitation 374f, 374r, 54r, 494s are provided which counteract a rise in the hydraulic pressure in the hydraulic system above a prescribed maximum value.

Another feature of the invention resides broadly in the operation device characterized in that the means of hydraulic pressure delimitation 374f, 374r, 54r, 494s comprise a biasing, pre-stressing or pre-loading device 377f, 377r, 490r which biases a piston 378f, 378r, 364r of a cylinder arrangement 376f, 376r, 54r in the direction of a volume decrease of the hydraulic system-side cylinder space and/or a valve 494s which connects the pressure side and the reserve side of the master cylinder 92s and opens the same against a bias, pre-tension, pre-load or pre-stress.

Yet another feature of the invention resides broadly in the operation device characterized in that the biasing device 490r acts between the piston 364r and an assigned piston rod element 366r of the measuring cylinder arrangement 54r.

Still another feature of the invention resides broadly in the operation device characterized in that an additional hydraulic slave cylinder arrangement 54 is provided for the operation of the clutch release sleeve arrangement 48, which slave cylinder arrangement is preferably operated by means of a pedal-operated master cylinder 92.

A further feature of the invention resides broadly in the operation device characterized in that the pneumatic power cylinder arrangement 52h, 56n is coupled with the hydraulic slave cylinder arrangement 54h; 56n and/or the clutch release sleeve arrangement 48h, 48n in such a manner that it can be expanded for the operation of the clutch release sleeve arrangement 48h, 48n independently of the slave cylinder arrangement 54n, 56n.

Another feature of the invention resides broadly in the operation device characterized in that the slave cylinder arrangement 54h axially displaces the pneumatic power cylinder arrangement 52h for the operation of the clutch release sleeve arrangement 48h.

Yet another feature of the invention resides broadly in the operation device characterized in that the slave cylinder arrangement 54n operates the clutch release sleeve arrangement with expansion of the pneumatic power cylinder arrangement 56n.

Still another feature of the invention resides broadly in the operation device characterized in that means of a power threshold 418h, 422h, 440l, 462n are provided which permit the hydraulic operation of the slave cylinder arrangement 54h, 54n essentially only after an operation power threshold which acts on the master cylinder 92h has been exceeded.

A further feature of the invention resides broadly in the operation device characterized in that the power threshold means comprise a biasing device 418h, 462n which biases a piston 415h, 170n of the slave cylinder arrangement 54h, 54n and/or cylinder separating piston arrangement 422h with biased separation piston 426h which is switched between the slave cylinder arrangement 54h and the master cylinder 92h, and/or a valve 440l which opens against bias and is switched between the slave cylinder arrangement 54n and the master cylinder 92h.

Another feature of the invention resides broadly in the operation device characterized in that a controllable pilot or relay valve 430k is arranged in an hydraulic connection between the master cylinder and the slave cylinder arrangement.

Yet another feature of the invention resides broadly in the operation device characterized in that the controllable pilot valve 430k can be controlled depending on the operation pressure of the pneumatic source 98k.

Still another feature of the invention resides broadly in the operation device characterized in that the hydraulic slave cylinder arrangement 54 serves as measuring cylinder arrangement.

A further feature of the invention resides broadly in the operation device characterized in that the pneumatic power cylinder arrangement 56 comprises a pneumatic power ring cylinder 56 which is essentially concentric to the clutch axis A.

Another feature of the invention resides broadly in the operation device characterized in that the pneumatic power cylinder arrangement 56 comprises several pneumatic power cylinders 56p1, 56p2, which are arranged around the clutch axis A-preferably to exert a force on the clutch release sleeve arrangement 48p that is coaxial to the clutch axis A-especially at equal periphery angle distances from each other and at equal distances from the clutch axis A.

Yet another feature of the invention resides broadly in the operation device characterized in that the hydraulic slave cylinder arrangement 54 comprises a slave ring cylinder 54 which is essentially concentric to the clutch axis A.

Still another feature of the invention resides broadly in the operation device characterized in that the hydraulic slave cylinder arrangement 54 comprises several slave cylinders 54q1, 54q2 that are arranged around the clutch axis A-preferably to exert a force on the clutch release sleeve arrangement which is coaxial to the clutch axis A-especially at equal periphery angle distances from each other and at equal distances from the clutch axis A.

A further feature of the invention resides broadly in the operation device characterized in that the pneumatic power cylinder arrangement 56 and the hydraulic slave cylinder arrangement 54 form a constructional unit 52.

Another feature of the invention resides broadly in the operation device characterized in that the slave ring cylinder 54 and the pneumatic power ring cylinder 56 are arranged coaxially in an interlocking manner to mesh or reach into each other.

Yet another feature of the invention resides broadly in the operation device according to claim 38, characterized in that the slave cylinder 54a, 54e radially encloses the pneumatic power ring cylinder 56a, 56e on the outside.

Still another feature of the invention resides broadly in the operation device characterized in that the slave ring cylinder 54a, 54e projects past the pneumatic power ring cylinder 56a, 56e in the direction of the clutch axis A toward the friction clutch and/or that the pneumatic power ring cylinder 56a, 56e projects past the slave ring cylinder 54a, 54e in the direction of the clutch axis A toward the transmission.

A further feature of the invention resides broadly in the operation device characterized in that a pneumatic ring piston element 246e is sealed and arranged to be displaced while sealed in a pneumatic power ring cylinder 56e which is radially delimited by two ring-cylindrical walls 242c, 244e that run equiaxially in radial distance, and that said pneumatic ring piston element together with one of the ring-cylindrical walls 242e additionally forms a sealed ring-cylindrical hydraulic step cylinder 54e.

Another feature of the invention resides broadly in the operation device characterized in that one ring piston 120a of the slave ring cylinder 54a forms a cylinder wall 120a of the pneumatic power ring cylinder 56a.

Yet another feature of the invention resides broadly in the operation device characterized in that a ring piston 116a of the pneumatic power ring cylinder 56a forms a cylinder wall 116a of the slave ring cylinder 54a.

Still another feature of the invention resides broadly in the operation device characterized in that the ring piston 120a of the slave ring cylinder 54a is arranged, sealed, and can be axially displaced, on the ring piston 116a of the pneumatic power ring cylinder 56a which forms a cylinder wall 116a of the slave ring cylinder 54a, and on an opposite cylinder wall 108a of the slave ring cylinder 54a.

A further feature of the invention resides broadly in the operation device characterized in that the pneumatic power ring cylinder 56g comprises two ring cylinder walls 398g, 400g which run equiaxially in radial distance and can be axially displaced with respect to each other, and each of said ring cylinder walls carries an annular face wall which extends to the other ring cylinder wall 400g, 398g and delimits a pneumatic chamber, space or cavity, whereby the clutch release sleeve arrangement 48g is held on the first 398g of the two ring cylinder walls and means for fastening, affixing or attaching 406g, 394g the pneumatic power ring cylinder 56g in the bell-shaped housing are held on the second 400g of the two ring cylinder walls.

Another feature of the invention resides broadly in the operation device characterized in that the means for fastening comprise a ring-cylindrical pipe socket 406g on the side of the face wall 404g of the second ring cylinder wall 400g (which faces axially away from the clutch release sleeve arrangement) 48g, and that the first ring cylinder wall 398g is axially movably radially guided on said pipe socket.

Yet another feature of the invention resides broadly in the operation device characterized in that on the face wall 402g of the first ring cylinder wall 398g on the one hand, and in the area of the far end of the first ring cylinder wall 398g with respect to the clutch release sleeve arrangement 48g on the other hand, certain conical nipples 408g, 410g are held to seal the pneumatic chamber, which conical nipples are positioned with contact to seal the sliding faces of the second ring cylinder wall 400g and the ring-cylindrical pipe socket 406g.

Still another feature of the invention resides broadly in the operation device characterized in that the second ring cylinder wall 400g radially encloses the first ring cylinder wall 398g on the outside.

A further feature of the invention resides broadly in the operation device characterized in that the pipe socket 406g is formed in one piece with the second ring cylinder wall 400g and the face wall 404g of said second ring cylinder wall.

Another feature of the invention resides broadly in the operation device characterized in that the pneumatic power cylinder arrangement 56a comprises a pneumatic power ring cylinder 56g which has, on its side which axially faces away from the clutch release sleeve arrangement 48g, an equiaxially pipe socket 406g at the far end from the ring cylinder with fastening means 394g to connect to the bell-shaped housing, and that the fastening means 394g can form a fastening adapter 394a, either together or at least with a partial area of the pipe socket 406g, which is created separately from the pneumatic power ring cylinder 56g.

Yet another feature of the invention resides broadly in the operation device characterized in that the fastening adapter 394g has an oval half dog for the radial or/and axial affixation of the pipe socket 406g.

Still another feature of the invention resides broadly in the operation device characterized in that a spring-load 450m is assigned to the clutch release sleeve arrangement 48m, which spring-load can be biased by means of the pneumatic power cylinder arrangement 52m, and said spring-load can be activated for the emergency operation of the friction clutch.

A further feature of the invention resides broadly in the operation device characterized in that the pneumatic source 98 is a pneumatic pressure source 98 which releases, emits or discharges pressure gas or compressed gas.

Another feature of the invention resides broadly in the operation device for a friction clutch 2 which is arranged in the drive train of a motor vehicle, especially utility motor vehicle, in a bell-shaped housing 4 between a combustion engine and a transmission, comprising a clutch release sleeve arrangement 48 which can be moved essentially equiaxially to the friction clutch to operate the friction clutch 2; a positioning servo arrangement 74, 52 with a compressed power cylinder arrangement 56 which acts on the clutch release sleeve arrangement, which compressed power cylinder arrangement is operated by a control valve 74 that is connected to a compression source 98 depending on a command variable which represents a desired position, and an actual variable which represents the axial position of the clutch release sleeve arrangement; characterized in that the compressed power cylinder arrangement 56 is arranged inside the bell-shaped housing 4.

Yet another feature of the invention resides broadly in the operation device characterized in that the means of pressure is an hydraulic or pneumatic means of pressure.

Still another feature of the invention resides broadly in the operation device characterized in that additionally an hydraulic slave cylinder arrangement 54 is provided to operate the clutch release sleeve arrangement 48, which slave cylinder arrangement is preferably operated by means of a pedal-operated master cylinder 92.

A further feature of the invention resides broadly in the operation device characterized in that the control valve 74 is arranged outside of the bell-shaped housing 4, or at least partially inside of the bell-shaped housing 4, but is accessible from the outside, especially removable, when the bell-shaped-housing 4 is connected to the combustion engine and the transmission.

Another feature of the invention resides broadly in the operation device characterized in that the control valve 74 comprises an adjustable valve arrangement 292, 316, 334 between the first control condition I, which connects the compressed power cylinder arrangement 56 and the compression source 98, and a second control condition II which connects the compressed power cylinder arrangement 56 and a pressure compensation opening 84, said valve arrangement being reversible between the two control conditions I, II, depending on a difference variable assigned to the actual variable and the command variable, whereby the valve arrangement 292, 316, 334 is preferably adjustable depending on the difference value of a third control condition III where the compressed power cylinder arrangement 56 is essentially pneumatically sealed or sealed pneumatically-tight, the control valve 74 or the positioning servo arrangement 74, 52 especially has the characteristics as described above.

Yet another feature of the invention resides broadly in the operation device characterized by the formation of the compressed power cylinder arrangement corresponding to the pneumatic power cylinder arrangement with at least one of the characteristics described above.

Still another feature of the invention resides broadly in the operation cylinder constructional unit 52, especially for an operation device as described above, comprising a compressed power cylinder arrangement, especially pneumatic power cylinder arrangement 56, preferably also comprising an hydraulic slave cylinder-or measuring cylinder arrangement 54 as well as possibly comprising a control valve 74, whereby at least one of the cylinder arrangements 56 is arranged concentrically around a clutch axis A, the compressed or pneumatic power cylinder arrangement 56 having at least one of the characteristics of the pneumatic power cylinder arrangement or the compressed power cylinder arrangement as described above, the hydraulic slave cylinder or measuring cylinder arrangement 54 especially having at least one of the characteristics of the hydraulic slave cylinder arrangement or the hydraulic measuring cylinder arrangement as described above, the control valve 74 especially having at least one of the characteristics of the control valve as described above.

Examples of multiple disc clutches may be disclosed in the following patents: U.S. Pat. No. 5,445,574, entitled "Multiple-Disc Clutch Type Electronically Controlled Differential Limiting Device with a Torsional Damper for each Driver Shaft"; U.S. Pat. No. 4,977,991, entitled "Multiple Disc Clutch"; U.S. Pat. No. 4,862,769, entitled "Multiple Disc Clutch Apparatus"; U.S. Pat. No. 4,848,555, entitled "Twin-Disc Clutch"; U.S. Pat. No. 4,807,732, entitled "Multiple-Disc Clutch for Tractor PTO Shaft"; U.S. Pat. No. 4,751,990, entitled "Multi-Disc Clutch Unit, Particularly for Heavy-Duty Motor Vehicles"; U.S. Pat. No. 4,661,083, entitled "Multiple Disc Torque Limiting Clutch"; and U.S. Pat. No. 4,585,105, entitled "Multiple Disc Clutch Device and Method of Manufacture Thereof".

Examples of hydraulic actuators and hydraulic components for clutches may be disclosed in the following patents: U.S. Pat. No. 5,620,076, entitled "Hydraulically Actuated Clutch Release System"; U.S. Pat. No. 5,615,593, entitled "Method and Apparatus for Controllably Positioning a Hydraulic Actuator"; U.S. Pat. No. 5,577,585, entitled "Declutching Mechanism with an Hydraulic Actuator, especially for Working in Traction on the Connecting Piece of a Clutch"; U.S. Pat. No. 5,398,796, entitled "Declutching Device having an Hydraulic Actuator for Snap-Fitting on a Clutch of the Pull-Off Type"; U.S. Pat. No. 5,303,806, entitled "Spring Applied-Hydraulically Released Clutch Disc Assembly"; U.S. Pat. No. 5,224,906, entitled "Hydraulic Actuator for Clutch Assemblies"; and U.S. Pat. No. 5,060,776, entitled "Arrangement for Controlling a Hydraulically Operated Friction Disc Clutch with Diaphragm Spring".

Examples of pneumatic actuators may be disclosed in the following patents: U.S. Pat. No. 5,559,378, entitled "Three-Pole Electromagnetic Actuator for Pneumatic Distributing Devices"; U.S. Pat. No. 5,487,273, entitled "Turbocharger having Pneumatic Actuator with Pilot Valve"; U.S. Pat. No. 5,458,047, entitled "High Speed Pneumatic Servo Actuator with Hydraulic Damper"; U.S. Pat. No. 5,424,941, entitled "Apparatus and Method for Positioning a Pneumatic Actuator"; U.S. Pat. No. 5,270,625, entitled "Pneumatic/Electric Actuator"; U.S. Pat. No. 5,259,345, entitled "Pneumatically Powered Actuator with Hydraulic Latching"; U.S. Pat. No. 5,161,449, entitled "Pneumatic Actuator with Hydraulic Control"; U.S. Pat. No. 5,111,847, entitled "Pneumatic Actuator"; and U.S. Pat. No. 5,109,812, entitled "Pneumatic Preloaded Actuator".

Examples of clutch assemblies and various components associated therewith may be disclosed in the following patents: U.S. Pat. No. 5,634,542, entitled "Friction Clutch with a Flywheel"; U.S. Pat. No. 5,630,491, entitled "Friction Clutch for a Transmission of a Motor Vehicle & a Clutch Disc for a Friction Clutch"; U.S. Pat. No. 5,617,939, entitled "Friction Clutch Assembly for a Motor Vehicle, the Friction Clutch Assembly having a Clutch Plate with Divided Hub Disc"; U.S. Pat. No. 5,613,589, entitled "Friction Clutch for a Motor Vehicle"; U.S. Pat. No. 5,584,372, entitled "Friction Clutch, such as for a Motor Vehicle, the Friction Clutch having a Clutch Disc and a Pressure Plate, the Pressure Plate having a Blind Hole Fastening Arrangement"; U.S. Pat. No. 5,566,803, entitled "Clutch Assembly for a Motor Vehicle having a Flexible Clutch Disc"; and U.S. Pat. No. 5,524,739, entitled "A Transmission having a Clutch with an Arrangement for Fastening the Clutch to the Crankshaft & a Method for Making Same".

The appended drawings in their entirety, including all dimensions, proportions and/or shapes in at least one embodiment of the invention, are accurate and to scale and are hereby included by reference into this specification.

All of the patents, patent applications and publications recited herein, are hereby incorporated by reference as if set forth in their entirety herein.

The corresponding foreign patent publication applications, namely, Federal Republic of Germany Patent Application No. 196 23 373.9, filed on Jun. 12, 1996, having inventors Hans-Jürgen Drexl, Wolfgang Grosspietsch, Manfred Wehner, Herbert Voit, Joachim Lindner, Thomas Otto, and Jörg Willert, and DE-OS 196 23 373.9 and DE-PS 196 23 373.9, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a drive train of a motor vehicle, said friction clutch comprising:

at least one clutch disc;

said at least one clutch disc defining an axis of rotation and an axial direction parallel to the axis of rotation;

at least one pressure plate;

said at least one pressure plate being disposed adjacent to said at least one clutch disc;

said at least one pressure plate being configured and disposed to move in the axial direction;

said at least one pressure plate being disposed to engage said at least one clutch disc to apply a force to said at least one clutch disc;

a housing;

said housing being disposed about said at least one clutch disc and said at least one pressure plate to enclose said at least one clutch disc and said at least one pressure plate;

said housing comprising an inner surface and an outer surface;

at least a portion of said inner surface of said housing being disposed adjacent to said at least one clutch disc and said at least one pressure plate;

said outer surface of said housing being disposed opposite to said inner surface of said housing;

an operating arrangement being configured and disposed to move said at least one pressure plate to engage and disengage said at least one pressure plate with said at least one clutch disc;

said operating arrangement comprising a cylinder arrangement;

said cylinder arrangement being disposed adjacent to said inner surface of said housing;

said cylinder arrangement being configured to contain a fluid;

said cylinder arrangement being configured to move said at least one pressure plate in -response to flow of fluid into and out of said cylinder arrangement;

said operating arrangement comprising a valve apparatus;

said valve apparatus being configured to control flow of fluid into and out of said cylinder arrangement to control movement of said at least one pressure plate by said cylinder arrangement;

said valve apparatus being detachably connected to said cylinder arrangement;

a portion of said valve apparatus extending within said housing;

a portion of said valve apparatus extending outside said housing;

said valve apparatus comprising an arrangement to permit removal of said valve apparatus from said housing;

said arrangement to permit removal of said valve apparatus being disposed to be accessible from said outer surface of said housing to permit removal of said valve apparatus from said outer surface of said housing upon said friction clutch being connected to a combustion engine and a motor vehicle transmission;

said friction clutch comprising a fluid reservoir;

said valve apparatus having a first operating position to connect said fluid reservoir to said cylinder arrangement to to permit flow of fluid from sadi fluid reservoir to said cylinder arrangement;

said valve apparatus comprising an opening disposed therein to permit fluid exit said valve apparatus;

said valve apparatus having a second operating position to connect said opening in said valve apparatus to said cylinder arrangement to permit flow of fluid from said cylinder arrangement to said opening;

said valve appparatus being configured to switch between said first operating position and said second operating position in response to a difference value; and the difference value being determined from an actual position of said operating arrangement and a predetermined position of said operating arrangement.

2. The friction clutch according to claim 1, wherein:

said operating arrangement comprises a release arrangement to engage and disengage said at least one pressure plate with said at least one clutch disc;

said release arrangement is configured and disposed to move said at least one pressure plate;

said release arrangement is disposed adjacent to said cylinder arrangement;

said release arrangement is configured to be moved in an axial direction by said cylinder arrangement;

said cylinder arrangement comprises at least one power cylinder;

said at least one power cylinder is disposed substantially concentric to the axis of rotation;

said at least one power cylinder is configured and disposed to apply an axial force to said release arrangement to move said release arrangement;

said fluid comprises one of a hydraulic medium and a pneumatic medium;

said operating arrangement comprises an arrangement to determine the position of said release arrangement; and said arrangement to determine the position of said release arrangement comprises one of the following:

a) an electrical system and an electrical transmitter;

b) a mechanical system and a mechanically coupled element; and c) a hydraulic system and a hydraulic cylinder arrangement.

3. The friction clutch according to claim 2, wherein:

said valve apparatus has a third operating position to essentially limit flow of fluid into and out of said cylinder arrangement;

said valve apparatus is configured to switch into said third operating condition in response to the difference value;

the difference value is a first variable;

said valve apparatus comprises a first signal connection and a second signal connection;

said first signal connection is configured to receive a first signal corresponding to a predetermined axial position of said release arrangement;

said first signal connection comprises a first conversion apparatus;

said first conversion apparatus is configured to convert said first signal into a second variable to be used by said valve apparatus;

said second signal connection is configured to receive a second signal corresponding to a current axial position of said release arrangement;

said second signal connection comprises a second conversion apparatus;

said second conversion apparatus is configured to convert said second signal into a third variable to be used by said valve apparatus;

said valve apparatus is configured to actuate said cylinder arrangement to move said release arrangement to engage and disengage said at least one pressure plate with said at least one clutch disc in response to said first variable and a predetermined characteristic line;

said valve apparatus is configured to move said release arrangement to a position along the axis of rotation corresponding to a point on the characteristic line in response to said first variable;

a substantial portion of the characteristic line corresponds to positions of said release arrangement that engage said at least one pressure plate with said at least one clutch disc;

said first variable, said second variable and said third variable each comprises one of: an hydraulic variable, a pneumatic variable, a mechanical variable and an electrical variable;

said first variable, said second variable and said third variable are configured to correspond to one of: a pressure, a volume, a power, a path, an angle, a flow and a current;

said first signal and said second signal each comprise one of: an hydraulic signal, a pneumatic signal, an electrical signal and an optical signal; and said first signal and said second signal are each configured to correspond to one of: a pressure, a volume, a force, an angle, a current, a tension, or a luminous intensity.

4. The friction clutch according to claim 3, wherein:

said arrangement to determine the position of said release arrangement comprises said hydraulic system and said hydraulic cylinder arrangement;

said hydraulic cylinder arrangement comprises a measuring cylinder;

said measuring cylinder and said valve apparatus are configured together to form a single, integral unit;

said integral unit formed by said measuring cylinder and said valve apparatus is detachably connected to said cylinder arrangement;

said cylinder arrangement comprises a first end and a second end disposed opposite to said first end;

said first end of said cylinder arrangement is disposed adjacent to said release arrangement;

said measuring cylinder is operatively connected to one of said release arrangement and first end of said cylinder arrangement;

said hydraulic cylinder arrangement comprises a first piston;

said first piston is configured and disposed to move substantially parallel to the axis of rotation in said measuring cylinder;

said hydraulic system comprises a coupling element;

said coupling element is connected to said release arrangement;

said coupling element is disposed to contact said first piston;

said hydraulic cylinder arrangement comprises a first biasing arrangement;

said first biasing arrangement is disposed between said piston and said measuring cylinder to move said piston into contact with said coupling element;

said hydraulic cylinder arrangement comprises a hydraulic master cylinder;

said hydraulic cylinder arrangement comprises a reservoir;

said reservoir is configured to contain a hydraulic medium;

said reservoir is operatively connected to said hydraulic master cylinder to permit flow of hydraulic medium from said reservoir to said hydraulic master cylinder;

said hydraulic cylinder arrangement comprises a hydraulic connection;

said hydraulic connection is configured and disposed to connect said hydraulic master cylinder and said measuring cylinder to permit flow of a hydraulic medium between said hydraulic master cylinder and said measuring cylinder;

said operating arrangement comprises a pressure delimitation arrangement to relieve hydraulic pressure of said hydraulic medium in said measuring cylinder in response to hydraulic pressure in said measuring cylinder exceeding a predetermined amount; and said pressure delimitation arrangement comprises one of the following arrangements:
  a) a cylinder;
    a second piston;
    said second piston is disposed in said cylinder to divide said cylinder into a first chamber and a second chamber;
    said first chamber is configured to receive hydraulic medium from said hydraulic connection;
    a second biasing arrangement; and
    said second biasing arrangement is disposed in said cylinder to bias said second piston in an axial direction to reduce said first chamber; and
  b) a valve;
    said valve is disposed in both said hydraulic connection and said connection between said master cylinder and said reservoir; and
    said valve is configured to permit flow of hydraulic medium between said master cylinder and said reservoir in response to hydraulic pressure of said hydraulic medium exceeding a predetermined hydraulic pressure.

5. The friction clutch according to claim 3, wherein:

said arrangement to determine the position of said release arrangement comprises said hydraulic system and said hydraulic cylinder arrangement;

said hydraulic cylinder arrangement comprises a measuring cylinder;

said hydraulic cylinder arrangement comprises a first piston;

said first piston is configured and disposed to move substantially parallel to the axis of rotation in said measuring cylinder;

said hydraulic system comprises a coupling element;

said coupling element is connected to said release arrangement;

said coupling element is disposed to contact said first piston;

said coupling element is configured to operatively connect said first piston to said release arrangement to permit said first piston to track movement of said release arrangement;

said hydraulic cylinder arrangement comprises a piston rod;

said piston rod is disposed to contact said first piston;

said piston rod is disposed to contact said coupling element;

said hydraulic cylinder arrangement comprises a hydraulic master cylinder;

said hydraulic cylinder arrangement comprises a reservoir;

said reservoir is configured to contain a hydraulic medium;

said reservoir is operatively connected to said hydraulic master cylinder to permit flow of hydraulic medium from said reservoir to said hydraulic master cylinder;

said hydraulic cylinder arrangement comprises a hydraulic connection;

said hydraulic connection is configured and disposed to connect said hydraulic master cylinder and said measuring cylinder to permit flow of a hydraulic medium between said hydraulic master cylinder and said measuring cylinder;

said operating arrangement comprises a pressure delimitation arrangement to relieve hydraulic pressure of said hydraulic medium in said measuring cylinder in response to hydraulic pressure in said measuring cylinder exceeding a predetermined amount; and said pressure delimitation arrangement comprises one of the following arrangements:
  a) a cylinder;
     a second piston;
     said second piston is disposed in said cylinder to divide said cylinder a first chamber and a second chamber;
     said first chamber is configured to receive hydraulic medium from said hydraulic connection;
     a first biasing arrangement; and
     said first biasing arrangement is disposed in said cylinder to bias said second piston in an axial direction to reduce said first chamber; and
  b) said hydraulic cylinder arrangement comprises a second biasing arrangement; and
     said second biasing arrangement is disposed between said first piston and said piston rod to move said first piston along said piston rod in an axial direction.

6. The friction clutch according to claim 1, wherein:

said operating arrangement comprises a release arrangement to engage and disengage said at least one pressure plate with said at least one clutch disc;

said release arrangement is configured and disposed to move said at least one pressure plate;

said release arrangement is disposed adjacent to said cylinder arrangement;

said release arrangement is configured to be moved in an axial direction by said cylinder arrangement;

said operating arrangement comprises an arrangement to determine the position of said release arrangement; and said arrangement to determine the position of said release arrangement comprises one of the following:
  a) an electrical system and an electrical transmitter;
  b) a mechanical system and a mechanically coupled element; and
  c) an hydraulic system and an hydraulic cylinder arrangement.

7. A friction clutch for a drive train of a motor vehicle, said friction clutch comprising:

at least one clutch disc;

said at least one clutch disc defining an axis of rotation and an axial direction parallel to the axis of rotation;

at least one pressure plate;

said at least one pressure plate being configured and disposed to move in the axial direction;

said at least one pressure plate being disposed to contact said at least one clutch disc to apply a force to said at least one clutch disc;

a housing;

said housing being disposed about said at least one clutch disc and said at least one pressure plate to enclose said at least one clutch disc and said at least one pressure plate;

said housing comprising an inner surface and an outer surface;

at least a portion of said inner surface of said housing being disposed adjacent to said at least one clutch disc and said at least one pressure plate;

said outer surface of said housing being disposed opposite to said inner surface of said housing;

a first arrangement being configured to control the force applied by said at least one pressure plate to said at least one clutch disc;

said first arrangement being disposed to contact said at least one pressure plate;

said first arrangement being configured to be moved in the axial direction;

a second arrangement being configured to move said first arrangement to control the force applied by said at least one pressure plate to said at least one clutch disc;

said second arrangement being disposed adjacent to said first arrangement;

said second arrangement being configured to receive a first input indicating a predetermined axial position of said first arrangement;

said second arrangement being configured to move said first arrangement towards said predetermined axial position in response to said first input;

said second arrangement being configured to receive a second input indicating an axial position of said first arrangement;

said second arrangement being configured to substantially limit movement of said first arrangement in response to said second input indicating said first arrangement being in said predetermined axial position;

said second arrangement comprising a cylinder arrangement;

said cylinder arrangement being configured to contain a fluid;

said cylinder arrangement being disposed adjacent to said inner surface of said housing;

said cylinder arrangement being disposed to contact said first arrangement;

said cylinder arrangement being configured and disposed to move said first arrangement to control the force applied by said at least one pressure plate to said at least one clutch disc in response to flow of fluid into and out of said cylinder arrangement;

said second arrangement comprising a valve arrangement;

said valve arrangement being configured to control flow of fluid into and out of said cylinder arrangement in response to said first input and said second input;

said valve arrangement being detachably connected to said cylinder arrangement;

a portion of said valve arrangement extending within said housing;

a portion of said valve arrangement extending outside said housing;

said valve arrangement comprising an arrangement to permit removal of said valve arrangement from said housing; and said arrangement to permit removal of said valve arrangement being disposed to be accessible from said outer surface of said housing to permit substantially direct detachment and removal of said valve arrangement from said outer surface of said housing upon said friction clutch being connected to a combustion engine and a motor vehicle transmission.

* * * * *

UNITED STATES PATENT AND TRADEMARK OFFICE
CERTIFICATE OF CORRECTION

PATENT NO. : 6,116,399  
DATED : September 12, 2000  
INVENTOR(S) : Hans-Jürgen Drexl, Wolfgang Grosspietsch, Manfred Wehner, Herbert Voit, Joachim Lindner, Thomas Otto, and Jörg Willert Page 1 of 1

It is certified that error appears in the above-identified patent and that said Letters Patent is hereby corrected as shown below:

Title page,
Item [56], under the FOREIGN PATENT DOCUMENTS section, after "3326119", delete "9/1995" and insert -- 3/1985 --.

Column 60, claim 1,
Line 1, after the first occurrence of "to", delete "to".
Line 1, after "from", delete "sadi" and insert -- said --.
Line 4, after "fluid", insert -- to --.

Column 63, claim 5,
Line 32, after "cylinder", insert -- into --.

Signed and Sealed this

Twenty-fifth Day of December, 2001

Attest:

Attesting Officer

JAMES E. ROGAN
Director of the United States Patent and Trademark Office